US012645838B2

(12) United States Patent
Ghosh

(10) Patent No.: US 12,645,838 B2
(45) Date of Patent: Jun. 2, 2026

(54) LIMITING ACTIVITY BASED ON A PROFILE

(71) Applicant: The Toronto-Dominion Bank, Toronto (CA)

(72) Inventor: Ruchira Ghosh, Dallas, TX (US)

(73) Assignee: The Toronto-Dominion Bank, Toronto (CA)

(*) Notice: Subject to any disclaimer, the term of this patent is extended or adjusted under 35 U.S.C. 154(b) by 98 days.

(21) Appl. No.: 18/777,442

(22) Filed: Jul. 18, 2024

(65) Prior Publication Data
US 2026/0023880 A1     Jan. 22, 2026

(51) Int. Cl.
*G06F 21/62*          (2013.01)
*G06F 11/34*          (2006.01)

(52) U.S. Cl.
CPC ........ *G06F 21/629* (2013.01); *G06F 11/3438* (2013.01); *G06F 2221/2149* (2013.01)

(58) Field of Classification Search
CPC .............. G06F 21/629; G06F 11/3438; G06F 2221/2149
See application file for complete search history.

(56) References Cited

U.S. PATENT DOCUMENTS

| | | | |
|---|---|---|---|
| 9,864,982 | B2 | 1/2018 | Bristow et al. |
| 10,163,085 | B2 | 12/2018 | D'Agostino et al. |
| 10,178,246 | B1 | 1/2019 | Horvath et al. |
| 10,181,114 | B2 | 1/2019 | Tseretopoulos et al. |
| 10,339,931 | B2 | 7/2019 | Tseretopoulos et al. |
| 10,346,824 | B2 | 7/2019 | Chan et al. |
| 10,360,303 | B2 | 7/2019 | Volkovs et al. |
| 10,405,146 | B1 | 9/2019 | Kuruvilla et al. |
| 10,432,605 | B1 * | 10/2019 | Lester .................... H04L 63/08 |
| 10,438,206 | B2 | 10/2019 | Jivraj et al. |
| 10,440,196 | B2 | 10/2019 | Horvath et al. |
| 10,440,197 | B2 | 10/2019 | Horvath et al. |
| 10,447,838 | B2 | 10/2019 | Weiss et al. |
| 10,460,748 | B2 | 10/2019 | Tseretopoulos et al. |
| 10,482,675 | B1 | 11/2019 | Sutter et al. |
| 10,616,411 | B1 | 4/2020 | Chang et al. |
| 10,623,557 | B2 | 4/2020 | Kung et al. |

(Continued)

OTHER PUBLICATIONS

Heglin et al., "Auto-Adjudication Process via Machine Learning," U.S. Appl. No. 19/053,942, filed Feb. 14, 2025.

*Primary Examiner* — Darren B Schwartz

(57) ABSTRACT

An example operation may include one or more of implementing a trained AI model to identify categories within a multidimensional space using a neural network training capability with patterns of activity risk behavior, features, and model feedback data, receiving a request to determine a category of a profile associated with a computing device, extracting features and an activity history of the profile from a database, executing the trained AI model on the features and the activity history to map the profile to a point in the multidimensional space, assigning the profile to the category based on the point in the multidimensional space with respect to a cluster corresponding to the category, and reducing an activity set within a software application when the computing device is accessing the software application based on the category. The operation may further include an AI agent performing an action related to the reduced activity set.

20 Claims, 21 Drawing Sheets

910

(56)                References Cited

U.S. PATENT DOCUMENTS

| | | | |
|---|---|---|---|
| 10,659,400 B2 | 5/2020 | Moon et al. | |
| 10,698,902 B2 | 6/2020 | Tseretopoulos et al. | |
| 10,706,635 B2 | 7/2020 | Sutter et al. | |
| 10,708,721 B2 | 7/2020 | Kuruvilla et al. | |
| 10,728,259 B2 | 7/2020 | McCarter et al. | |
| 10,776,619 B2 | 9/2020 | Collinson et al. | |
| 10,805,326 B1* | 10/2020 | Wang | H04L 63/1416 |
| 10,824,941 B2 | 11/2020 | Volkovs et al. | |
| 10,831,923 B2 | 11/2020 | Dunjic et al. | |
| 10,832,047 B2 | 11/2020 | Moghtadai | |
| 10,862,897 B2 | 12/2020 | D'Agostino et al. | |
| 10,867,292 B2 | 12/2020 | Lin et al. | |
| 10,867,293 B2 | 12/2020 | Bristow et al. | |
| 10,878,816 B2 | 12/2020 | Tseretopoulos et al. | |
| 10,902,220 B2 | 1/2021 | Lozon et al. | |
| 10,922,665 B2 | 2/2021 | Miller et al. | |
| 10,943,605 B2 | 3/2021 | Tseretopoulos et al. | |
| 10,958,784 B1 | 3/2021 | Way et al. | |
| 10,970,459 B2 | 4/2021 | Lowery et al. | |
| 10,977,578 B2 | 4/2021 | Sun et al. | |
| 10,977,617 B2 | 4/2021 | Tseretopoulos et al. | |
| 11,004,187 B2 | 5/2021 | Kuruvilla et al. | |
| 11,005,992 B1 | 5/2021 | Chang et al. | |
| 11,017,028 B2 | 5/2021 | Dunjic et al. | |
| 11,030,415 B2 | 6/2021 | Volkovs et al. | |
| 11,032,421 B2 | 6/2021 | Karp et al. | |
| 11,055,924 B2 | 7/2021 | Navarro et al. | |
| 11,061,638 B2 | 7/2021 | Lam | |
| 11,070,448 B2 | 7/2021 | Miller et al. | |
| 11,087,314 B2 | 8/2021 | Gandhi et al. | |
| 11,100,168 B2 | 8/2021 | Miller et al. | |
| 11,140,143 B2 | 10/2021 | Moon et al. | |
| 11,144,921 B2 | 10/2021 | Dunjic et al. | |
| 11,144,998 B2 | 10/2021 | Kuruvilla et al. | |
| 11,145,169 B2 | 10/2021 | Pratten et al. | |
| 11,151,468 B1 | 10/2021 | Chen et al. | |
| 11,182,860 B2 | 11/2021 | Kuruvilla et al. | |
| 11,200,328 B2 | 12/2021 | Shpurov et al. | |
| 11,200,411 B2 | 12/2021 | Rizvi et al. | |
| 11,210,857 B2 | 12/2021 | Rizvi et al. | |
| 11,222,286 B2 | 1/2022 | Choe et al. | |
| 11,232,304 B2 | 1/2022 | Navarro et al. | |
| 11,276,257 B2 | 3/2022 | Moghtadai et al. | |
| 11,303,642 B2 | 4/2022 | Dunjic et al. | |
| 11,334,574 B2 | 5/2022 | Caputo et al. | |
| 11,347,744 B2 | 5/2022 | Tseretopoulos et al. | |
| 11,349,871 B2 | 5/2022 | Moon et al. | |
| 11,354,442 B2 | 6/2022 | Haldenby et al. | |
| 11,361,566 B2 | 6/2022 | Collinson et al. | |
| 11,373,229 B2 | 6/2022 | Tseretopoulos et al. | |
| 11,392,776 B2 | 7/2022 | Lozon et al. | |
| 11,393,020 B2 | 7/2022 | Mathew et al. | |
| 11,394,668 B1 | 7/2022 | Subbunarayanan et al. | |
| 11,397,765 B2 | 7/2022 | Volkovs et al. | |
| 11,409,811 B2 | 8/2022 | D'Agostino | |
| 11,411,734 B2 | 8/2022 | Shpurov et al. | |
| 11,430,242 B2 | 8/2022 | Moghtadai | |
| 11,436,809 B2 | 9/2022 | Rizvi et al. | |
| 11,451,669 B1 | 9/2022 | Navarro et al. | |
| 11,469,878 B2 | 10/2022 | Shpurov et al. | |
| 11,470,091 B2 | 10/2022 | McCarter et al. | |
| 11,470,143 B2 | 10/2022 | Joheb et al. | |
| 11,475,059 B2 | 10/2022 | Liu et al. | |
| 11,475,251 B2 | 10/2022 | Morin et al. | |
| 11,475,456 B2 | 10/2022 | Ponniah et al. | |
| 11,477,265 B2 | 10/2022 | McPhee et al. | |
| 11,507,622 B2 | 11/2022 | Grebenisan et al. | |
| 11,507,868 B2 | 11/2022 | Kwong et al. | |
| 11,531,987 B2 | 12/2022 | Vukich et al. | |
| 11,546,345 B2 | 1/2023 | D'Agostino et al. | |
| 11,553,080 B2 | 1/2023 | Newman et al. | |
| 11,556,952 B2 | 1/2023 | Sharma et al. | |
| 11,580,762 B2 | 2/2023 | Rizvi et al. | |
| 11,600,064 B2 | 3/2023 | Navarro et al. | |
| 11,604,899 B2 | 3/2023 | Haldenby et al. | |
| 11,620,741 B2 | 4/2023 | Kuruvilla et al. | |
| 11,632,311 B2 | 4/2023 | Miller et al. | |
| 11,632,459 B2 | 4/2023 | Chawla et al. | |
| 11,651,100 B2 | 5/2023 | Dunjic et al. | |
| 11,663,488 B2 | 5/2023 | Volkovs et al. | |
| 11,671,536 B2 | 6/2023 | Navarro et al. | |
| 11,687,995 B2 | 6/2023 | Tseretopoulos et al. | |
| 11,689,484 B2 | 6/2023 | Moon et al. | |
| 11,704,782 B2 | 7/2023 | Wakim et al. | |
| 11,741,305 B2 | 8/2023 | Skaljin et al. | |
| 11,743,210 B2 | 8/2023 | Moon et al. | |
| 11,748,400 B2 | 9/2023 | Volkovs et al. | |
| 11,750,741 B2 | 9/2023 | Karp et al. | |
| 11,756,388 B2 | 9/2023 | Pratten et al. | |
| 11,777,918 B2 | 10/2023 | Moon et al. | |
| 11,782,935 B2 | 10/2023 | Caputo et al. | |
| 11,789,909 B2 | 10/2023 | Grebenisan et al. | |
| 11,790,012 B2 | 10/2023 | D'Agostino | |
| 11,790,354 B2 | 10/2023 | Gandhi et al. | |
| 11,797,962 B2 | 10/2023 | Jones et al. | |
| 11,809,486 B2 | 11/2023 | Liu et al. | |
| 11,809,577 B2 | 11/2023 | Begg et al. | |
| 11,809,960 B2 | 11/2023 | Ramasamy | |
| 11,811,826 B2 | 11/2023 | Moon et al. | |
| 11,842,252 B2 | 12/2023 | Kuang et al. | |
| 11,875,398 B2 | 1/2024 | Pratten et al. | |
| 11,880,811 B2 | 1/2024 | Pawelkiewicz et al. | |
| 11,886,764 B2 | 1/2024 | Lam | |
| 11,928,112 B2 | 3/2024 | Dunjic et al. | |
| 11,941,525 B2 | 3/2024 | Morin et al. | |
| 11,941,703 B2 | 3/2024 | Kuruvilla et al. | |
| 11,943,387 B1 | 3/2024 | Wolinsky et al. | |
| 11,955,117 B2 | 4/2024 | McDermid et al. | |
| 11,966,491 B2 | 4/2024 | D'Agostino | |
| 11,978,085 B2 | 5/2024 | Rai et al. | |
| 11,978,090 B2 | 5/2024 | Navarro et al. | |
| 11,985,153 B2 | 5/2024 | Karl | |
| 11,995,121 B2 | 5/2024 | Volkovs et al. | |
| 12,008,315 B2 | 6/2024 | Miller et al. | |
| 12,014,303 B2 | 6/2024 | Carvalho et al. | |
| 12,019,594 B2 | 6/2024 | Floyd et al. | |
| 12,021,874 B2 | 6/2024 | Dunjic et al. | |
| 12,039,535 B2 | 7/2024 | Dunjic et al. | |
| 12,052,363 B2 | 7/2024 | Shpurov et al. | |
| 12,061,652 B2 | 8/2024 | Miller et al. | |
| 12,067,130 B2 | 8/2024 | Shpurov et al. | |
| 12,067,580 B2 | 8/2024 | Jeske et al. | |
| 12,079,351 B2 | 9/2024 | Begg et al. | |
| 12,106,220 B2 | 10/2024 | Volkovs et al. | |
| 12,111,793 B2 | 10/2024 | Grebenisan et al. | |
| 12,124,925 B2 | 10/2024 | Rho et al. | |
| 12,136,079 B2 | 11/2024 | Jones et al. | |
| 12,164,542 B1 | 12/2024 | Rahman et al. | |
| 12,169,693 B2 | 12/2024 | Lu | |
| 12,182,800 B2 | 12/2024 | Navarro et al. | |
| 12,198,109 B2 | 1/2025 | Abbas | |
| 12,198,510 B2 | 1/2025 | Pratten et al. | |
| 12,210,534 B2 | 1/2025 | Cashion et al. | |
| 12,211,274 B2 | 1/2025 | Ma et al. | |
| 12,217,011 B2 | 2/2025 | Luo et al. | |
| 12,223,549 B2 | 2/2025 | Bouëtté et al. | |
| 12,229,690 B2 | 2/2025 | Stanevich et al. | |
| 12,254,512 B2 | 3/2025 | Heglin et al. | |
| 12,282,785 B2 | 4/2025 | Karbasi et al. | |
| 12,288,236 B2 | 4/2025 | Volkovs et al. | |
| 12,299,149 B2 | 5/2025 | Nikoghossian et al. | |
| 12,316,715 B2 | 5/2025 | Taheri et al. | |
| 12,321,861 B2 | 6/2025 | Volkovs et al. | |
| 12,326,856 B2 | 6/2025 | Mohammed et al. | |
| 12,333,354 B2 | 6/2025 | Mohammed et al. | |
| 12,353,969 B2 | 7/2025 | Kuang et al. | |
| 12,354,094 B2 | 7/2025 | Jones et al. | |
| 12,373,795 B2 | 7/2025 | Misler et al. | |
| 12,505,447 B2 | 12/2025 | Dahlgren et al. | |
| 2012/0258437 A1* | 10/2012 | Sadeh-Koniecpol | G06F 21/56 434/362 |
| 2016/0300059 A1 | 10/2016 | Abrams et al. | |
| 2018/0041518 A1* | 2/2018 | Jacobs | H04L 63/107 |
| 2018/0268818 A1 | 9/2018 | Schoenmackers et al. | |

(56) References Cited

U.S. PATENT DOCUMENTS

| | | | |
|---|---|---|---|
| 2019/0028499 A1 | 1/2019 | Cidon et al. | |
| 2019/0172045 A1 | 6/2019 | Dunjic et al. | |
| 2019/0260793 A1* | 8/2019 | Stockdale | H04L 63/1441 |
| 2020/0058068 A1 | 2/2020 | Gandhi et al. | |
| 2020/0099781 A1 | 3/2020 | Chawla et al. | |
| 2020/0133439 A1 | 4/2020 | Trim et al. | |
| 2020/0285737 A1* | 9/2020 | Kraus | G06F 21/552 |
| 2020/0410378 A1 | 12/2020 | Williams et al. | |
| 2021/0027160 A1 | 1/2021 | Volkovs et al. | |
| 2021/0037040 A1 | 2/2021 | Aleks et al. | |
| 2021/0073819 A1* | 3/2021 | Hernandez | G06Q 20/4016 |
| 2021/0117893 A1 | 4/2021 | Sohum et al. | |
| 2021/0232950 A1 | 7/2021 | Kono | |
| 2021/0264461 A1 | 8/2021 | Fam | |
| 2021/0326940 A1 | 10/2021 | Serna | |
| 2021/0334473 A1 | 10/2021 | Trehan | |
| 2021/0407016 A1 | 12/2021 | Kuruvilla et al. | |
| 2022/0058489 A1 | 2/2022 | Volkovs et al. | |
| 2022/0108069 A1 | 4/2022 | Lee | |
| 2022/0116415 A1* | 4/2022 | Burgis | H04L 67/51 |
| 2022/0157094 A1 | 5/2022 | Moghtadai et al. | |
| 2022/0172083 A1 | 6/2022 | Wu et al. | |
| 2022/0188705 A1 | 6/2022 | Davoodi et al. | |
| 2022/0191219 A1 | 6/2022 | Wright et al. | |
| 2022/0198411 A1 | 6/2022 | Jones et al. | |
| 2022/0198432 A1 | 6/2022 | Jones et al. | |
| 2022/0198445 A1 | 6/2022 | Jones et al. | |
| 2022/0207295 A1 | 6/2022 | Stanevich et al. | |
| 2022/0207430 A1 | 6/2022 | Dickie et al. | |
| 2022/0207432 A1 | 6/2022 | Whelan et al. | |
| 2022/0207606 A1 | 6/2022 | Dickie et al. | |
| 2022/0245060 A1 | 8/2022 | Kathuria et al. | |
| 2022/0270155 A1 | 8/2022 | Volkovs et al. | |
| 2022/0277213 A1 | 9/2022 | Braviner et al. | |
| 2022/0277227 A1 | 9/2022 | Yu et al. | |
| 2022/0277323 A1 | 9/2022 | Whelan et al. | |
| 2022/0284450 A1 | 9/2022 | Asta et al. | |
| 2022/0300903 A1 | 9/2022 | Huang et al. | |
| 2022/0309573 A1 | 9/2022 | Mathew et al. | |
| 2022/0318573 A1 | 10/2022 | Smith et al. | |
| 2022/0318617 A1 | 10/2022 | Wong et al. | |
| 2022/0327397 A1 | 10/2022 | Braviner et al. | |
| 2022/0327430 A1 | 10/2022 | Zuberi et al. | |
| 2022/0327431 A1 | 10/2022 | Braviner et al. | |
| 2022/0327432 A1 | 10/2022 | Gutierrez Bugarin et al. | |
| 2022/0327504 A1 | 10/2022 | Koren et al. | |
| 2022/0327625 A1 | 10/2022 | Leung et al. | |
| 2022/0335718 A1 | 10/2022 | Ma et al. | |
| 2022/0343422 A1 | 10/2022 | Zuberi et al. | |
| 2022/0366064 A1 | 11/2022 | Nikoghossian et al. | |
| 2022/0377171 A1 | 11/2022 | Joshi et al. | |
| 2022/0383301 A1 | 12/2022 | Jones et al. | |
| 2022/0383313 A1 | 12/2022 | Jones et al. | |
| 2022/0383314 A1 | 12/2022 | Jones et al. | |
| 2022/0400107 A1 | 12/2022 | Moshyedi | |
| 2022/0405299 A1 | 12/2022 | Leung et al. | |
| 2022/0414495 A1 | 12/2022 | Stanevich et al. | |
| 2023/0006809 A1 | 1/2023 | Shpurov et al. | |
| 2023/0007075 A1 | 1/2023 | Mcphee et al. | |
| 2023/0011451 A1 | 1/2023 | Lu | |
| 2023/0033019 A1* | 2/2023 | Li | G06F 16/22 |
| 2023/0042210 A1 | 2/2023 | Yee et al. | |
| 2023/0048437 A1 | 2/2023 | Karbasi et al. | |
| 2023/0075625 A1 | 3/2023 | Patel et al. | |
| 2023/0083899 A1 | 3/2023 | Gandouet et al. | |
| 2023/0086653 A1 | 3/2023 | Zykh et al. | |
| 2023/0099864 A1 | 3/2023 | Vukich et al. | |
| 2023/0107703 A1 | 4/2023 | Zhang et al. | |
| 2023/0113752 A1 | 4/2023 | Jorlett et al. | |
| 2023/0119108 A1 | 4/2023 | Volkovs et al. | |
| 2023/0131935 A1 | 4/2023 | Volkovs et al. | |
| 2023/0141627 A1 | 5/2023 | Bao et al. | |
| 2023/0153461 A1 | 5/2023 | Kalra et al. | |
| 2023/0195734 A1 | 6/2023 | Cashion et al. | |
| 2023/0196370 A1 | 6/2023 | Levine et al. | |
| 2023/0196406 A1 | 6/2023 | Gandouet et al. | |
| 2023/0244917 A1 | 8/2023 | Loaiza Ganem et al. | |
| 2023/0244962 A1 | 8/2023 | Volkovs et al. | |
| 2023/0252301 A1 | 8/2023 | Volkovs et al. | |
| 2023/0259883 A1 | 8/2023 | Misler et al. | |
| 2023/0262160 A1 | 8/2023 | Trivedi et al. | |
| 2023/0267367 A1 | 8/2023 | Volkovs et al. | |
| 2023/0267475 A1 | 8/2023 | Navarro et al. | |
| 2023/0291835 A1 | 9/2023 | Ramprashad et al. | |
| 2023/0306434 A1 | 9/2023 | Dunjic et al. | |
| 2023/0315993 A1* | 10/2023 | Nieborowski | G06F 16/35 |
| | | | 704/9 |
| 2023/0316485 A1 | 10/2023 | Wakim et al. | |
| 2023/0318994 A1 | 10/2023 | Moon et al. | |
| 2023/0336615 A1 | 10/2023 | Joheb et al. | |
| 2023/0342481 A1 | 10/2023 | Nikoghossian et al. | |
| 2023/0344814 A1 | 10/2023 | Moon et al. | |
| 2023/0351116 A1 | 11/2023 | Skaljin et al. | |
| 2023/0368048 A1 | 11/2023 | Yang et al. | |
| 2023/0377047 A1 | 11/2023 | Bouëttéet al. | |
| 2023/0385693 A1 | 11/2023 | Cresswell et al. | |
| 2023/0385694 A1 | 11/2023 | Cresswell et al. | |
| 2023/0386190 A1 | 11/2023 | Cresswell et al. | |
| 2023/0394452 A1 | 12/2023 | Jones et al. | |
| 2023/0401192 A1 | 12/2023 | Yang et al. | |
| 2023/0401553 A1 | 12/2023 | Navarro et al. | |
| 2023/0401572 A1 | 12/2023 | Navarro et al. | |
| 2023/0419302 A1 | 12/2023 | Navarro et al. | |
| 2023/0419402 A1 | 12/2023 | Ghelichi et al. | |
| 2024/0020534 A1 | 1/2024 | Perez Vallejo et al. | |
| 2024/0062117 A1 | 2/2024 | Kuang et al. | |
| 2024/0106851 A1 | 3/2024 | Kennedy et al. | |
| 2024/0119346 A1 | 4/2024 | Chang et al. | |
| 2024/0126575 A1 | 4/2024 | Kiriakou et al. | |
| 2024/0127036 A1 | 4/2024 | Zuberi et al. | |
| 2024/0127214 A1 | 4/2024 | Wander et al. | |
| 2024/0193562 A1 | 6/2024 | Pratten et al. | |
| 2024/0202756 A1 | 6/2024 | Karl et al. | |
| 2024/0203405 A1 | 6/2024 | McDermid et al. | |
| 2024/0211732 A1 | 6/2024 | Wander et al. | |
| 2024/0212049 A1 | 6/2024 | Ghelichi et al. | |
| 2024/0220653 A1 | 7/2024 | D'Agostino | |
| 2024/0232614 A1 | 7/2024 | Esmaeili et al. | |
| 2024/0232950 A1 | 7/2024 | Navarro et al. | |
| 2024/0249310 A1 | 7/2024 | Rai et al. | |
| 2024/0256903 A1 | 8/2024 | Ens et al. | |
| 2024/0256904 A1 | 8/2024 | Leung et al. | |
| 2024/0256968 A1 | 8/2024 | Hosseinzadeh et al. | |
| 2024/0265055 A1 | 8/2024 | Purkayastha | |
| 2024/0281467 A1 | 8/2024 | Volkovs et al. | |
| 2024/0281808 A1 | 8/2024 | Vouitsis et al. | |
| 2024/0281818 A1 | 8/2024 | Golestan Irani et al. | |
| 2024/0289645 A1 | 8/2024 | Makhijani et al. | |
| 2024/0289876 A1 | 8/2024 | Mathew et al. | |
| 2024/0303551 A1 | 9/2024 | Li et al. | |
| 2024/0304182 A1 | 9/2024 | Hamilton et al. | |
| 2024/0330772 A1 | 10/2024 | Cresswell et al. | |
| 2024/0330809 A1 | 10/2024 | Carvalho et al. | |
| 2024/0338520 A1 | 10/2024 | Misler et al. | |
| 2024/0346338 A1 | 10/2024 | Desai et al. | |
| 2024/0370880 A1 | 11/2024 | Jeske et al. | |
| 2024/0370881 A1 | 11/2024 | Jeske et al. | |
| 2024/0385838 A1 | 11/2024 | Yu et al. | |
| 2024/0386295 A1 | 11/2024 | Yu et al. | |
| 2024/0386325 A1 | 11/2024 | Yu et al. | |
| 2024/0386326 A1 | 11/2024 | Yu et al. | |
| 2024/0386427 A1 | 11/2024 | Abbas et al. | |
| 2024/0394569 A1 | 11/2024 | Farhadi Hassan Kiadeh et al. | |
| 2024/0394588 A1 | 11/2024 | Heglan et al. | |
| 2024/0403702 A1 | 12/2024 | Deljavan Farshi | |
| 2024/0403862 A1 | 12/2024 | Abbas et al. | |
| 2024/0412069 A1 | 12/2024 | Volkovs et al. | |
| 2024/0412078 A1 | 12/2024 | Ghelichi et al. | |
| 2024/0412083 A1 | 12/2024 | Starszyk et al. | |
| 2024/0419978 A1 | 12/2024 | Stein et al. | |
| 2024/0420010 A1 | 12/2024 | Cirulis et al. | |
| 2024/0420011 A1 | 12/2024 | Cirulis et al. | |
| 2024/0428283 A1 | 12/2024 | Belbahri et al. | |
| 2025/0013363 A1 | 1/2025 | Estoesta et al. | |

(56)　　　　References Cited

U.S. PATENT DOCUMENTS

| | | |
|---|---|---|
| 2025/0013697 A1 | 1/2025 | Estoesta et al. |
| 2025/0013927 A1 | 1/2025 | Rho et al. |
| 2025/0014010 A1 | 1/2025 | Jones et al. |
| 2025/0014052 A1 | 1/2025 | Bhattacharjee et al. |
| 2025/0028852 A1 | 1/2025 | Chowanski et al. |
| 2025/0028934 A1 | 1/2025 | Wong et al. |
| 2025/0029012 A1 | 1/2025 | Rho et al. |
| 2025/0045601 A1 | 2/2025 | Zuberi et al. |
| 2025/0053387 A1 | 2/2025 | Wang et al. |
| 2025/0068646 A1 | 2/2025 | Rahman et al. |
| 2025/0068853 A1 | 2/2025 | Lu |
| 2025/0069063 A1 | 2/2025 | Navarro et al. |
| 2025/0077187 A1 | 3/2025 | Guttridge et al. |
| 2025/0077188 A1 | 3/2025 | Guttridge et al. |
| 2025/0077189 A1 | 3/2025 | Guttridge et al. |
| 2025/0077190 A1 | 3/2025 | Guttridge et al. |
| 2025/0077204 A1 | 3/2025 | Guttridge et al. |
| 2025/0077227 A1 | 3/2025 | Guttridge et al. |
| 2025/0077396 A1 | 3/2025 | Sen |
| 2025/0077397 A1 | 3/2025 | Sen |
| 2025/0077399 A1 | 3/2025 | Sen |
| 2025/0077400 A1 | 3/2025 | Sen |
| 2025/0077556 A1 | 3/2025 | Guttridge et al. |
| 2025/0077681 A1 | 3/2025 | Sen |
| 2025/0077682 A1 | 3/2025 | Guttridge et al. |
| 2025/0077939 A1 | 3/2025 | Tabatabaei et al. |
| 2025/0078324 A1 | 3/2025 | Gormley |
| 2025/0078325 A1 | 3/2025 | Gormley |
| 2025/0078344 A1 | 3/2025 | Gormley |
| 2025/0078345 A1 | 3/2025 | Gormley |
| 2025/0078972 A1 | 3/2025 | Gormley |
| 2025/0085936 A1 | 3/2025 | Guttridge et al. |
| 2025/0086096 A1 | 3/2025 | Guttridge et al. |
| 2025/0086440 A1 | 3/2025 | Erb et al. |
| 2025/0086441 A1 | 3/2025 | Guttridge et al. |
| 2025/0086451 A1 | 3/2025 | Guttridge et al. |
| 2025/0086551 A1 | 3/2025 | Zhao |
| 2025/0094437 A1 | 3/2025 | Upendran |
| 2025/0103609 A1 | 3/2025 | Upendran |
| 2025/0103961 A1 | 3/2025 | Cresswell et al. |
| 2025/0103980 A1 | 3/2025 | Deljavan Farshi et al. |
| 2025/0104024 A1 | 3/2025 | Abbas |
| 2025/0104029 A1 | 3/2025 | Deljavan Farshi et al. |
| 2025/0104047 A1 | 3/2025 | Mashkevich |
| 2025/0104050 A1 | 3/2025 | Mashkevich |
| 2025/0104059 A1 | 3/2025 | Mashkevich |
| 2025/0104074 A1 | 3/2025 | Tsang et al. |
| 2025/0104306 A1 | 3/2025 | Mashkevich |
| 2025/0104700 A1 | 3/2025 | Henault-Ethier et al. |
| 2025/0106060 A1 | 3/2025 | Gormley et al. |
| 2025/0106201 A1 | 3/2025 | Gormley |
| 2025/0110805 A1 | 4/2025 | Starszyk et al. |
| 2025/0117411 A1 | 4/2025 | Mohammed |
| 2025/0117595 A1 | 4/2025 | Taheri |
| 2025/0117596 A1 | 4/2025 | Taheri |
| 2025/0117623 A1 | 4/2025 | Devarajan et al. |
| 2025/0117629 A1 | 4/2025 | Pandey et al. |
| 2025/0117630 A1 | 4/2025 | Taheri |
| 2025/0117769 A1 | 4/2025 | Taheri |
| 2025/0117836 A1 | 4/2025 | Taheri et al. |
| 2025/0117853 A1 | 4/2025 | Pandey et al. |
| 2025/0117854 A1 | 4/2025 | Pandey et al. |
| 2025/0117855 A1 | 4/2025 | Pandey et al. |
| 2025/0117856 A1 | 4/2025 | Pandey et al. |
| 2025/0119396 A1 | 4/2025 | Taheri |
| 2025/0119494 A1 | 4/2025 | Pandey et al. |
| 2025/0119495 A1 | 4/2025 | Pandey et al. |
| 2025/0124039 A1 | 4/2025 | Cashion et al. |
| 2025/0124240 A1 | 4/2025 | Luo et al. |
| 2025/0131718 A1 | 4/2025 | Ma et al. |
| 2025/0138838 A1 | 5/2025 | Ramesh et al. |
| 2025/0139267 A1 | 5/2025 | Zykh et al. |
| 2025/0139382 A1 | 5/2025 | Mohammed et al. |
| 2025/0139708 A1 | 5/2025 | Bouëttéet al. |
| 2025/0147733 A1 | 5/2025 | Abbas et al. |
| 2025/0148321 A1 | 5/2025 | Stanevich et al. |
| 2025/0165375 A1 | 5/2025 | Cresswell et al. |
| 2025/0165866 A1 | 5/2025 | Cresswell et al. |
| 2025/0173170 A1 | 5/2025 | Glynn-Udrow et al. |
| 2025/0173568 A1 | 5/2025 | Cresswell et al. |
| 2025/0173618 A1 | 5/2025 | Cresswell et al. |
| 2025/0173619 A1 | 5/2025 | Cresswell et al. |
| 2025/0173725 A1 | 5/2025 | Devarajan et al. |
| 2025/0181321 A1 | 6/2025 | Gormley |
| 2025/0182028 A1 | 6/2025 | Gormley |
| 2025/0182196 A1 | 6/2025 | Gormley |
| 2025/0182222 A1 | 6/2025 | Gormley |
| 2025/0191062 A1 | 6/2025 | Heglin et al. |
| 2025/0217175 A1 | 7/2025 | Karbasi et al. |
| 2025/0225560 A1 | 7/2025 | Bajaj et al. |
| 2025/0231668 A1 | 7/2025 | Tao et al. |
| 2025/0231750 A1 | 7/2025 | Lim et al. |
| 2025/0231774 A1 | 7/2025 | Tao et al. |
| 2025/0231775 A1 | 7/2025 | Tao et al. |
| 2025/0231793 A1 | 7/2025 | Lim et al. |
| 2025/0232130 A1 | 7/2025 | Tao et al. |
| 2025/0232351 A1 | 7/2025 | Tao et al. |
| 2025/0232375 A1 | 7/2025 | Tao et al. |
| 2025/0232376 A1 | 7/2025 | Tao et al. |
| 2025/0232377 A1 | 7/2025 | Tao et al. |
| 2025/0232503 A1 | 7/2025 | Lim et al. |
| 2025/0238536 A1 | 7/2025 | Nikoghossian et al. |
| 2025/0245071 A1 | 7/2025 | Ionescu et al. |
| 2025/0245511 A1 | 7/2025 | D'Agostino et al. |

* cited by examiner

Figure 4C:
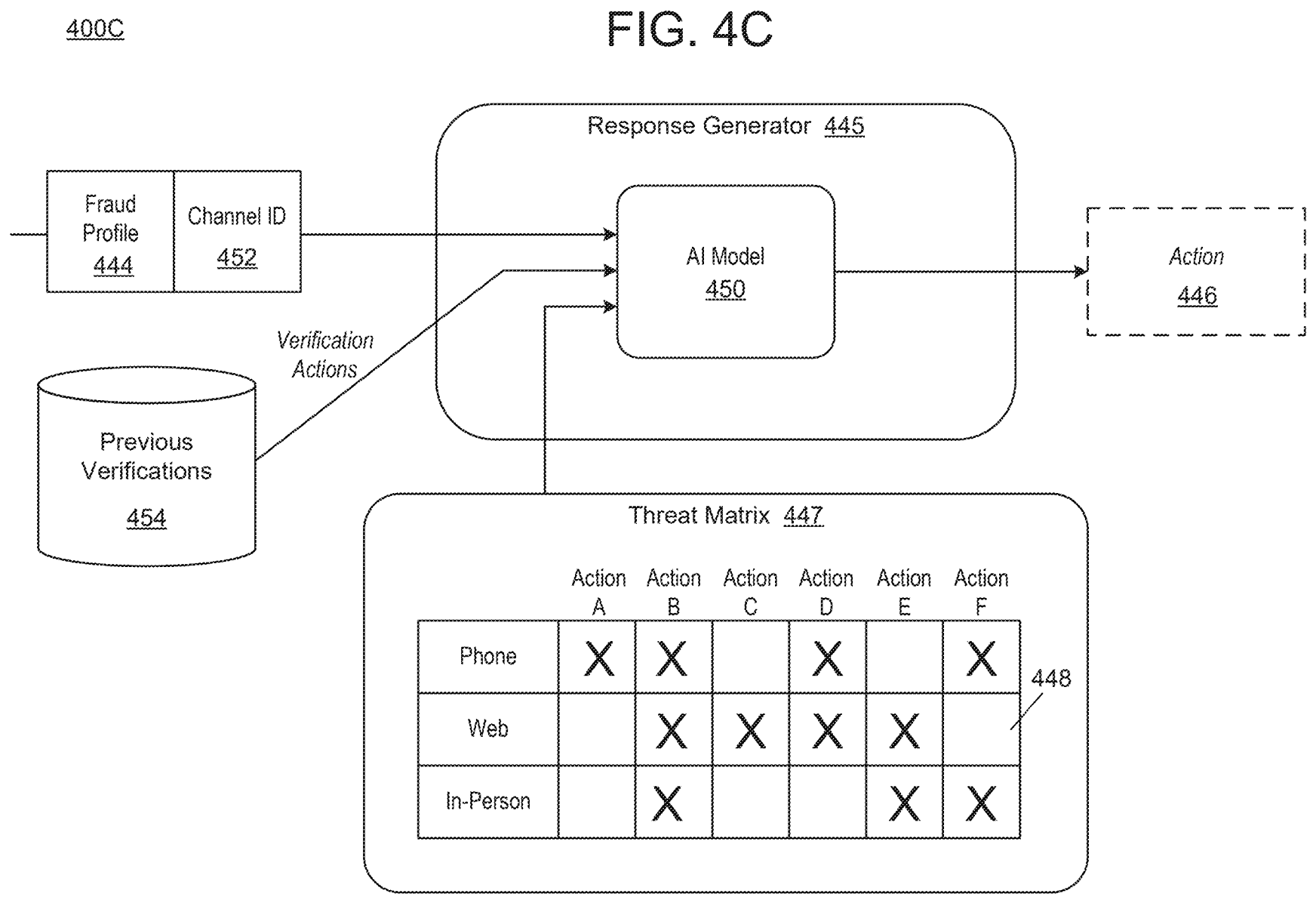

Fraud Profile 444 | Channel ID 452

Previous Verifications 454

Verification Actions

Response Generator 445

AI Model 450

Action 446

Threat Matrix 447

| | Action A | Action B | Action C | Action D | Action E | Action F |
|---|---|---|---|---|---|---|
| Phone | X | X | | X | | X |
| Web | | X | X | X | X | X |
| In-Person | | X | | | X | X |

448

500A

Source Device

N-Dimensional Space 740

744

742

743

746

741

745

AI Engine 730

Assign

Categorization AI Model 721

Profile 724

700E

800A

800B

900

901 — Implementing a Trained AI Model

902 — Capturing Audio from an Ongoing Telephone Call

903 — Converting the Audio into Text

904 — Obtaining Context of the Ongoing Telephone Call

905 — Executing the Trained AI Model on the Text and the Context to Generate a Fraud Profile 906 — Executing an Action During the Telephone Call based on the Fraud Profile

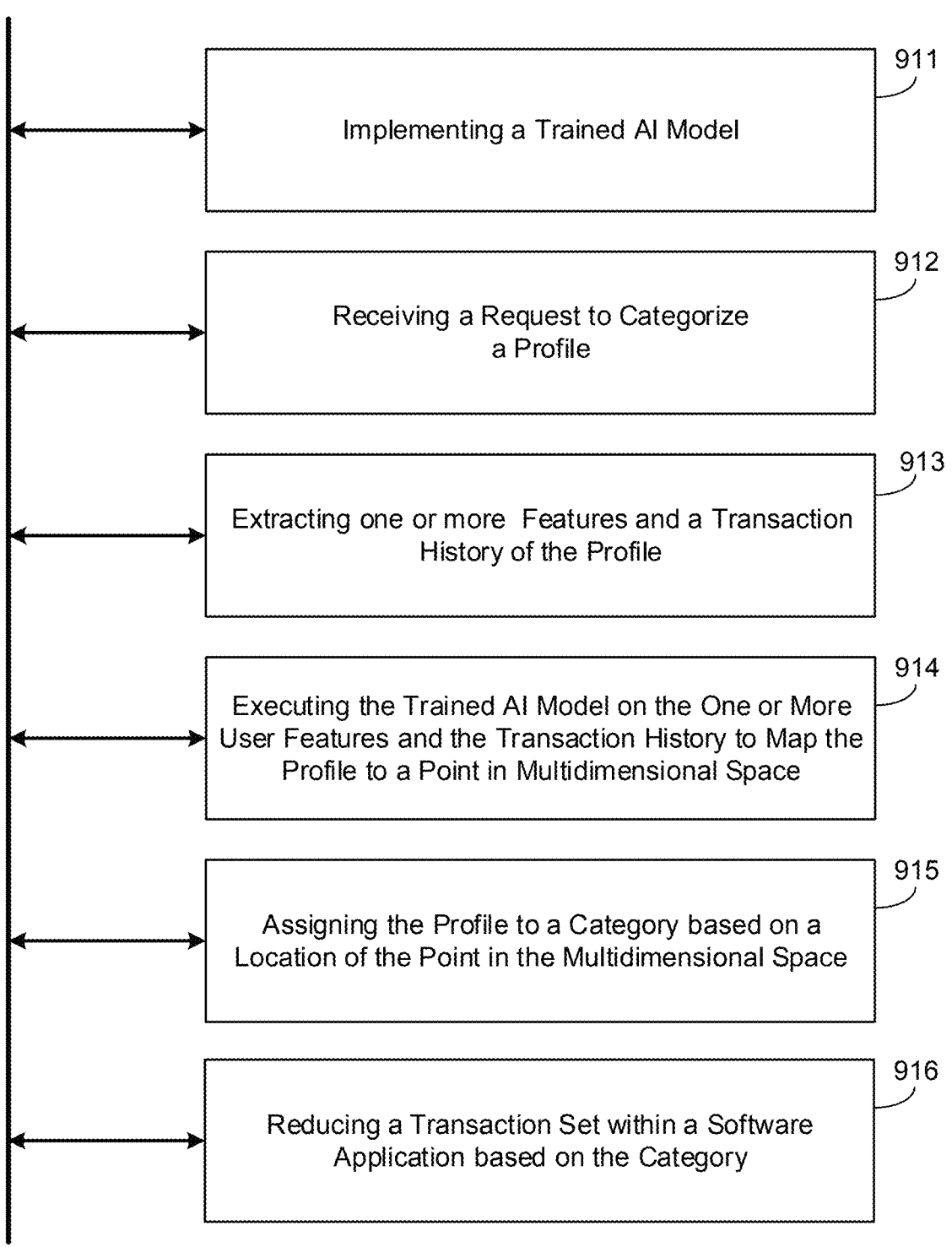

911

Implementing a Trained AI Model

912

Receiving a Request to Categorize a Profile

913

Extracting one or more Features and a Transaction History of the Profile

914

Executing the Trained AI Model on the One or More User Features and the Transaction History to Map the Profile to a Point in Multidimensional Space

915

Assigning the Profile to a Category based on a Location of the Point in the Multidimensional Space

916

Reducing a Transaction Set within a Software Application based on the Category

1000

LIMITING ACTIVITY BASED ON A PROFILE

BACKGROUND

When an account holder attempts to perform an action through a registered account, and the action is deemed to be a potential occurrence of fraud, the account is typically suspended by the institution that issued the account. However, in many cases, the account holder is not attempting to commit fraud, however, some aspect of the action may appear abnormal such as context associated with the account holder and/or a transaction being attempted by the account holder, a type of the transaction, behavior of the account holder during the transaction process, and the like. In these cases, the account holder is unnecessarily penalized by their account being suspended. In many cases, the account holder places a call to the institution to have the account unsuspended which can be a significant inconvenience to the account holder while also causing extra work by the institution to reinstate the account.

SUMMARY

One example embodiment provides an apparatus that includes a memory communicably coupled to a processor, wherein the processor may one or more of train the AI model using a neural network training capability with at least one of call log data of calls determined to have an activity risk, activity risk data, activity context, and model feedback data, capture audio from an ongoing telephone call, convert the audio from the ongoing telephone call into text and output the text via a window displayed on a graphical user interface (GUI), obtain context of an activity from a computing device which is conducting the ongoing telephone call, execute the trained AI model to generate an activity risk profile based on the text displayed on the GUI and the context of the ongoing telephone call, and execute an action during the ongoing telephone call based on the activity risk profile.

Another example embodiment provides a method that includes one or more of training an artificial intelligence (AI) model using a neural network training capability with at least one of call log data of calls determined to have an activity risk, activity risk data, activity context, and model feedback data, capturing audio from an ongoing telephone call, converting the audio from the ongoing telephone call into text and outputting the text via a window displayed on a graphical user interface (GUI), obtaining context of an activity from a computing device which is conducting the ongoing telephone call, executing the trained AI model to generate an activity risk profile based on the text displayed on the GUI and the context of the ongoing telephone call, and executing an action during the ongoing telephone call based on the activity risk profile.

A further example embodiment provides a computer readable storage medium comprising instructions, that when read by a processor, cause the processor to perform one or more of training an artificial intelligence (AI) model using a neural network training capability with at least one of call log data of calls determined to have an activity risk, activity risk data, activity context, and model feedback data, capturing audio from an ongoing telephone call, converting the audio from the ongoing telephone call into text and outputting the text via a window displayed on a graphical user interface (GUI), obtaining context of an activity from a computing device which is conducting the ongoing telephone call, executing the trained AI model to generate an activity risk profile based on the text displayed on the GUI and the context of the ongoing telephone call, and executing an action during the ongoing telephone call based on the activity risk profile.

One example embodiment provides an apparatus that includes a memory communicably coupled to a processor, wherein the processor may one or more of implement a trained artificial intelligence (AI) model to identify a plurality of categories within a multidimensional space using a neural network training capability with patterns of activity risk behavior, features, and model feedback data, receive a request to determine a category of a profile associated with a computing device, extract at least one of features and an activity history of the profile from a database, execute the trained AI model on the at least one of features and the activity history to map the profile to a point in the multidimensional space, assign the profile to the category among the plurality of categories based on a location of the point in the multidimensional space with respect to a cluster in the multidimensional space corresponding to the category, and reduce an activity set within a software application when the computing device is accessing the software application based on the category.

Another example embodiment provides a method that includes one or more of implementing a trained artificial intelligence (AI) model to identify a plurality of categories within a multidimensional space using a neural network training capability with patterns of activity risk behavior, features, and model feedback data, receiving a request to determine a category of a profile associated with a computing device, extracting at least one of features and an activity history of the profile from a database, executing the trained AI model on the at least one of features and the activity history to map the profile to a point in the multidimensional space, assigning the profile to the category among the plurality of categories based on a location of the point in the multidimensional space with respect to a cluster in the multidimensional space corresponding to the category, and reducing an activity set within a software application when the computing device is accessing the software application based on the category.

A further example embodiment provides a computer readable storage medium comprising instructions, that when read by a processor, cause the processor to perform one or more of implementing a trained artificial intelligence (AI) model to identify a plurality of categories within a multidimensional space using a neural network training capability with patterns of activity risk behavior, features, and model feedback data, receiving a request to determine a category of a profile associated with a computing device, extracting at least one of features and an activity history of the profile from a database, executing the trained AI model on the at least one of features and the activity history to map the profile to a point in the multidimensional space, assigning the profile to the category among the plurality of categories based on a location of the point in the multidimensional space with respect to a cluster in the multidimensional space corresponding to the category, and reducing an activity set within a software application when the computing device is accessing the software application based on the category.

BRIEF DESCRIPTION OF DRAWINGS

FIGS. 4B and 4C are diagrams illustrating a process performed by the AI architecture in FIG. 4A, according to examples and features of the instant solution.

FIGS. 7A-7E are diagrams illustrating a process of limiting transaction behavior of a profile based on a similar profile according to examples and features of the instant solution.

FIG. 9B is a diagram illustrating a method of categorizing a profile and reducing a transaction set of the profile based on artificial intelligence according to examples and features of the instant solution.

DETAILED DESCRIPTION

The examples and features of the instant solution are directed to software architecture for a call center or contact center, wherein the call center or contact center can receive telephone calls, text messages, video, images, and the like, which can proactively detect a caller's potential for activity risk, such as fraud, and which can trigger action during a communication session between the caller and the call center or contact center. For example, the software architecture may include one or more AI models which can analyze the content from the call, previous calls, transaction behavior, profile data, and the like, and recommend actions to be performed during the call to reduce the opportunity for the caller to commit fraud. In some examples and features of the instant solution, an AI model may determine an additional verification action that is to be performed "in-call" by the caller, the call center representative, or both.

According to various other examples and features of the instant solution, also provided herein is a software architecture which can proactively reduce the ability of a user to commit a risky activity, such as fraud, by comparing a profile of the user to profiles of other types of users with similar features as the user. Here, the software architecture may use one or more AI models to analyze features from a profile of the user (e.g., transaction behavior, user features, etc.) and categorize the user into a fraud group based on other users who have been known to commit fraud and who have similar features.

In the examples and features of the instant solution described or depicted herein, call center and contact center are used interchangeably. The call center or the contact center may receive caller communication, such as telephone calls, video calls, text messages, video, images, and the like, and may use these forms of communication to assist the caller and/or detect activity risk of the caller, dynamically triggering actions to be performed during the communication session between the caller and the call center or contact center.

In the examples and features of the instant solution described or depicted herein, an activity may include, but is not limited to, an account transaction and the like.

In the example and features of the instant solution, an activity risk may include, but is not limited to, a risk associated with account transactions. Such as transactions initiated by an account holder predicted to be risky, fraudulent transactions initiated by an authorized account holder, fraudulent transactions initiated by an unauthorized or unknown party, suspicious and/or risky activity, and the like.

Figure 1:
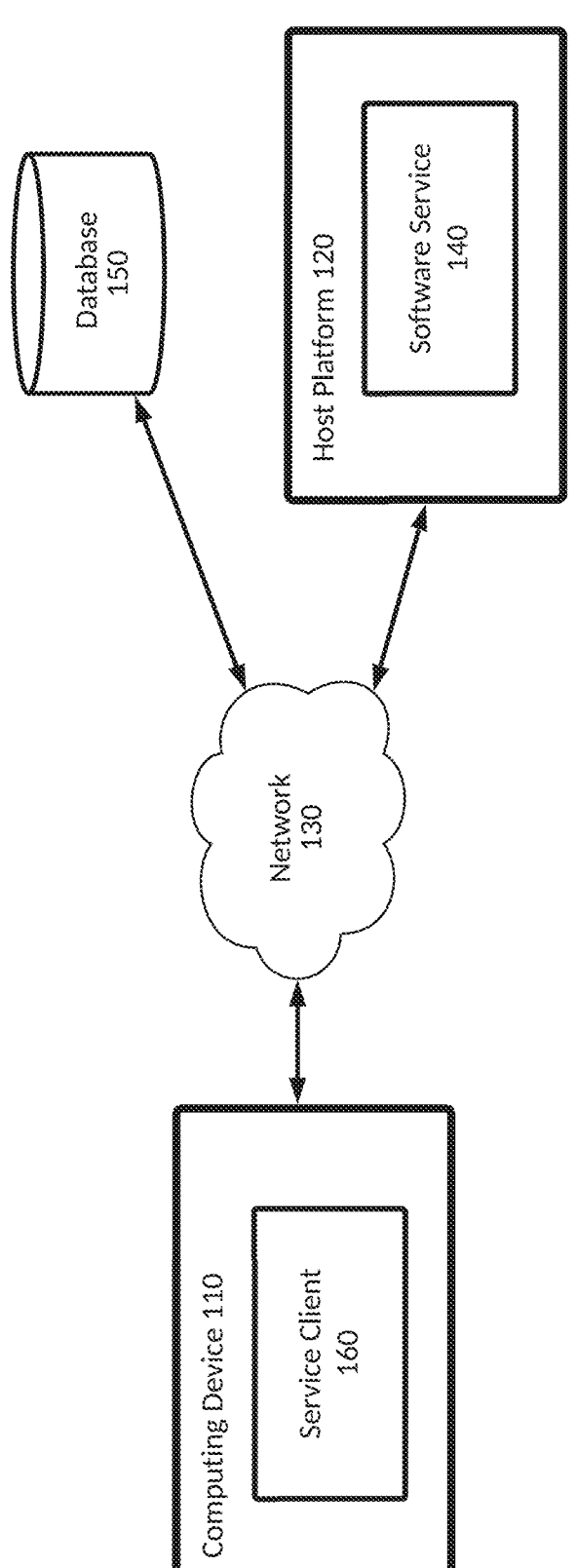
FIG. 1 is a system diagram illustrating an operating environment of a software service according to examples and features of the instant solution.

FIG. 1 is a system diagram illustrating an example operating environment of the instant solution. As shown, one or more computing devices 110, and a host platform 120 communicate via a network 130. The host platform 120 may host a software service 140. The software service 140 may communicate with one or more databases 150 through a network 130 during the course of service execution. Each computing device 110 may host a service client 160, which communicates with a corresponding software service 140.

A computing device 110 may be a mobile phone, tablet, laptop computer, desktop computer, smartwatch, vehicle infotainment system, or any computing device including a processor and memory. The host platform 120 may include a single physical server, multiple physical servers, a cloud hosting environment, or a hybrid hosting environment in which some components of the host platform 120 are "on-premise" while others are cloud-hosted. The network 130 is a computer network and may include one or more interconnected computer networks. For example, network 130 may be or may include an Ethernet network, an asynchronous transfer mode (ATM) network, a wireless network, a telecommunications network or the like.

The software service 140 provides the service logic. It may provide one or more Application Programming Interfaces (APIs) for communicating with one or more service clients 160. A "thick" user interface client that runs on a computing device 110 may utilize the APIs to communicate with the software service 140. Further, the software service 140 may provide hosted User Interfaces (UIs) that can be accessed through browser-based software on some computing devices 110.

The one or more service clients 160 can enable service access for end users and may come in a variety of forms including, but not limited to, a mobile device application ("app") or a web portal accessed via a browser on a computing device 110 such as a laptop or desktop computer.

Detailed descriptions of the call center architecture and operation of the call center architecture in the instant solution are further described and depicted herein.

Figure 2A:
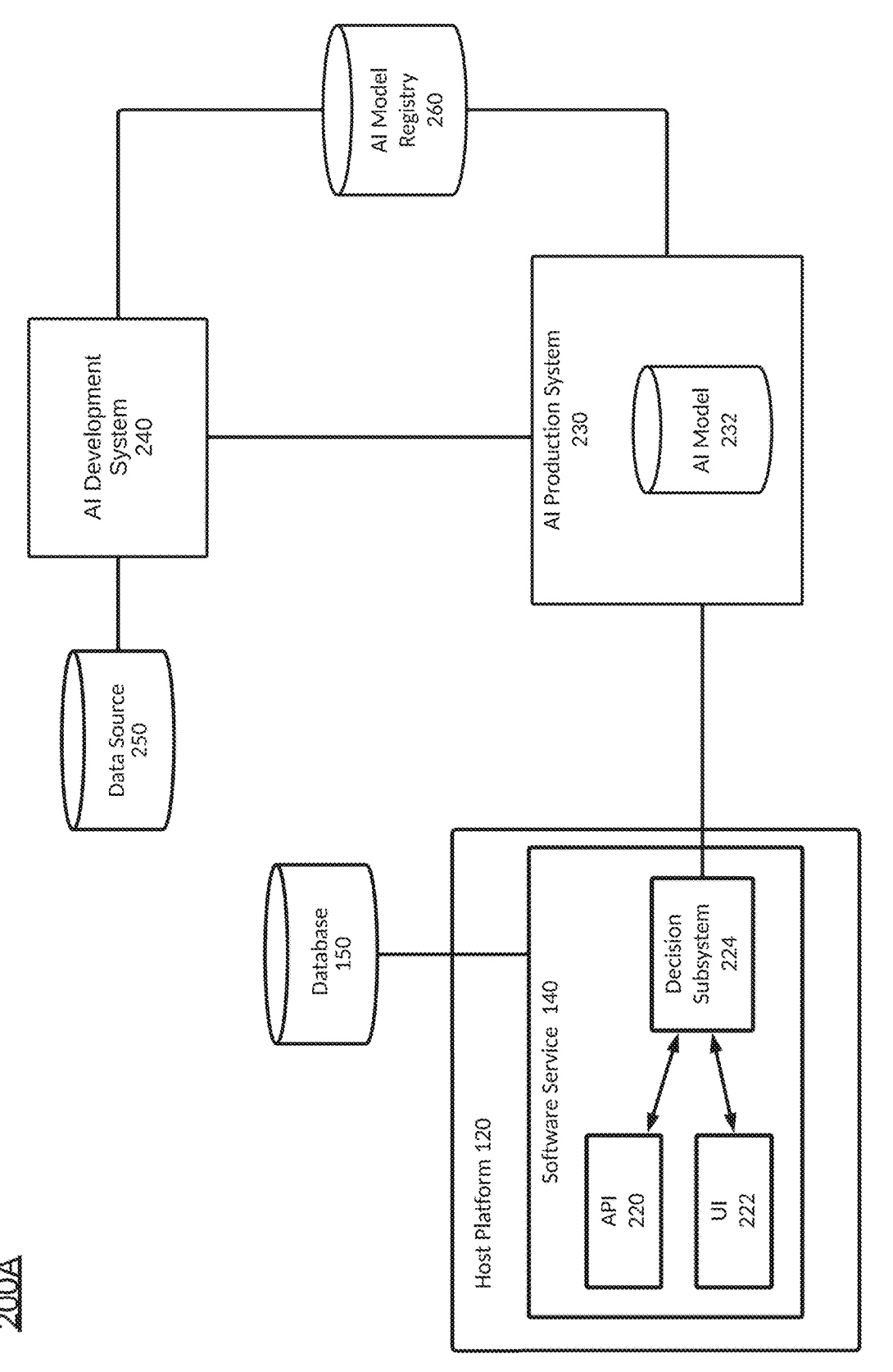
FIG. 2A is a system diagram illustrating integration of an AI model into any decision point according to the examples and features of the instant solution.

FIG. 2A illustrates an artificial intelligence (AI) network diagram 200A that supports AI-assisted decision points in a software service executing on a computer. While the example instant solution shown utilizes a neural network, which is a type of machine learning (ML) model, other branches of AI, such as, but not limited to, computer vision, fuzzy logic, expert systems, deep learning, generative AI, and natural language processing, may be employed in developing the AI model in this instant solution. Further, the AI model included in these examples and features of the instant solution is not limited to particular AI algorithms. Any algorithm or combination of algorithms related to supervised, unsupervised, and reinforcement learning may be employed.

The AI models, ML models, neural networks, and other branches of AI, described and/or depicted herein, build upon the fundamentals of predecessor technologies and form the foundation for all future technological advancements in artificial intelligence. An AI classification system describes the stages of AI progression and advancement. The first classification is known as "reactive machines," followed by present-day AI classification "limited memory machines" (also known as "artificial narrow intelligence"), then progressing to "theory of mind" (also known as "artificial general intelligence") and reaching the AI classification "self-aware" (also known as "artificial superintelligence"). Present-day limited memory machines are a growing group of AI models built upon the foundation of their predecessors, reactive machines. Reactive machines emulate human responses to stimuli; however, they are limited in their capabilities as they cannot typically learn from prior experience. Once the AI model's learning abilities emerged, its classification was promoted to limited memory machines. In this present-day classification, AI models learn from large volumes of data, detect patterns, solve problems, generate, and predict data, and the like, while inheriting all the capabilities of reactive machines.

Examples of AI models classified as limited memory machines include, but are not limited to, chatbots, virtual assistants, machine learning, neural networks, deep learning, natural language processing, generative AI models, and any future AI models that are yet to be developed possessing characteristics of limited memory machines.

For example, a neural network is a type of machine learning model that relies on training data to learn associations and connections, improving its accuracy for performing high speed data classifications, clustering, and other analyses of data. Such neural network capabilities are the foundation of deep learning models today as well as becoming the foundational blocks of those yet to be developed.

For example, generative AI models combine limited memory machine technologies, incorporating machine learning and deep learning, forming the foundational building blocks of future AI models. For example, theory of mind is the next progression of AI that may be able to perceive, connect, and react by generating appropriate reactions in response to an entity with which the AI model is interacting; all these theory of mind capabilities relies on the fundamentals of generative AI. Furthermore, in an evolution into the self-aware classification, AI models will be able to understand and evoke emotions in the entities they interact with, as well as possessing their own emotions, beliefs, and needs, all of which rely on generative AI fundamentals of learning from experiences to generate and draw conclusions about itself and its surroundings.

AI models may include, but are not limited to, at least one machine learning model, neural network model, deep learning model, generative AI model, or any combination of models from the branches of AI. AI models are integral and core to future artificial intelligence models. As described herein, AI model refers to present-day AI models and future AI models.

Software service 140 (see FIGS. 1, 2A), executing on host platform 120 (see FIGS. 1, 2A) may provide one or more application programming interfaces (APIs) 220 that enable interaction with other software components via a set of data definitions and protocols. In some examples and features of the instant solution, the APIs provided may employ Simple Object Access Protocol (SOAP), Remote Procedure Calls (RPC), and Representational State Transfer (REST) techniques. In some examples and features of the instant solution, the plurality of APIs 220 send data to one or more decision subsystems 224 of the software service 140 to assist in decision-making. In some examples and features of the instant solution, the software service 140 stores data included in API requests or data generated during processing the API requests into one or more databases 150 (see FIGS. 1, 2A).

Software service 140 may provide one or more user interfaces (UIs) 222, such as a server-side hosted graphical user interface (GUI). In some examples and features of the instant solution, the UIs 222 provided employ template-based frameworks, component-based frameworks, etc. In some examples and features of the instant solution, these UIs 222 send data to one or more decision subsystems 224 of the software service 140 to assist with decision-making. In some examples and features of the instant solution, the software service 140 stores data included in UI requests or data generated during processing the UI requests into one or more databases 150.

Software service 140 may include one or more decision subsystems 224 that drive a decision-making process of the software service 140. In some examples and features of the instant solution, the decision subsystems 224 receive data from one or more APIs 220 as input into the decision-making process. In some examples and features of the instant solution, a decision subsystem 224 may receive data from one or more UIs 222 as input to the decision-making process. A decision subsystem 224 may gather service configuration or historical execution data from one or more databases 150 to aid in the decision-making process. A decision subsystem 224 may provide feedback to an API 220 or a UI 222.

An AI production system 230 may be used by a decision subsystem 224 in a software service 140 to assist in its decision-making process. The AI production system 230 includes one or more AI models 232 that are executed to generate a response, such as, but not limited to, a prediction, a categorization, a UI prompt, etc. In some examples and features of the instant solution, an AI production system 230 is hosted on a server. In some examples and features of the instant solution, the AI production system 230 is cloud-hosted. In some examples and features of the instant solution, the AI production system 230 is deployed in a distributed multi-node architecture.

An AI development system 240 creates one or more AI models 232. In some examples and features of the instant solution, the AI development system 240 utilizes data from one or more data sources 250 to develop and train one or more AI models 232. The data sources 250 may be local or third-party data sources. Further, the data provided by the data sources may be real-world or synthetic. In some examples and features of the instant solution, the AI development system 240 utilizes feedback data from one or more AI production systems 230 for new model development and/or existing model re-training. In some examples and features of the instant solution, the AI development system 240 resides and executes on a server. In some examples and features of the instant solution, the AI development system 240 is cloud hosted. In some examples and features of the instant solution, the AI development system 240 is deployed in a distributed multi-node architecture. In some examples and features of the instant solution, the AI development system 240 utilizes a distributed data pipeline/analytics engine.

Once an AI model 232 has been trained and validated in the AI development system 240, it may be stored in an AI model registry 260 for retrieval by either the AI development system 240 or by one or more AI production systems 230. The AI model registry 260 resides in a dedicated server in one example of the instant solution. In some examples and features of the instant solution, the AI model registry 260 is cloud-hosted. In some examples and features of the instant solution, the AI model registry 260 resides in the AI production system 230. In some examples and features of the instant solution, the AI model registry 260 is a distributed database.

Figure 2B:
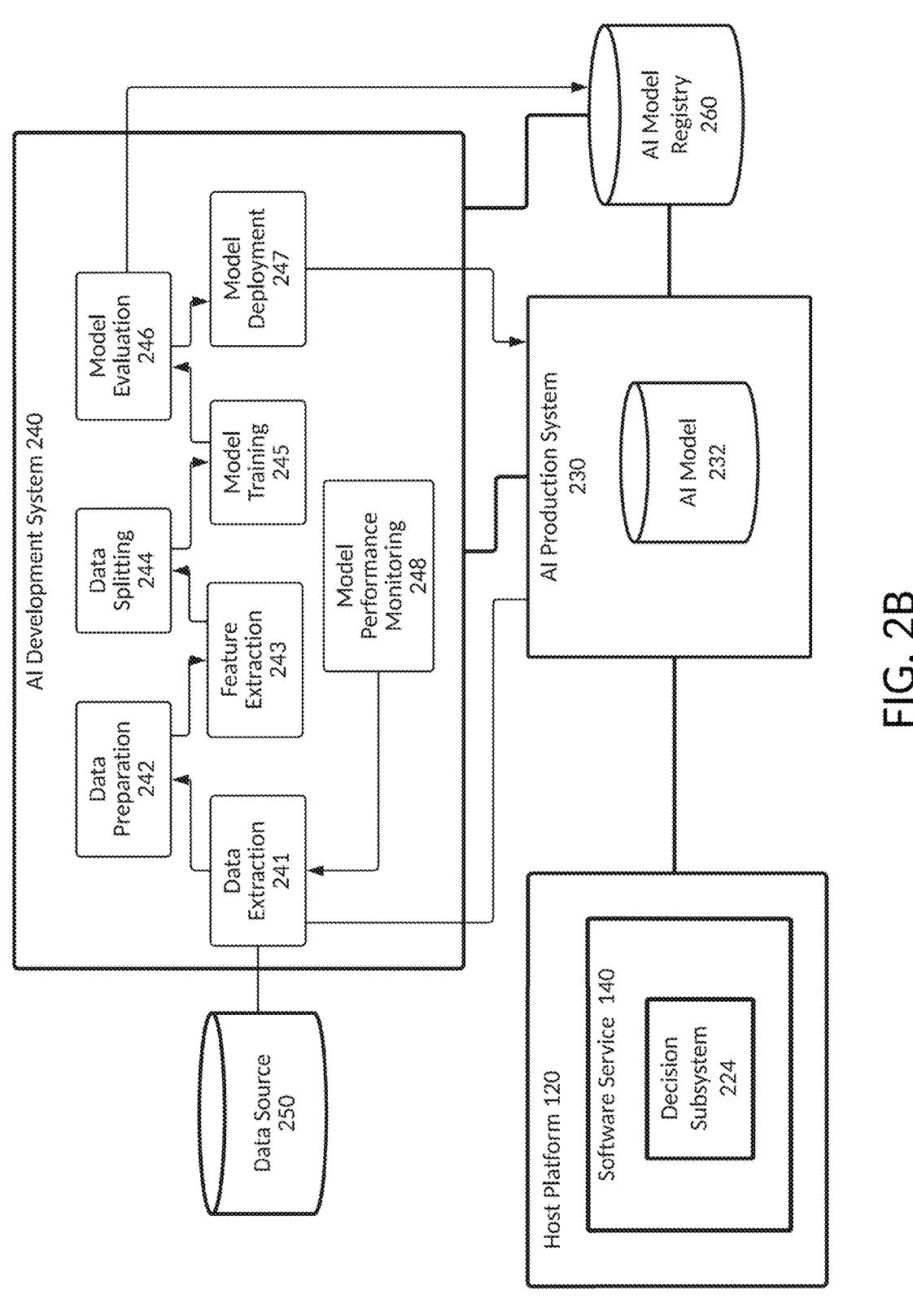
FIG. 2B is a diagram illustrating a process for developing an AI model that supports AI-assisted computer decision points according to the examples and features of the instant solution.

FIG. 2B illustrates a process 200B for developing one or more AI models that support AI-assisted decision points. An AI development system 240 executes steps to develop an AI model 232 that begins with data extraction 241, in which data is loaded and ingested from one or more data sources 250. In some examples and features of the instant solution, historical model feedback data is extracted from one or more AI production systems 230.

Once the data has been extracted during data extraction 241, it undergoes data preparation 242 for model training. In some examples and features of the instant solution, this step involves statistical testing of the data to see how well it reflects real-world events, its distribution, the variety of data in the dataset, etc., and the results of this statistical testing may lead to one or more data transformations being employed to normalize one or more values in the dataset. In some examples and features of the instant solution, data deemed to be noisy is cleaned. A noisy dataset includes values that do not contribute to the training, such as, but not limited to, null and long string values. Data preparation 242 may be a manual process or an automated process using one or more of the elements and/or functions described and/or depicted herein.

Features of the data are identified and extracted during the feature extraction step 243. In some examples and features of the instant solution, a feature of the data is internal to the prepared data from the data preparation step 242. In some examples and features of the instant solution, a feature of the data requires a piece of prepared data from the data preparation step 242 to be enriched by data from another data source to be useful in developing the AI model 232. In some examples and features of the instant solution, identifying features may be a manual process or an automated process using one or more of the elements and/or functions described and/or depicted herein. Once the features have been identified, the values of the features are collected into a dataset that will be used to develop the AI model 232.

The dataset output from the feature extraction step 243 is split 244 into a training and validation data set. The training data set is used to train the AI model 232, and the validation data set is used to evaluate the performance of the AI model 232 on unseen data.

The AI model 232 is trained and tuned 245 using the training data set from the data splitting step 244. In this step, the training data set is provided to an AI algorithm and an initial set of algorithm parameters. The performance of the AI model 232 is then tested within the AI development system 240 utilizing the validation data set from step 244. These steps may be repeated with adjustments to one or more algorithm parameters until the model's performance is acceptable based on various goals and/or results.

The AI model 232 is evaluated 246 in a staging environment (not shown) that resembles the target AI production system 230. This evaluation uses a validation dataset to ensure the performance in an AI production system 230 matches or exceeds expectations. In some examples and features of the instant solution, the validation dataset from step 244 is used. In some examples and features of the instant solution, one or more unseen validation datasets are used. In some examples and features of the instant solution, the staging environment is part of the AI development system 240, and the staging environment is managed separately from the AI development system 240. Once the AI model 232 has been validated, it is stored in an AI model registry 260, where it can be retrieved for deployment and future updates. In some examples and features of the instant solution, the model evaluation step 246 may be a manual process or an automated process using one or more of the elements and/or functions described and/or depicted herein.

In some examples and features of the instant solution, the AI development system includes a user interface (not shown). The user interface may be used to manage the development system infrastructure, the steps 241-248 within the development system, the interim data transmitted between the various steps 241-248, and the data sources 250.

Once an AI model 232 has been validated and published to an AI model registry 260, it may be deployed during the model deployment step 247 to one or more AI production systems 230. In some examples and features of the instant solution, the performance of deployed AI model 232 is monitored 248 by the AI development system 240. In some examples and features of the instant solution, AI model 232 feedback data is provided by the AI production system 230 to enable model performance monitoring 248, and the AI development system 240 periodically requests feedback data for model performance monitoring 248, which includes one or more triggers that result in the AI model 232 being updated by repeating steps 241-248 with updated data from one or more data sources 250.

Figure 2C:
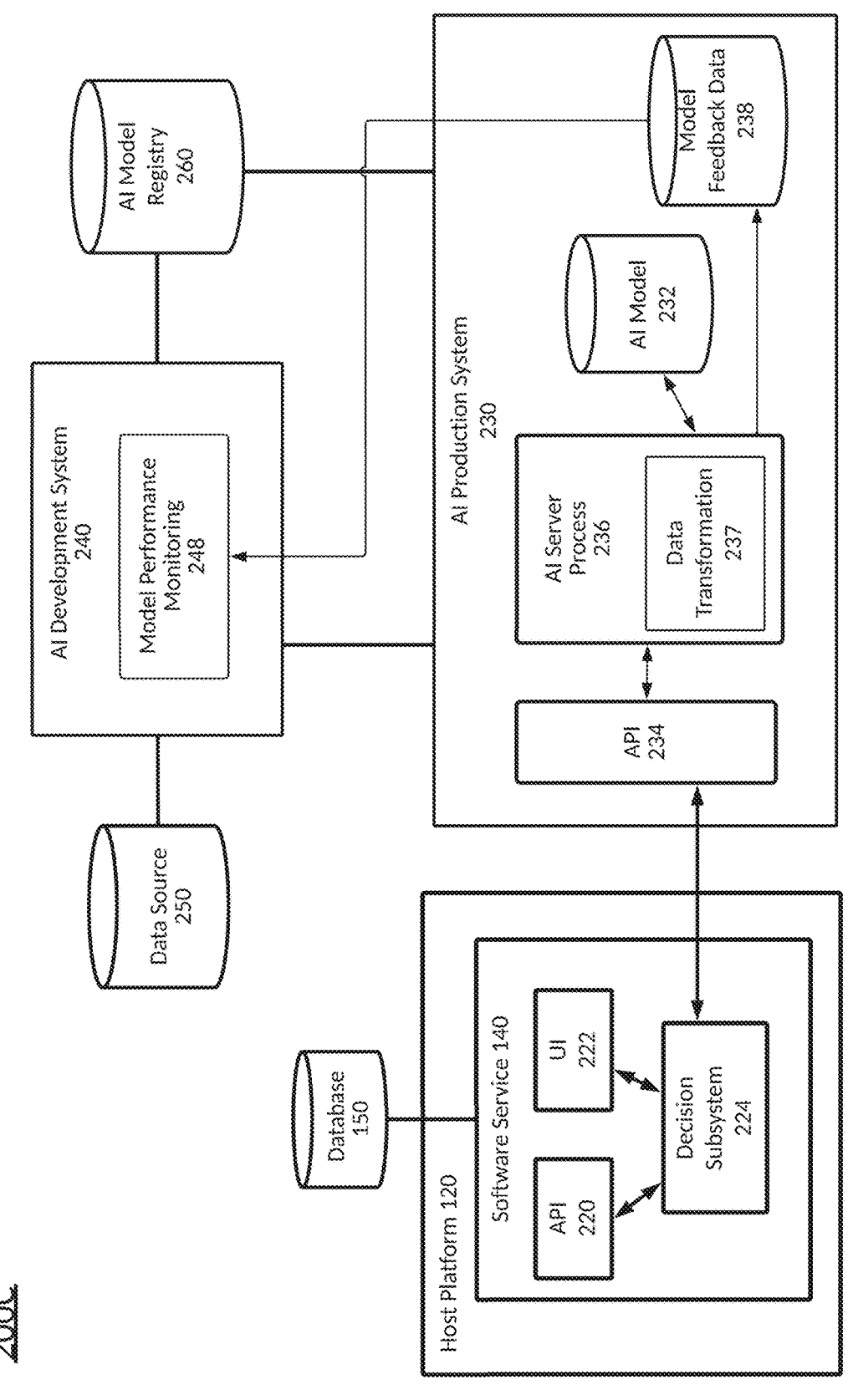
FIG. 2C is a diagram illustrating a process for utilizing an AI model that supports AI-assisted computer decision points according to examples and features of the instant solution.

FIG. 2C illustrates a process 200C for utilizing an AI model that supports AI-assisted decision points. As stated previously, the AI model utilization process depicted: herein reflects ML, which is a particular branch of AI, but this instant solution is not limited to ML and is not limited to any AI algorithm or combination of algorithms.

Referring to FIG. 2C, an AI production system 230 may be used by a decision subsystem 224 in software service 140 to assist in its decision-making process. The AI production system 230 provides an API 234, executed by an AI server process 236 through which requests can be made. In some examples and features of the instant solution, a request may include an AI model 232 identifier to be executed based on the type of request. In some examples and features of the instant solution, a data payload (e.g., to be input to the AI model during execution) is included in the request. The data payload may include API 220 data from software service 140, UI 222 data from software service 140 or data from other software service 140 subsystems (not shown).

Upon receiving the API 234 request, the AI server process 236 may transform 237 the data payload or portions of the data payload to be valid feature values in an AI model 232. Data transformation 237 may include, but is not limited to, combining data values, normalizing data values, and enriching the incoming data with data from other data sources 250. Once the data transformation occurs, the AI server process 236 executes the appropriate AI model 232 using the transformed input data. Upon receiving the execution result, the AI server process 236 responds to the API requester, which is a decision subsystem 224 of software service 140. In some examples and features of the instant solution, the response may result in an update to a UI 222 in software service 140. In some examples and features of the instant solution, the response includes a request identifier that can be used later by the software service 140 to provide feedback on the performance of the AI model 232. In some examples and features of the instant solution, a model feedback record may be added into a model feedback data 238 by the AI server process 236.

In some examples and features of the instant solution, the API 234 includes an interface to provide AI model 232 feedback after an AI model 232 execution response has been processed. This mechanism enables the requester to provide feedback on the accuracy of the AI model 232 results. In some examples and features of the instant solution, the feedback interface includes the identifier of the initial request so that it can be used to associate the feedback with the request. Upon receiving a call into the feedback interface of the API 234, the AI server process 236 creates and adds a model feedback record into the model feedback data 238 which holds historical model feedback records. In some examples and features of the instant solution, the records in this model feedback data 238 are provided to model performance monitoring 248 in the AI development system 240. This model feedback data is streamed to the AI development system 240 or may be provided upon request. In some examples and features of the instant solution, the model feedback records in the model feedback data 238 are used as an input for retraining the AI model 232.

In some examples and features of the instant solution, the AI production system 230 includes a user interface (not shown). The user interface may be used to manage the production system infrastructure, the components of the production system 230-238, and the operation of the AI production system and its components.

Figure 3:
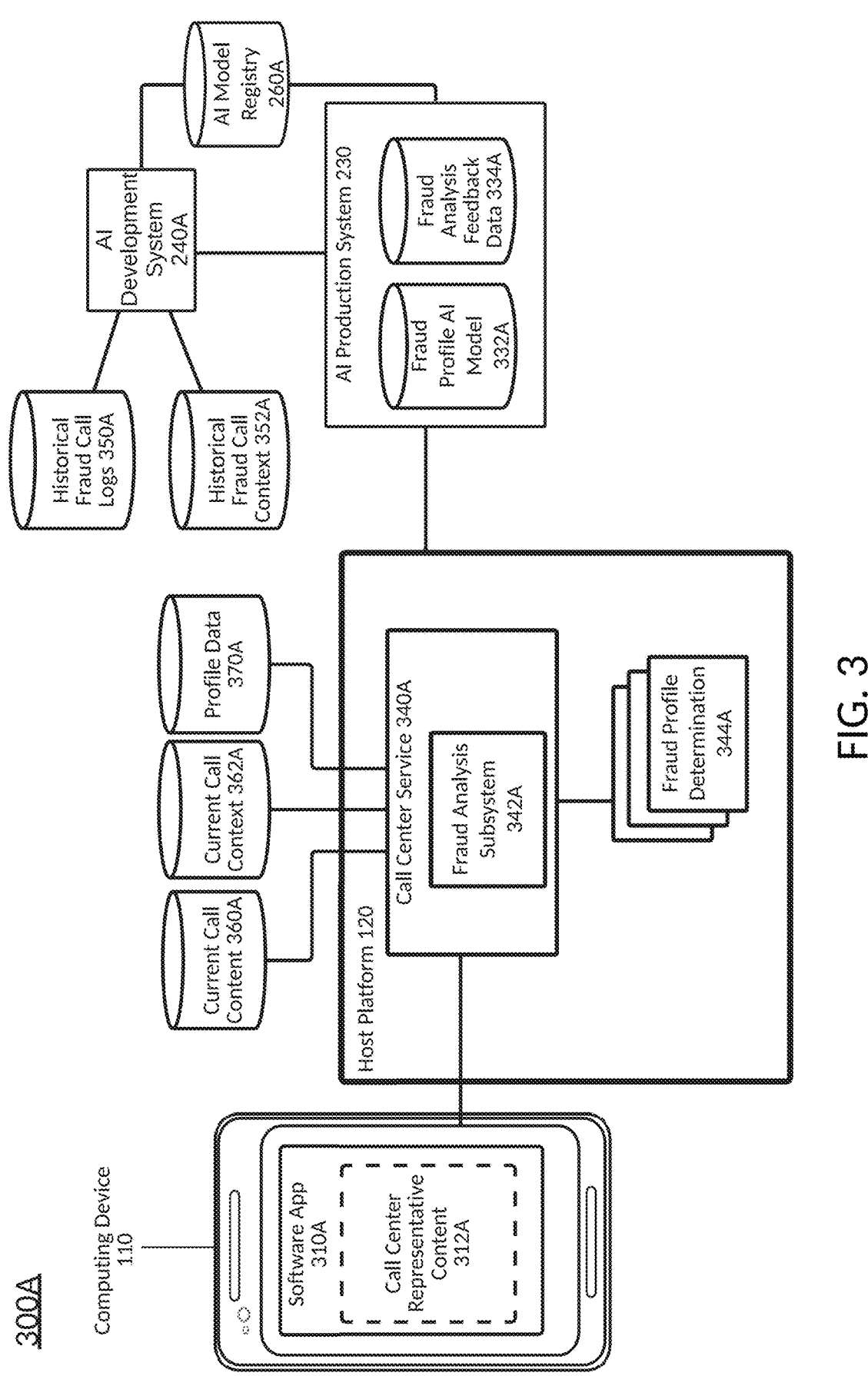
FIG. 3 is a system diagram illustrating an operating environment for a contact center service, according to examples and features of the instant solution.

FIG. 3 is a system diagram illustrating an operating environment 300A for a call center service that determines a fraud profile of a caller and performs an action during a communication session with the caller according to examples and features of the instant solution. In operating environment 300A, an AI model is trained to predict a fraud profile of a caller using content from a current call, context from a current call, and profile data of the caller which may include previous calls and transactions.

Referring to FIG. 3, in some examples and features of the instant solution, a fraud profile AI model 332A is trained using historical fraud call logs 350A, historical fraud call context 352A, and fraud analysis feedback data 334A to generate a fraud profile of a caller given a set of feature data transformed from at least one of a communication session, a profile, and context from a device. The fraud profile AI model 332A is an example of AI model 232 (see, for example, FIGS. 2A-2C). The fraud analysis feedback data 334A is an example of model feedback data 238 (see, for example, FIG. 2C). The historical fraud call logs 350A and the historical fraud call context data 352A are examples of data source 250 (see, for example, FIGS. 2A-2C). The current call content 360A, current call context 362A, and profile data 370A are examples of database 150 (see, for example, FIG. 1, 2A, 2C). The call center service 340A is an example of software service 140 (see, for example, FIG. 1, 2A-2C). The fraud analysis subsystem 342A is an example of decision subsystem 224 (see, for example, FIGS. 2A-2C). The software app 310A is an example of service client 160 of computing device 110 (see, for example, FIG. 1, 2A-2C).

In some examples and features of the instant solution, the fraud profile AI model 332A is trained using one or more neural network training methods such as, but not limited to, gradient descent, stochastic gradient descent, random search, uniform search, basin hopping, and Krylov. In some examples and features of the instant solution, the fraud profile AI model 332A is a single or multi-layer perceptron neural network, a feed-forward neural network, a radial basis functional neural network, a recurrent neural network, or a modular neural network.

In some examples and features of the instant solution, the fraud profile AI model 332A may include, but is not limited to, at least one of a machine learning model, a deep learning model, a neural network, any combination of models from the branches of AI, and the like, and it may be trained using at least one of the respective training methods for machine learning models, deep learning models, neural networks, any combination of models from the branches of AI, and the like. In some examples and features of the instant solution, the training data may include, but is not limited to, at least one of historical fraud call logs, historical fraudulent transaction behavior, context of devices that performed fraud, model feedback data, and the like. In some examples and features of the instant solution, the training data for the fraud profile AI model 332A may include, but is not limited to, internal data sources, external data sources, private data sources, public data sources, account data, third party data, configuration data, or the like.

In some examples and features of the instant solution, the fraud call log data may include but is not limited to call logs with users that are subsequently determined to be conducting fraud, call logs of fraudulent transactions performed through a call center, and the like. The fraud call context data may include, but is not limited to, device data such as media access control (MAC) addresses of a computing device that conducted fraud, internet protocol (IP) addresses of one or more computing devices that conducted fraud, geographic location data of a device that conducted fraud, and the like. The model feedback records in the fraud analysis feedback data 334A may include, but is not limited to, an indicator of whether the predicted fraud profile is correct. In some examples and features of the instant solution, the generated fraud profile may be a numerical value within a given numerical range, a finite set of categories, etc. Once the fraud profile AI model 332A is trained and validated, it is deployed to an AI production system 230 (see, for example, FIGS. 2A-2C, 3) for use by a call center service 340A. The call center service 340A is an example of software service 140 (see, for example, FIG. 1, 2A-2C).

In some examples and features of the instant solution, during a communication session such as a call between a customer and a call center representative, a bot, both, and the like, call content of a service client 160 (see FIG. 1) associated with a software application are logged. The software app 310A, running on computing device 110, is an example of service client 160 (see FIG. 1). In some examples and features of the instant solution, when requesting a transaction, a caller may use a source device (not shown) to call a call center representative. In this example, the call center representative is using the computing device 110 as shown in FIG. 3.

The call center representative may be presented with instructions, detailed questions, verification requests for the caller, and the like, which may be presented with options on a display (GUI) of the computing device 110. The instructions may include verification questions to ask the customer on the other end of the communication session such as identification data, employment history, income, previous purchases, etc. The call center representative may receive answers from the caller and input the answers into fields of the software app 310A. Here, the data is collected and may be sent to the call center service 340A. In addition, as speech is conducted during the call/communication session between the customer and the call center, the speech may be converted to text and sent to the call center service 340A.

In some examples and features of the instant solution, the call center service 340A receives call content from the computing device 110. The call content may include but is not limited to, speech spoken by the customer, speech spoken by the call center representative, device information of the caller, etc. The speech may include identification information of the customer, account information of the customer, transaction content being requested, additional statements made by the customer that are not specific to a transaction, and the like. The call center service 340A receives the call content from the computing device 110. Also, device data from a source device of the caller (not shown) may be received and may include, but is not limited to, the media access control (MAC) address and the source internet protocol (IP) address of the source device. Once a set of required data for fraud profile prediction is received, a fraud analysis subsystem 342A of the call center service 340A initiates fraud profile determination request for the fraud profile AI model 332A resident on the AI production system 230 (see, for example, FIGS. 2A-2C, 3), supplying the set of required data. In some examples and features of the instant solution, the call center service 340A may continue to receive and process data from the communication session with the computing device 110 in parallel to the fraud profile being generated.

In some examples and features of the instant solution, upon receiving the request, the AI production system 230 (see FIGS. 2A-2C, 3) transforms 237 (see FIG. 2C) the set of required data into a set of valid feature values in the fraud profile AI model 332A. The fraud profile AI model 332A is then executed with the transformed data, the result of which is a fraud indicator such as a score, a category, or the like. In some examples and features of the instant solution, the fraud indicator is returned in a response to the fraud analysis subsystem 342A of the call center service 340A. In some examples and features of the instant solution, the response includes a request identifier that can be used by the call center service 340A to correlate feedback from a call center representative or someone subsequently reviewing the call, etc. and to provide feedback on the performance of the fraud profile AI model 332A.

In some examples and features of the instant solution, upon receiving the response, the fraud analysis subsystem 342A determines at least one fraud profile determination

344A to be performed and in parallel the call center service 340A may continue to receive and process data from the call content 312A. In some examples and features of the instant solution, the fraud analysis subsystem 342A utilizes a set of rules defined in the current call content 360A to determine the at least one fraud profile determination 344A to be performed. The current call content 360A may be stored in a data store such as database 150 depicted in FIG. 1. In some examples and features of the instant solution, rules are identified using fraud level numeric ranges. In some examples and features of the instant solution, rules are identified using a finite set of fraud categories.

In some examples and features of the instant solution, the one or more fraud profile determinations 344A are initiated. In some examples and features of the instant solution, the fraud profile determination 344A utilizes current call context 362A to validate the caller's identity. This data may be associated with the caller, or persons related to the caller (such as a person associated with the caller on a joint account). In some examples and features of the instant solution, the fraud profile determination 344A utilizes profile data 370A that may include, but is not limited to, identity data, property records, financial account data, transaction history, and credit reporting data.

In some examples and features of the instant solution, after all of the at least one fraud profile determinations 344A are completed, a GUI of the computing device 110 being used by the call center representative may be updated with a fraud profile indicator that is displayed to reflect a final result of the at least one fraud profile determinations 344A. In some examples and features of the instant solution, the GUI is updated upon receipt of the next checkpoint of call content data. In some examples and features of the instant solution, the GUI is updated when the final result of the at least one fraud profile determination 344A is determined.

In some examples and features of the instant solution, all of the at least one fraud profile determinations 344A must be successful in order for the final result to be considered successful. In some examples and features of the instant solution, a fraud profile determination 344A is considered incomplete when a technical issue prevents its timely completion and an incomplete fraud profile/fraud indicator results in a failed final result. In some examples and features of the instant solution, an incomplete fraud profile determination 344A does not impact the final result when a minimum number of the at least one fraud profile determination 344A completes successfully.

Figure 4A:
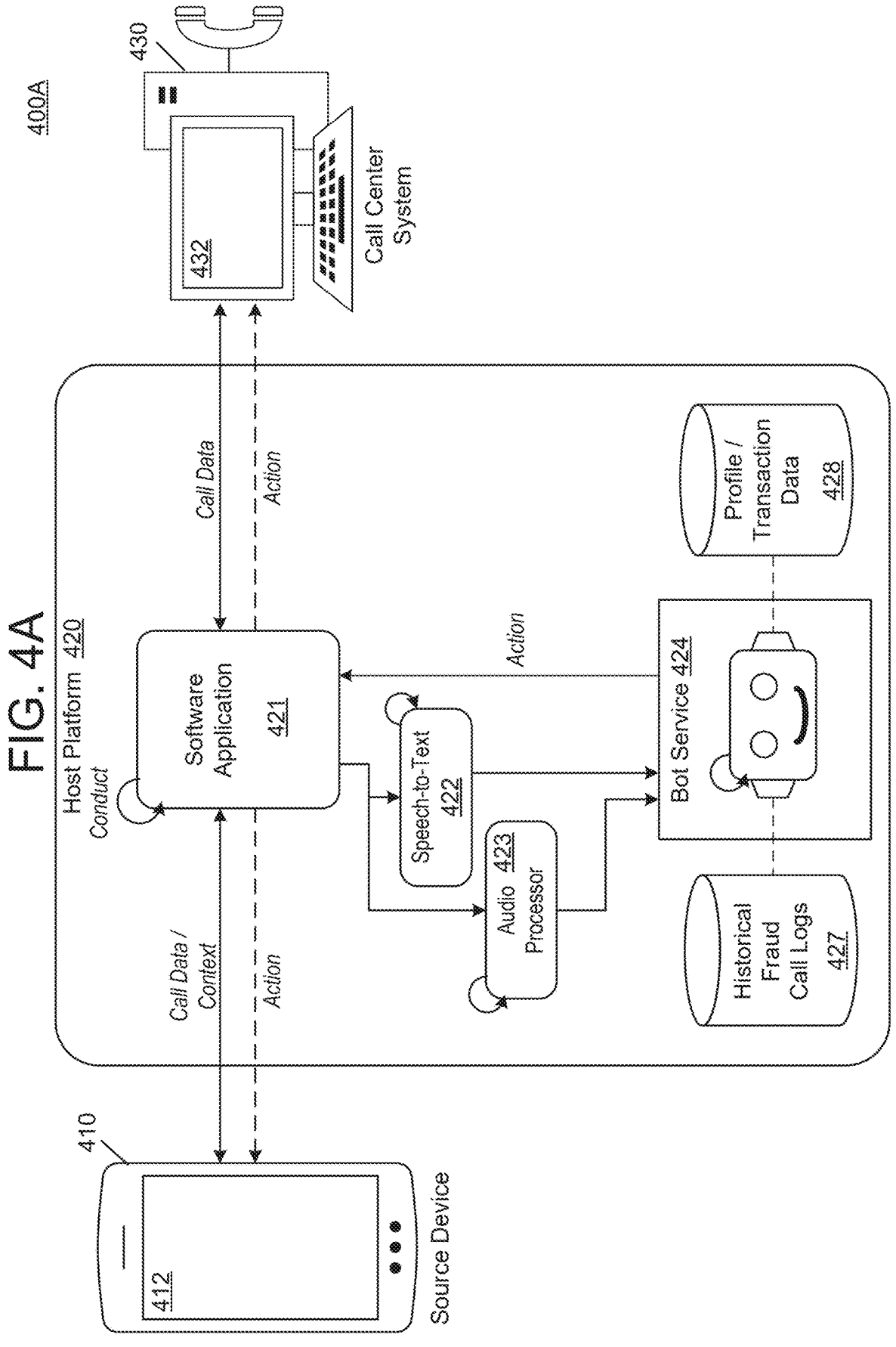
FIG. 4A is a diagram illustrating an AI architecture for generating actions during a communication session based on a fraud profile generated during the communication session according to examples and features of the instant solution.

FIG. 4A illustrates an AI architecture 400A for generating actions during a communication session based on a fraud profile generated during a communication session according to examples and features of the instant solution. Referring to FIG. 4A, in some examples and features of the instant solution, the host platform 420 is an example of a combination of host platform 120 and AI production system 230 (see, for example, FIGS. 2A-2C, FIG. 3). The software application 421 is an example of call center service 340A (see, for example, FIG. 3). The bot service 424 is an example of another software service 140 (see, for example, FIG. 1, 2A-2C) that executes AI models deployed in an AI production system 230, such as a fraud profile AI model 332A (see, for example, FIG. 3) or other AI models 232 (see, for example, FIG. 2A-2C). The source device 410 and device of the call center system 430 are examples of computing device 110, and the GUIs 412 and 432 are examples of a user interface of the service client 160 (see, for example, FIG. 1, 2A-2C) running on the computing devices. Historical fraud call logs 427 and profile/transaction data 428 are examples of databases 150 (see, for example FIG. 1, 2A, 2C).

Referring to FIG. 4A, a source device 410 may initiate a communication session with a call center by calling a phone number, using a mobile application, using a web application, or the like. Here, the source device 410 may connect to a host platform 420 via a cellular network, wireless data network, telephone network, or the like. In response, the host platform 420 may manage the call through a software application 421 hosted by the host platform. Here, the call may be assigned to a call center representative that is using the call center system 430. A communication session may occur between the source device 410 and the call center system 430 through the software application 421. The communication session may include audio being spoken, responses being entered via a GUI, chat being performed via a GUI, and the like.

According to various examples and features of the instant solution, the software application 421 may capture audio content from the communication session and send it to a bot service 424. As another example, context of the source device 410 may be captured by the software application 421 and provided to the bot service 424. As an example, the software application 421 may capture a MAC address of the source device 410, an IP address of the source device 410, a geographic location of the source device 410, or the like.

Before being provided to the bot service 424, the audio may be processed using a speech-to-text converter 422 which converts the audio into text/transcript. In addition, the audio may be processed by an audio processor 423. The audio processor 423 may identify a tone of the conversation, for example, a tone of the customer who is on the other end of the communication session with respect to the call center representative. As another example, the audio processor 423 may identify background noise (e.g., public place, traffic sounds, extraneous speech, equipment, alarms, environmental noises, etc.) The text, the background noise, and/or the tone identified from the communication session may be submitted to the bot service 424.

According to various examples and features of the instant solution, the bot service 424 may determine an action to perform during the communication session based on the content from the communication session, the background noise, and/or the tone of the communication session. For example, the bot service 424 may include one or more AI models which can determine a fraud profile of the caller based on the content from the communication session and/or the tone. For example, the one or more AI models may receive historical fraud call logs 427 from previous communication sessions with users who are determined to have performed or otherwise been involved in fraudulent activity. The one or more AI models may also receive data from a profile associated with the caller (such as the caller's profile, a family member's profile, a similar user's profile, or the like) and generate a fraud profile of the caller based on the received data and the communication session between the caller on the source device 410 and the call center service representative on the call center system 430.

As an example, the caller may be attempting to perform a fraudulent transaction over the phone. The fraudulent transaction may be requested by the caller. Here, the software application 421 may receive the audio (including the request) and transmit the audio to the bot service 424. The audio may be processed by the speech-to-text converter 422 and/or the audio processor 423 to identify the content of the call and/or the tone of the call. As another example, context from the source device 410 may be captured by the software application 421 and transmitted to the bot service 424. The bot service 424 may also retrieve historical fraud call logs from a data store 427 and/or receive profile/transaction data from a data store 428. The bot service 424 may execute one or more AI models on the call content, the tone, the context, the historical call logs, the profile data, and the like.

In this example, the bot service 424 may generate an action to be performed during the communication session and output the action to the software application 421. The software application 421 may then output the action to one or more of a GUI 412 of the source device and a GUI 432 of the call center system 430. Here, the action may be a verification to be performed, such as a question to be asked of the caller by the call center representative. As another example, the action may be a request for the caller to enter verification information, biometric information, a password, an answer, or the like via the GUI 412 of the source device 410. The action may include a graphical element which is shown on the GUI 412, and which requires input of some kind by the caller on the GUI 412.

In some examples and features of the instant solution, the action may include a question that is to be asked by the call center representative to the caller. The question may be displayed on the GUI 432 of the call center system 430. In addition to the question being displayed on the GUI 432, the software application 421 may also output a text box with an entry field for the call center representative to enter the answer provided by the caller during the communication session. For example, the software application 421 may generate a custom instruction for the caller which asks the caller about a particular shopping experience on a particular day based on transaction history of the caller. The caller may provide the answer over the phone and the call center representative may input the answer into a text box displayed on the GUI 432 of the call center system 430. The software application 421 may verify the answer input by the call center representative and display information about whether the answer is correct or not on the GUI 432.

Figure 4B:
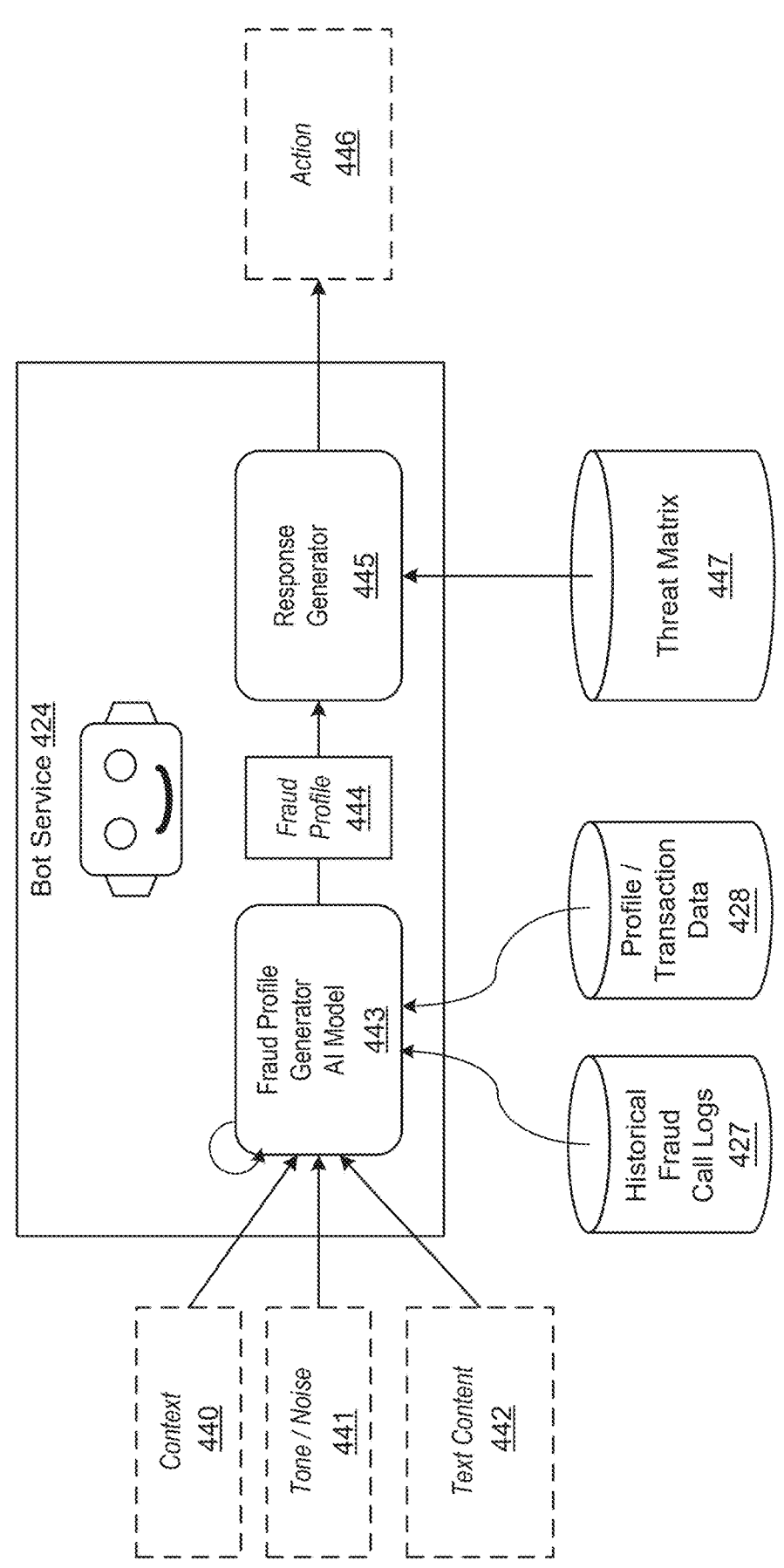

FIG. 4B illustrates a process 400B performed by the bot service 424 in more detail according to examples and features of the instant solution. Referring to FIG. 4B, in some examples and features of the instant solution, the bot service 424 is an example of another software service 140 (see, for example, FIG. 1, 2A-2C) that executes AI models deployed in an AI production system 230. Fraud profile generator AI model 443 is an example of AI model 232 (see, for example, FIG. 2A-2C). Historical fraud call logs 427, profile/transaction data 428, and threat matrix 447 are examples of databases 150 (see, for example FIG. 1, 2A, 2C).

Referring to FIG. 4B, the bot service 424 includes a fraud profile generator AI model 443 and a response generator module 445. Here, the fraud profile generator AI model 443 may be configured to generate a fraud profile 444 based on input content from one or more of the communication session, historical fraud call logs 427, profile/transaction data 428, and the like. In this example, the fraud profile generator AI model 443 may receive at least one context 440 from the source device 410, tone/noise 441 determined by the audio processor 423 of the communication session, and text content 442 determined by the speech-to-text converter 422 from the communication session as inputs and may generate a fraud profile 444. The fraud profile 444 may include an indicator of how likely that the call is associated with fraud. The indicator may include a score generated by the fraud profile generator AI model 443, for example, a score out of 100. As another example, the indicator may include a binary decision (Yes or No) of whether the call involves fraud, or the like.

The output of the fraud profile generator AI model 443 may be fed to the response generator module 445 and may include the fraud profile 444. The response generator module 445 may generate an action 446 to be performed by at least one of the caller and the call center representative during the communication session. Here, the response generator module 445 may include one or more AI models as well. As another example, the response generator module 445 may include a set of rules that enable the response generator to match the fraud score to a particular type of verification action or the like. In some examples and features of the instant solution, the response generator module 445 may query a threat matrix 447 based on a channel of communication (e.g., call, web, in-person, etc.) and a fraud profile to receive an action to be performed.

FIG. 4C illustrates a process 400C of the response generator module 445 generating an action to be performed during the call. Referring to FIG. 4C, in some examples and features of the instant solution, the response generator 445 is an example of another software service 140 (see, for example, FIG. 1, 2A-2C) that executes AI model 450, deployed in an AI production system 230, (see, for example, FIG. 3). AI model 450 is an example of AI model 232 (see, for example, FIG. 2A-2C). Previous verifications 454 and threat matrix 447 are examples of databases 150 (see, for example FIG. 1, 2A, 2C).

In this example, the response generator module 445 includes an artificial intelligence model 450 (such as a generative AI model) which can generate an action to perform based on the fraud profile 444, the threat matrix 447, and the like. In addition, the AI model 450 may receive one or more previous verifications 454 performed in other calls/communication sessions from a data store and use them to generate the action 446 to be performed.

The threat matrix 447 may include a matrix with a first dimension including a plurality of rows corresponding to a plurality of different communication channels, and a plurality of actions assigned to a plurality of columns of a second dimension of the matrix. The plurality of rows and the plurality of columns create a matrix of cells 448 within the threat matrix 447. Each cell corresponds to a respective pairing between an action and a communication channel. The cells 448 inside the matrix may include markings or other indicators which identify whether a certain verification action is available for a particular communication channel. Here, the AI model 450 may ingest the threat matrix 447 along with the fraud profile 444 and an identifier of the communication channel 452 (e.g., web/mobile, phone, in-person, etc.) and generate the action 446 based on the input. In addition, the AI model 450 may ingest historical verification actions performed in other communication sessions.

Figure 5A:
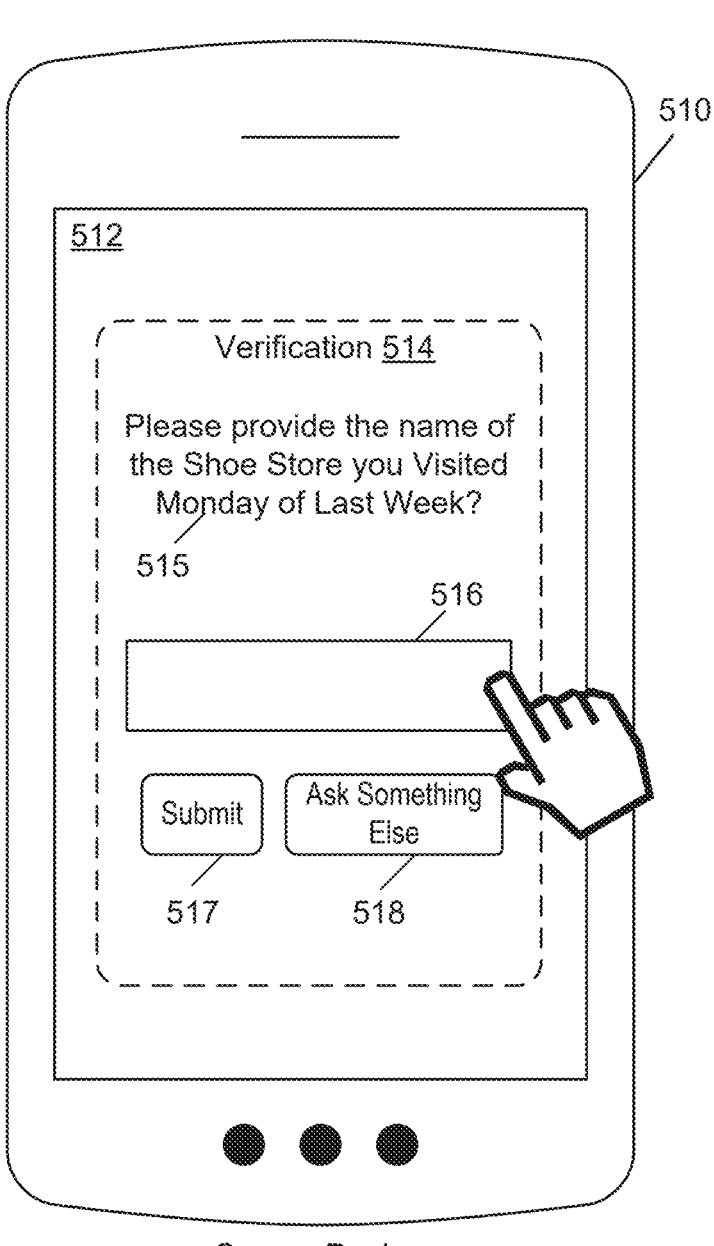
FIG. 5A is a diagram illustrating a process of generating and display a verification request on a source device according to examples and features of the instant solution.
Figure 5B:
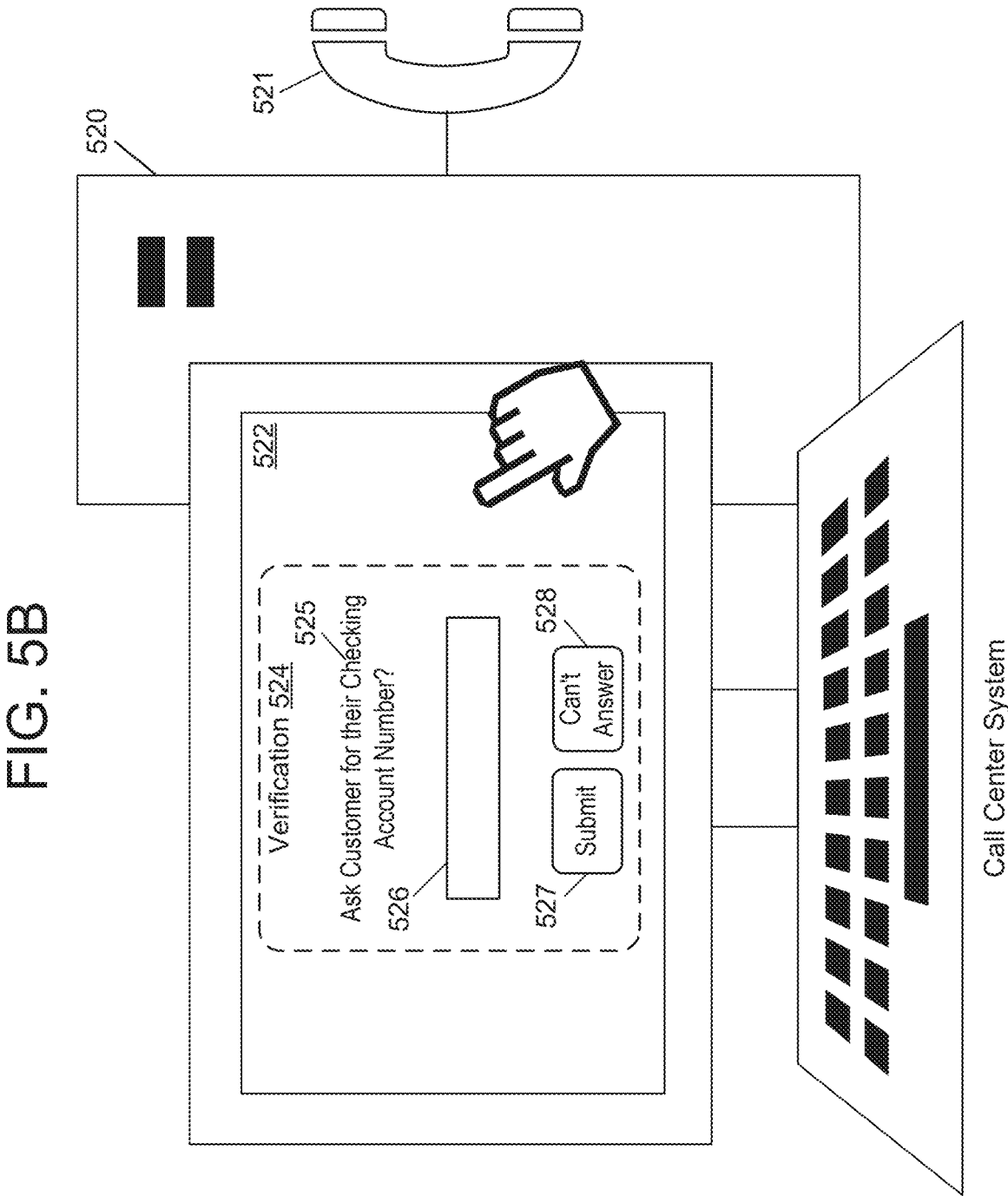
FIG. 5B is a diagram illustrating a process of generating and displaying a custom instruction on a contact center device according to examples and features of the instant solution.

FIG. 5A illustrates a process 500A of generating and display a verification request on a source device according to examples and features of the instant solution, and FIG. 5B illustrates a process 500B of generating and displaying a custom instruction on a call center device according to examples and features of the instant solution. For example, FIGS. 5A and 5B illustrate examples of verification actions that can be displayed on GUIs of a source device 510 (FIG. 5A) of a caller/customer and on a call center system 520 (FIG. 5B) by a software application of a host platform, such as the software application 421 shown in FIG. 4A.

Referring to FIG. 5A, the software application may display a verification action 514 on a GUI 512 of the source device 510 during a communication session between the source device 510 and a call center representative on the call center system 520 shown in FIG. 5B. In addition, the software application may display a verification action 524 on a GUI 522 of the call center system 520 during the communication session between the source device 510 and the call center system 520. In some examples and features of the instant solution, the verification action 514 and the verification action 524 may be displayed simultaneously on the GUI 512 of the source device 510 and the GUI 522 of the call center system 520 by the software application.

Referring to FIGS. 5A and 5B, in some examples and features of the instant solution, the source device 510 and device of the call center system 520 are examples of computing device 110, and the GUIs 512 and 522 are examples of a user interface of the service client 160 (see, for example, FIG. 1, 2A-2C) running on the computing devices.

In the example of FIG. 5A, the verification 514 includes a customer verification action that is based on transaction history of the caller which may be identified from a profile associated with the caller (or who the caller purports to be). In this case, the verification action 514 asks the caller to verify a merchant location that was visited on a particular day (e.g., Monday of last week, etc.). Here, the software application outputs a description of a question 515 and an input box 516 for the caller to provide an answer. The caller may use a keypad, touch pad, voice activation, etc. to provide an answer into the input box 516. When finished, the caller may press a "submit" button 517 which submits the verification answer to the software application on the host platform.

When the caller does not know the answer, they can press a "ask something else" button 518 which requests an additional verification question. In some examples and features of the instant solution, the software application may include a timing mechanism which requires the caller/user to submit a response within a predetermined period of time, otherwise the answer is determined to be incorrect.

When the caller answers the question correctly, the software application may provide one or more additional verification actions based on the instructions from the AI model included in the bot service. As another example, the software application may proceed with whatever transaction (or other service) the caller is requesting without any additional verification actions. However, when the caller answers the question incorrectly or does not know the correct answer, the software application may initiate an additional verification. As another example, the software application may flag the account and terminate the communication session. Here, the account may be suspended or otherwise may enter a mode where the account holder must verify their identity in a subsequent communication session such as a call, an in-person visit, a mobile application input, or the like.

Referring now to FIG. 5B, the verification action 524 may include a question 525 that the call center representative is to ask the caller during the communication session. In addition, the verification action 524 may include an input box 526 where the call center representative can input the answer received from the caller. Here, the call center representative may ask the caller the question during the communication session, for example, by speaking the question through a telephone 521. In response, the caller may provide the answer (e.g., speak the answer) during the communication session and the call center representative may input the answer into the input box 526 using a keypad, touch pad, etc. The call center representative may press a "submit" button 527 to submit the answer provided from the caller or press a "can't answer" button 528.

When the caller answers the question correctly, the software application may provide one or more additional verification actions to the call center representative by displaying the one or more additional verification actions on the GUI 522 output from the AI model included in the bot service. As another example, the software application may proceed with whatever transaction (or other service) the caller is requesting without any additional verification actions. As another example, when the caller answers the question incorrectly or does not know the correct answer, the software application may flag the account and terminate the communication session. Here, the account may be suspended or otherwise may enter a mode where the account holder must verify their identity in a subsequent communication session such as a call, an in-person visit, a mobile application input, or the like.

Figure 6:
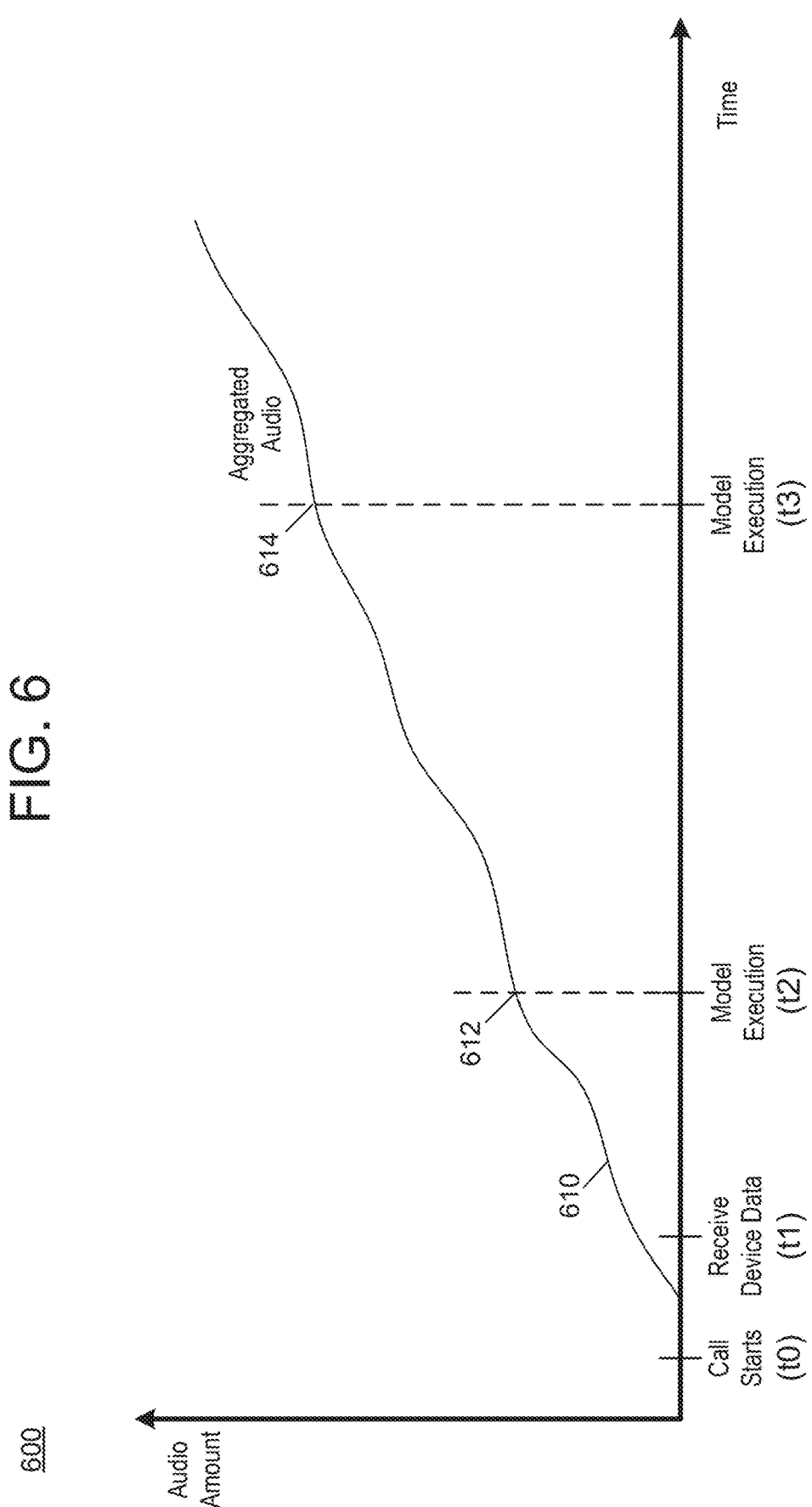
FIG. 6 is a timing diagram illustrating points in time within a communication sequence when an AI model is executed according to examples and features of the instant solution.

FIG. 6 illustrates a timing diagram 600 with points in time within a communication sequence when an AI model is executed according to examples and features of the instant solution. For example, FIG. 6 illustrates points in time during a communication session in which the fraud profile generator AI model 443 (shown in FIG. 4B) may be executed based on the conversation content, the tone, the context, etc. of the communication session/source device. In particular, the Y-axis in FIG. 6 represents an amount of audio that has been accumulated/recorded during the communication session, and the X-axis represents a point in time in the communication session. Meanwhile, the aggregated audio 610 line represents the audio aggregation amount.

In this example, the communication session starts at a point in time (t0). This refers to the point in time when the source device and the call center system connect for the telephone call. Shortly thereafter, communication content is spoken, and audio is detected and captured/recorded by a software application (such as the software application 421 shown in FIG. 4A). In addition, at a point in time (t1), context associated with the source device is received by the software application. The context may include a device IP address, a MAC address, a cookies file, GPS coordinates, and/or the like which are captured by the source device and provided to the software application 421.

According to various examples and features of the instant solution, the software may trigger execution of the AI model at a first point in time (t2). The first execution of the AI model may be based on the aggregated audio from the call at the first point in time (t2). Here, a first amount of aggregated audio 612 has been recorded and is input to the AI model. The system may also determine a tone of the conversation at the first point in time (t2). As another example, the software application may also receive context from the source device.

As such, the AI model may generate a fraud profile based on the conversation up to the first point in time, the context from the source device, the tone, etc. and the bot service may generate an action based on the content up to the first point in time. In some cases, this action may be based solely on the context from the device because not enough conversation content has been received. It should also be appreciated that the software application may continually run in the background of the communication session and attempt to identify keywords, for example, "payment", "transaction", "charge", "new payment card", "loan application", "checking account", "savings account", "credit card", etc. When one of these keywords is detected, the software application may trigger the bot service to determine if a verification action is the next step.

In the example of FIG. 6, the software application triggers execution of the AI model at a second point in time (t3) which is later than the first point in time (t2) in which the AI model is executed. Here, the software application may request the bot service to generate/predict a fraud profile of the caller and generate an action, if applicable. In this case, a second amount of audio 614 has been recorded and may be input into the AI model. Here, the second point in time (t3) is later in time, and later in the conversation, than the first point in time (t2). As a result, more audio is now available and can be considered by the AI model when determining the action to perform.

In some examples and features of the instant solution, the system may determine a tone of the conversation at the second point in time (t3). Furthermore, the AI model may generate a fraud profile based on the second amount of audio 614 aggregated from the conversation, the current tone of the conversation at (t3), the device context, and the like. Here, the second action may be more refined because more data is being input to the AI model. This same process may be iteratively repeated during the conversation each time the caller makes an additional request.

In some examples and features of the instant solution, the host platform described herein may also identify potential fraudulent behavior using transaction histories, features, and the like, of different customers and other users. For example, FIGS. 7A-7E depict a process of limiting transaction behavior of a profile based on a similar profile according to examples and features of the instant solution. Here, a user profile may be retrieved from a database, and analyzed to determine if the user profile is similar to known categories of users that commit fraud. In some cases, the process may use one or more AI models to analyze the profile data/behavior and categorize potentially fraudulent users without the user entering into a transaction or conducting a phone call.

Figure 7A:
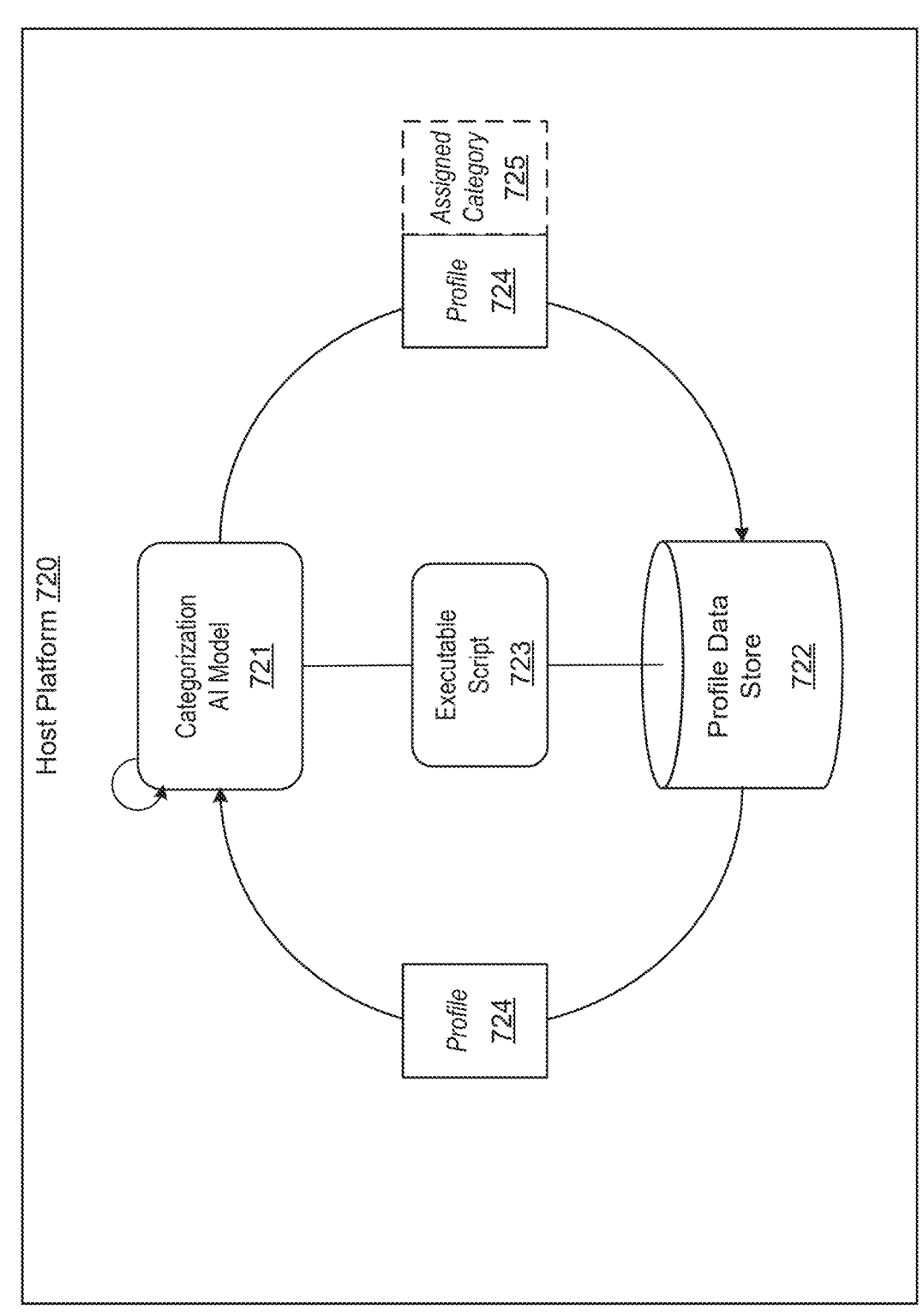

For example, FIG. 7A illustrates a process 700A of assigning a category to a profile 724 from among a plurality of different categories of users/profiles according to examples and features of the instant solution. Here, the categories may identify whether the profile is a risk of fraud or not. For example, some of the categories may be related to fraud while other categories do not. The categories may be based on artificial intelligence. For example, a categorization AI model 721 may be hosted by a host platform 720 and may be trained to categorize a profile as a potential for fraud.

Referring to FIG. 7A, in some examples and features of the instant solution, the host platform 720 is an example of a combination of host platform 120 and AI production system 230 (see, for example, FIGS. 2A-2C, FIG. 3). The categorization AI model 721 is an example of AI model 232 (see, for example, FIG. 2A-2C). Profile data store 722 is an example of database 150 (see, for example FIG. 1, 2A, 2C).

In this example, an executable script 723 may be executed by the host platform 720 and may retrieve a profile 724 from a profile data store 722. The executable script 723 may perform this process in an automated manner based on a schedule, or the like, which includes instructions on which profiles to analyze, etc. Here, the executable script 723 retrieves the profile 724 from the profile data store 722 and provides the profile 724 as an input to the categorization AI model 721. For example, the executable script 723 may transmit the profile 724 to an API of the categorization AI model 721. The profile 724 may be associated with a user/user account and may include user attributes (e.g., name, age, address, sex, education, nationality, ethnicity, etc.) of the user. In addition, the profile 724 may include a transaction history of the account such as payments, withdrawals, types of spending, an age of the account, an account balance, any past due amounts, etc.

Here, the categorization AI model 721 may receive the profile 724 (e.g., via an API call of the AI model 721) and determine a category 725 of the profile 724 based on the content within the profile. Here, the category 725 may be assigned to the profile 724 and stored again in the profile data store 722. Prior to inputting the profile to the categorization AI model 721, the executable script 723 may convert the profile 724 into a vector, encoding, etc., prior to inputting the profile 724 into the categorization AI model 721. The output of the categorization AI model 721 may indicate a category with which the profile has been associated. As an example, the category may be a category of users that have a higher likelihood of fraud. For example, when a typical user is only 1% likely to commit fraud, a category of users (with similar features as each) may be determined to be ten times more likely to commit fraud, 20 times more likely to commit fraud, or the like.

The process performed in FIG. 7A may be performed without a transaction being executed by the account associated with the profile 724. That is, the process in FIG. 7A may be performed independent of whether a transaction is being performed by the account included in the profile 724.

Figure 7B:
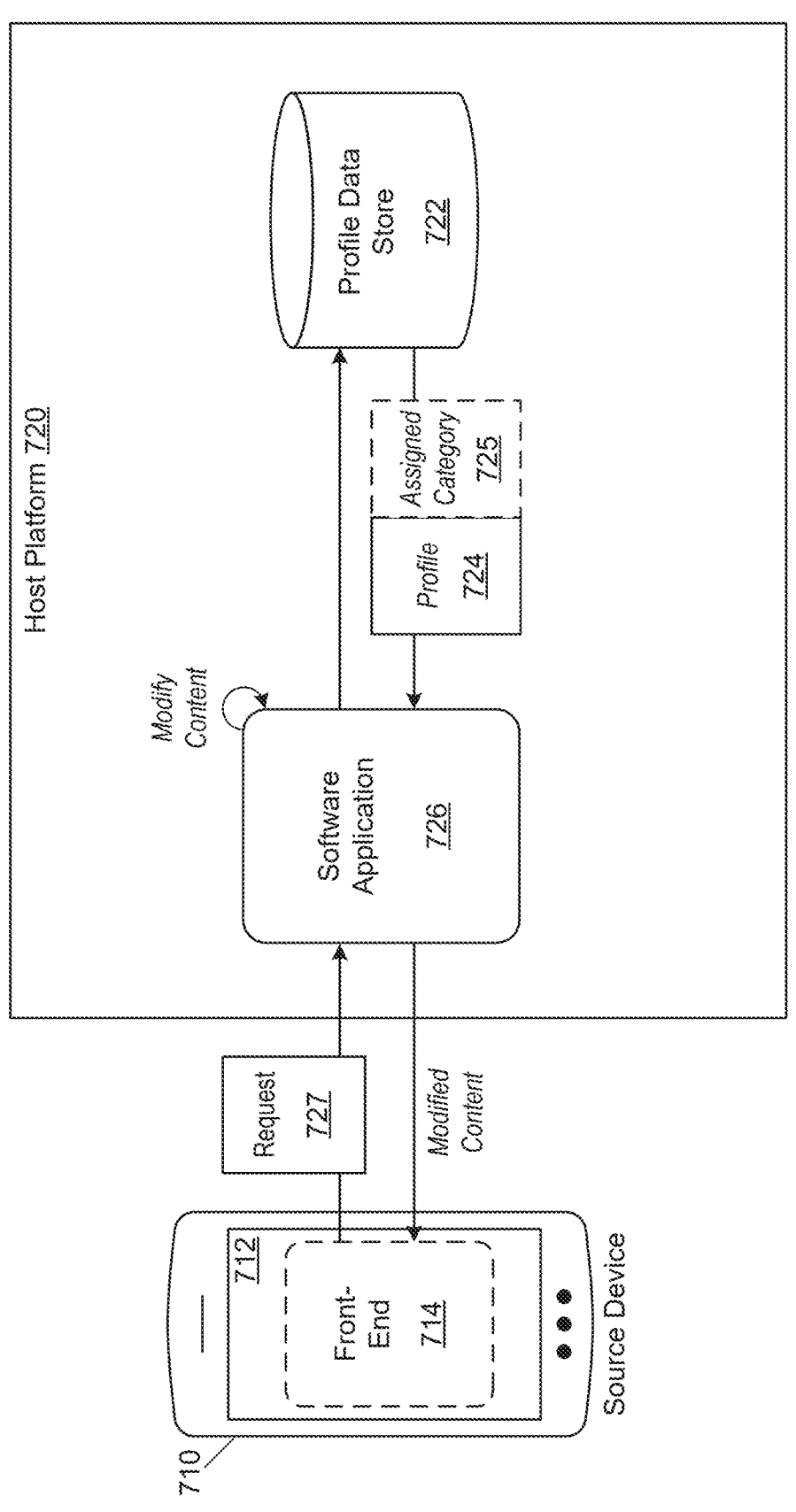

FIG. 7B illustrates a process 700B of a source device 710 associated with the profile 724 attempting to execute a transaction via the host platform 720. Referring to FIG. 7B, in some examples and features of the instant solution, the host platform 720 is an example of host platform 120 (see, for example, FIGS. 1, 2A-2C, FIG. 3). The software application 726 is an example of software service 140 (see, for example, FIGS. 1, 2A-2C). The source device 710 is an example of computing device 110, and the front-end 714 is an example of a service client 160 (see, for example, FIG. 1, 2A-2C) running on the computing device and corresponds with the software application 726 on the host platform 720. Profile data store 722 is an example of database 150 (see, for example FIG. 1,2A, 2C).

In this example of the instant solution, the profile 724 may already be assigned the category 725. According to various examples and features of the instant solution, the source device 710 may download and install a front-end 714 of a software application (e.g., a mobile application, etc.) to the source device 710, for example, from an application marketplace. Here, a user of the source device 710 may open the front-end 714 via a user interface 712 (e.g., a GUI, a touch screen, etc.) of the source device 710. The user interface 712 may include a keypad, a touch pad, or the like. The user may enter input into the front-end 714 requesting a transaction to be performed by a back-end of the software application 726 hosted by the host platform 720. Here, the front-end 714 of the software application may send a request 727 (such as an API call, etc.) to the back-end of the software application 726. In this example, the back-end of the software application 726 may correspond to the front-end 714 of the software application installed on the source device 710.

The request 727 sent from the front-end 714 on the source device 710 to the back-end software application 726 on the host platform 720 may include an identifier of the profile 724, for example, a payment card number, a user identifier, a wallet identifier, a name, a phone number, or the like. In response to receiving the request from the front-end 714, the back-end of the software application 726 may identify the profile 724 using a profile identifier included in the request 727 and may retrieve the profile 724 from the profile data store 722. Here, the retrieval process may also retrieve the category 725 assigned to the profile 724 by the categorization AI model 721.

In this example, the category 725 identifies the profile 724 as having a likelihood to commit fraud. Therefore, the back-end of the software application 726 may modify the front-end 714 of the software application by reducing available transactions to the user. For example, the back-end of the software application 726 may deactivate transactions (e.g., transaction types, amounts, limits, number of occurrences, etc.). As another example, the back-end of the software application 726 may remove content from the front-end 714 of the software application displayed on the user interface 712. For example, the back-end of the software application 726 may remove input mechanisms, descriptive content, displayed graphical elements, buttons, screens of content, and the like.

Figure 7C:
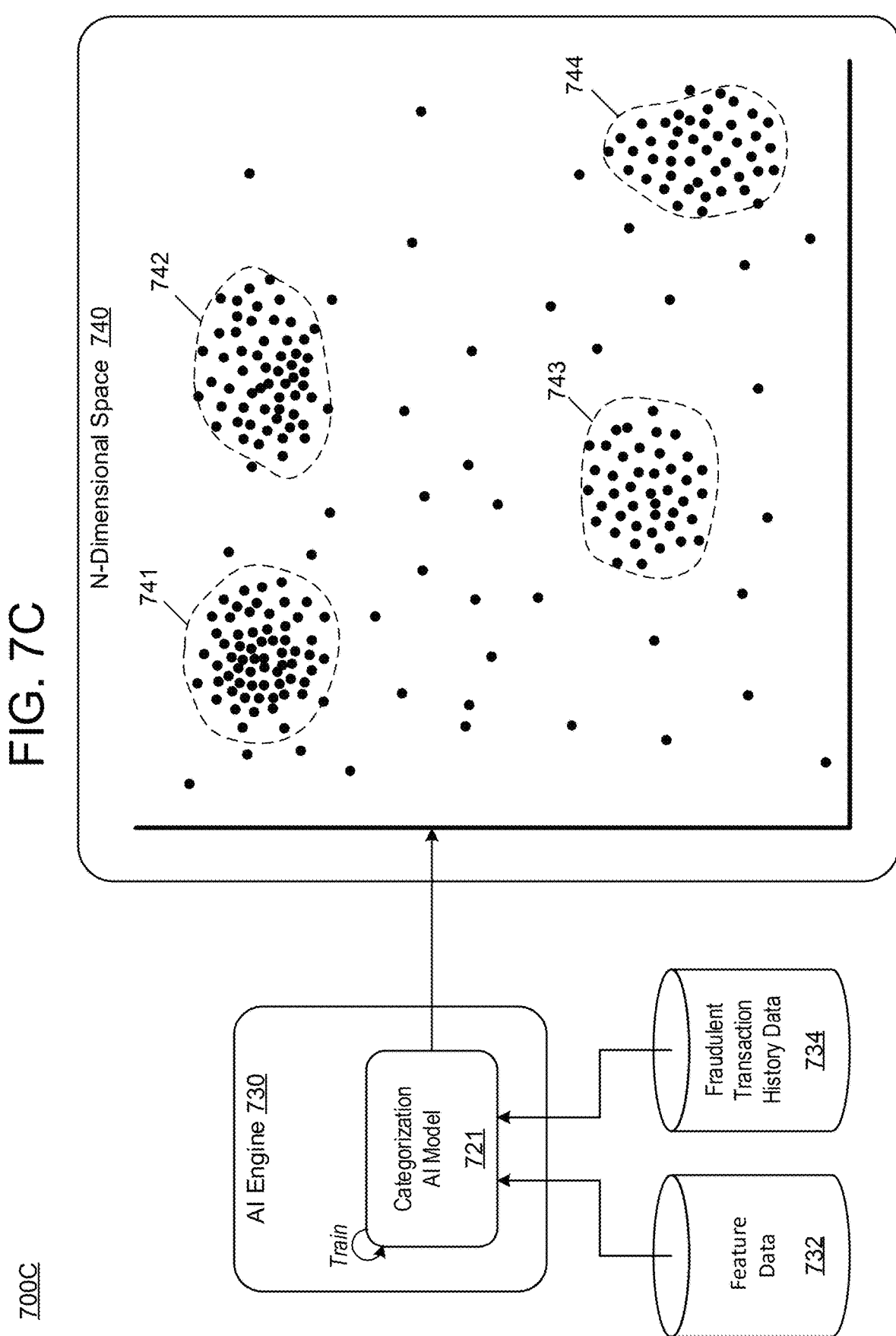

FIG. 7C illustrates a process 700C of training the categorization AI model 721 according to examples and features of the instant solution. Referring to FIG. 7C, in some examples and features of the instant solution, the host platform 720 (not shown) is an example of AI production system 230 (see, for example, FIGS. 2A-2C, FIG. 3). The categorization AI model 721 is an example of AI model 232 (see, for example, FIG. 2A-2C). Feature data 732 and fraudulent transaction history data 734 are examples of database 150 (see, for example FIG. 1, 2A, 2C).

Referring to FIG. 7C, the host platform 720 (not shown) may host an AI engine 730. The AI engine 730 may iteratively execute the categorization AI model 721 on a plurality of profiles that are previously associated with fraud. Each profile may include feature data and fraudulent transaction history data that has been labeled as fraudulent. For example, the AI engine 730 may ingest feature data 732 from a data store and fraudulent transaction history data 734 from a data store and plot the data within multidimensional/ N-dimensional space 740. The multidimensional space 740 may include N dimensions where N is greater than one. The dimensions may refer to features (e.g., age, gender, geographic location, nationality, occupation, income, number of family members, marital status, etc.) and each of the features may be assigned a dimension in the multidimensional space 740.

The iterative execution of the categorization AI model 721 by the AI engine 730 results in many different data points (profiles) being assigned to different plots in the multidimensional space 740 (graph). Here, the categorization AI model 721 may generate a plurality of clusters of data points 741, 742, 743, and 744, corresponding to a plurality of categories associated with fraud. Each category/ cluster from among the plurality of clusters of data points 741, 742, 743, and 744 include different attributes (e.g., features, transaction history, etc.). For example, each of the categories may correspond to a group of users with similar features and transaction spending. In doing so, the categorization AI model 721 can be used to identify whether a new profile fits into one of the categories, and if so, label the profile with a likelihood of being associated with fraud.

Figure 7D:
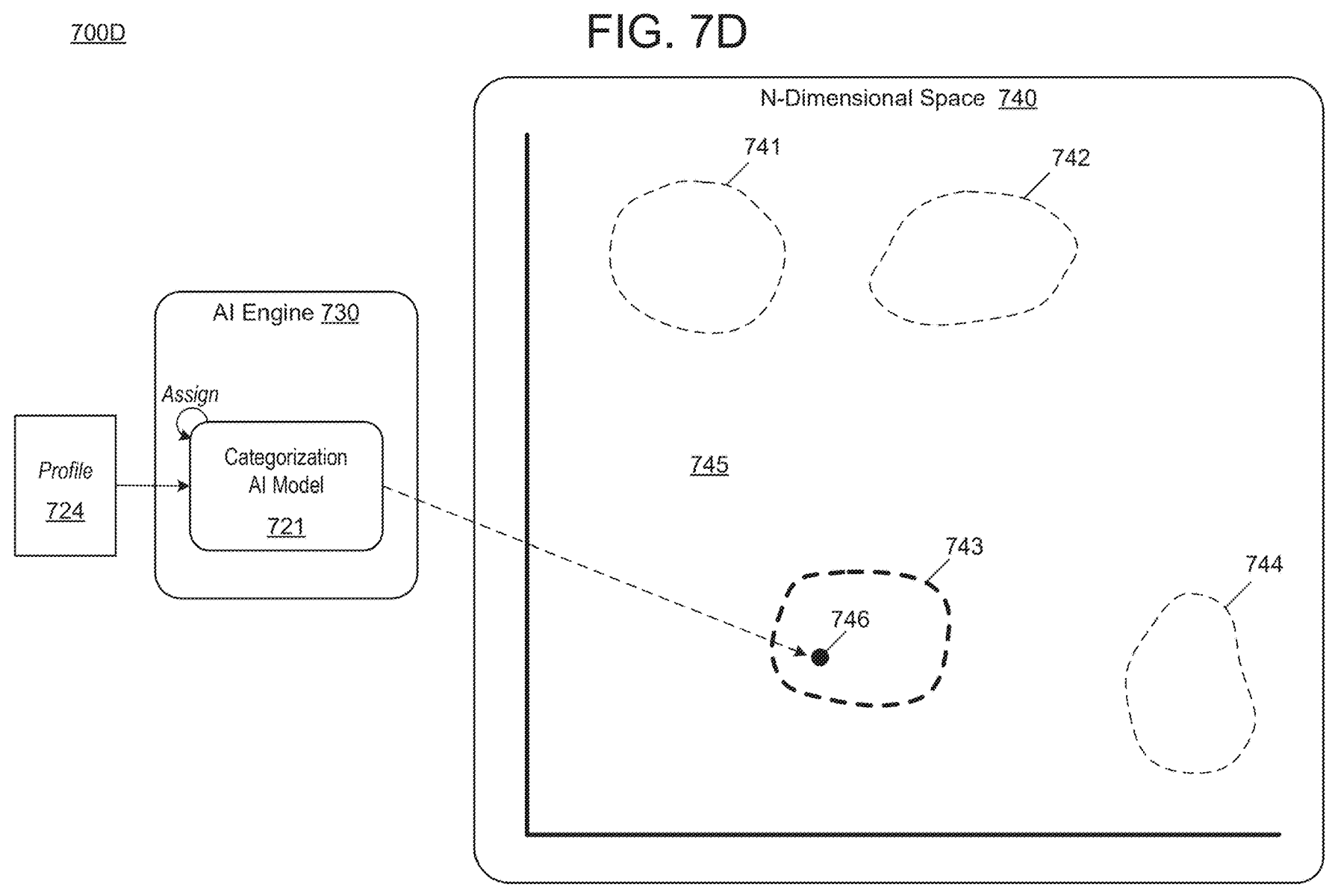

For example, FIG. 7D illustrates a process 700D of mapping the profile 724 to a point 746 in the multidimensional space 740 according to examples and features of the instant solution. Here, the AI engine 730 may execute the categorization AI model 721 on the profile 724. In response, the categorization AI model 721 may generate a plot point 746 in the multidimensional space 740. Here, the categorization AI model 721 may identify whether the point 746 is within one of the clusters from among the plurality of clusters of data points 741, 742, 743, and 744 that correspond to fraud. Here, the multidimensional space 740 includes four clusters (the plurality of clusters of data points 741, 742, 743, and 744) corresponding to four profile types that are likely to be associated with fraud. Meanwhile, a remainder 745 of the multidimensional space 740 may refer to all other profiles that are not indicative of fraud.

Here, the categorization AI model 721 maps the profile 724 to a cluster 743 from among the plurality of clusters of data points 741, 742, 743, and 744 corresponding to being indicators of fraud. Therefore, the categorization AI model 721 may assign the profile 724 a potentially fraudulent category of profile. Over time, the profile 724 may change. This change may be reviewed by the categorization AI model 721 and may be determined to be non-fraudulent despite the initial indication of potential fraud.

Figure 7E:
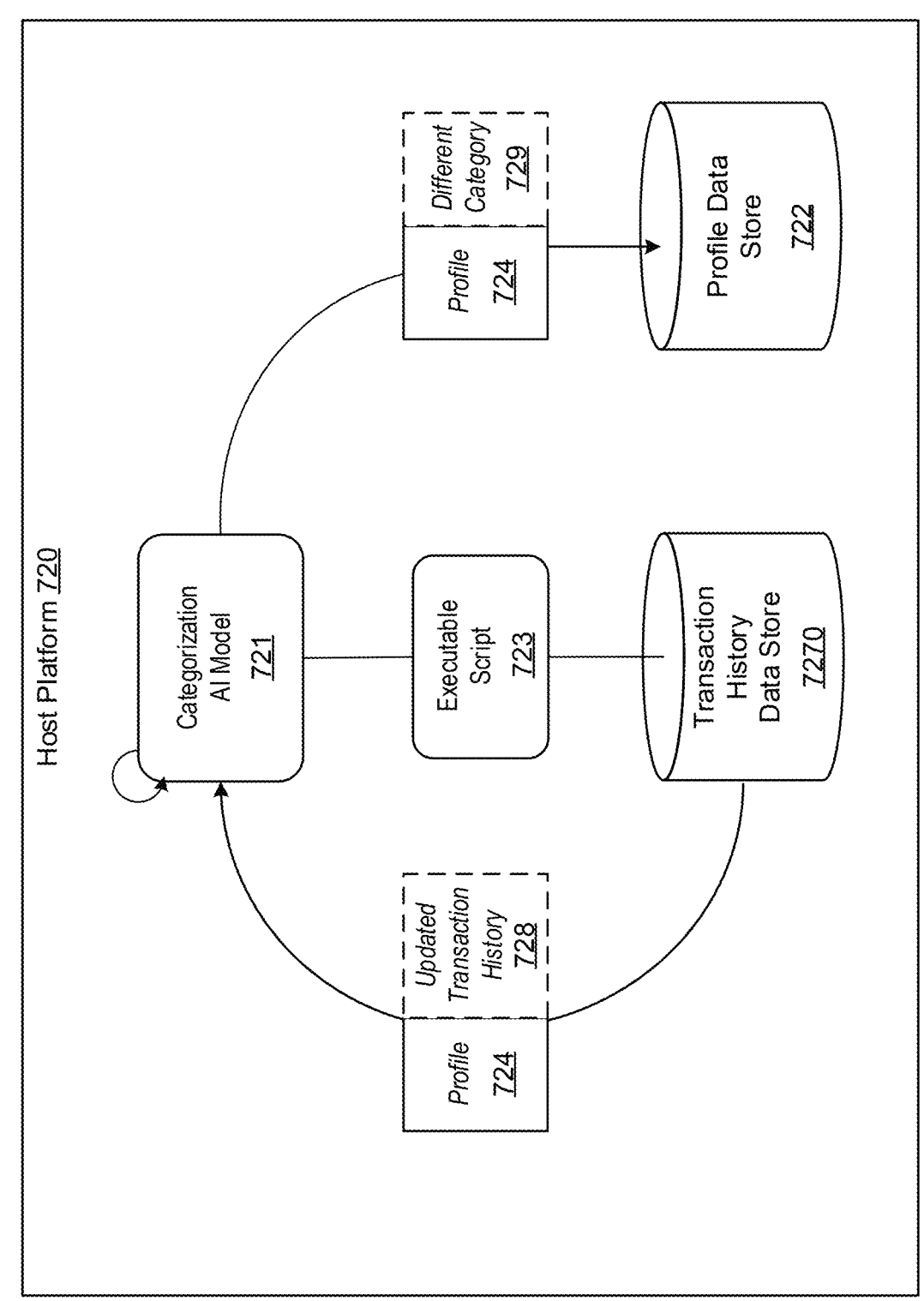

FIG. 7E illustrates a process 700E of determining whether the initial categorization of the profile 724 is correct according to examples and features of the instant solution. In this example, the executable script 723 may wait a predetermined period of time, for example, a week, a month, two months, etc. and re-evaluate the profile 724 based on updated transaction history 728 within the profile 724. The updated transaction history 728 may include transactions from transaction history data store 7270 which is an example of database 150 (see, for example FIG. 1, 2A, 2C), executed by the user, account, etc., associated with the profile 724 since the initial categorization of the profile 724. In this example, the categorization AI model 721 may determine whether the profile 724 still corresponds to a fraudulent profile based on the updated transaction history 728. Here, the categorization AI model 721 determines that the profile 724 is not a fraudulent profile and may assign a different category 729 to the profile 724 indicating the profile 724 is not fraudulent. In response, the software may increase the transaction set/transaction availability of the account(s) associated with the profile 724. For example, additional transaction types may be made available, higher limits or more executions of transactions may be activated, etc.

It is also possible that the categorization AI model 721 may determine that the profile 724 is still considered to be possible of fraud. In either case, the additional determination made by the categorization AI model 721 may be used to retrain the categorization AI model 721. For example, when the initial categorization is fraud and the profile is subsequently determined not to be associated with fraud, the categorization AI model 721 may be retrained based on this incorrect determination. As another example, when the initial categorization is fraud and the profile is subsequently determined to be still possibly fraudulent, the categorization AI model may be retrained based on the correct determination. The reinforcement learning process can ensure that the categorization AI model 721 becomes more accurate over time.

Figure 8A:
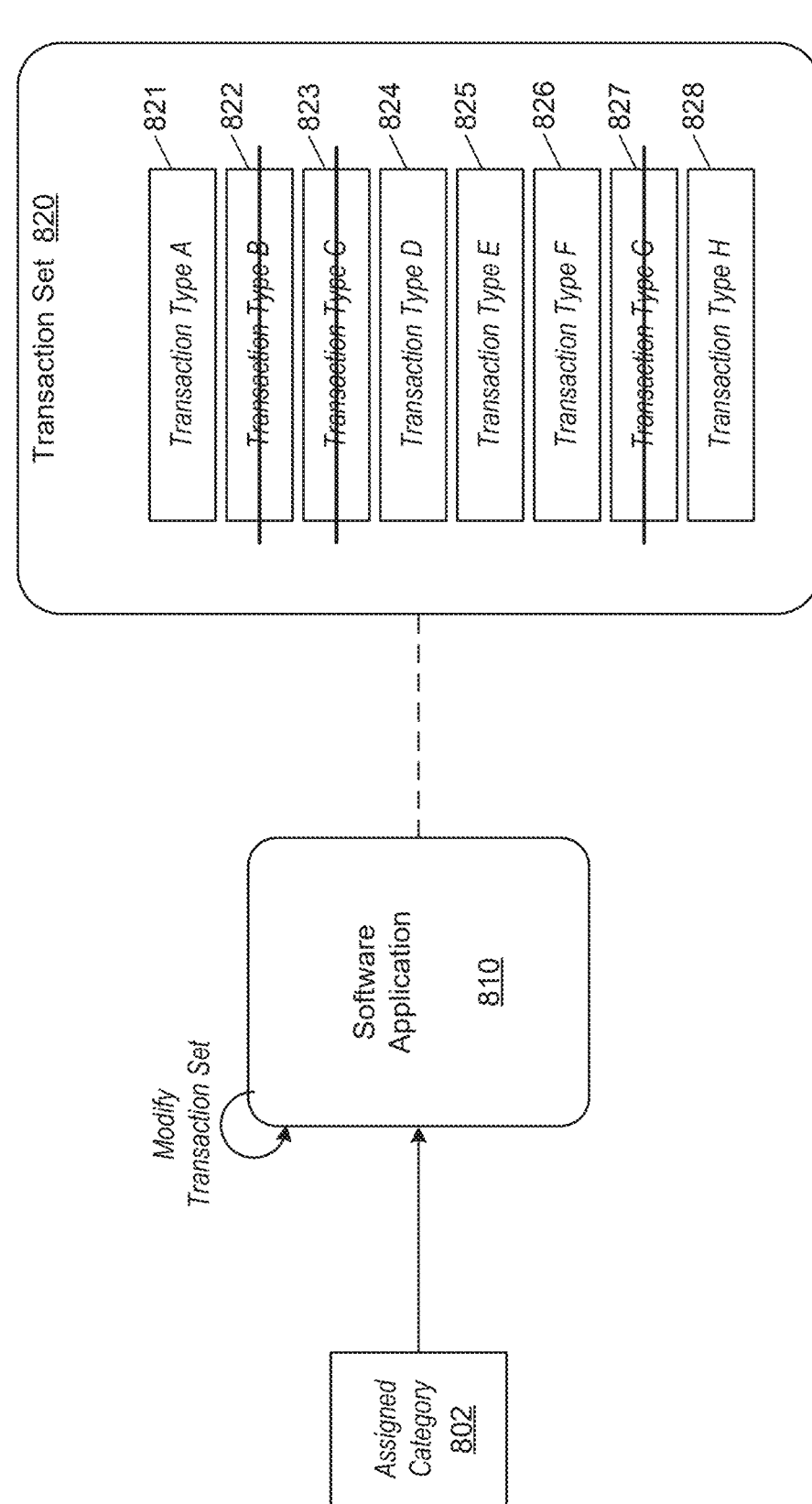
FIG. 8A is a diagram illustrating a process of reducing a transaction set available to a profile according to examples and features of the instant solution.

FIG. 8A illustrates a process 800A of reducing a transaction set 820 available to a profile according to examples and features of the instant solution. For example, the process may be performed by a software application 810 which corresponds to the back-end of the software application 726 shown in FIG. 7B. In this example, the software application 810 receives an assigned category 802 of a profile, and in response, modifies the transaction set 820 based on the assigned category 802.

In this example, the modification includes deactivating a transaction type 822, a transaction type 823, and a transaction type 827, within the transaction set 820. Meanwhile, a transaction type 821, a transaction type 824, a transaction type 825, a transaction type 826, and a transaction type 828 continue to be available. To deactivate a transaction type, the software application 810 may set a flag within the source code of the software application. As another example, the software application 810 may implement conditional logic within the source code, or the like.

Figure 8B:
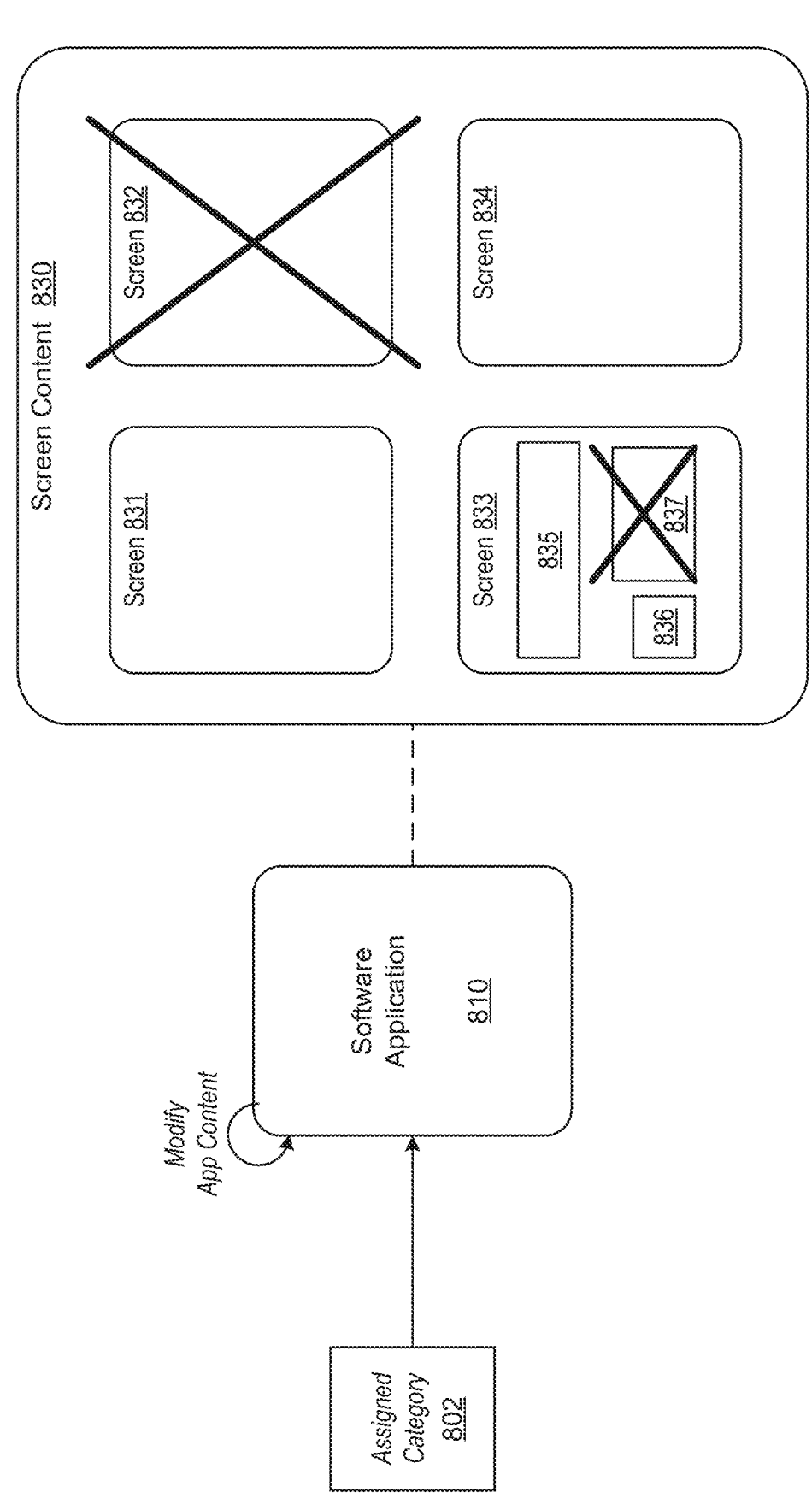
FIG. 8B is a diagram illustrating a process of hiding graphical content within a screen of an application according to examples and features of the instant solution.

FIG. 8B illustrates a process 800B of hiding graphical content within a screen of an application according to examples and features of the instant solution. In addition to, or instead of, modifying a transaction set, the software application 810 may modify graphical content that is displayed on the user interface of the front-end of the software application 810 based on the assigned category 802. Here, the software application may remove, hide, disable, or otherwise prevent graphical elements within screen content 830 of the front-end of the software application 810 from being accessed by a user. In the example of FIG. 8B, the software application 810 removes a screen 832 corresponding to a transaction that has been deactivated, while keeping a screen 831, a screen 833, and a screen 834. The software application also disables a feature 837 on the screen 833 of the software application based on a transaction that has been deactivated while keeping/maintaining a feature 835 and a feature 836 displayed on the screen 833. In doing so, the software application 810 can prevent a user from accessing the input mechanisms displayed on a GUI from being accessed by a user of the software application 810 (e.g., a user corresponding to the profile that receives the assigned category 802).

In some examples and features of the instant solution, the instant solution comprises an apparatus that integrates advanced artificial intelligence (AI) capabilities to enhance fraud detection and prevention during telephone transactions. The apparatus includes a memory configured to store an AI model and a processor designed to perform various functions for the instant solution. The processor trains the AI model using a neural network training capability. The training utilizes diverse datasets, including call log data of fraudulent calls, transaction fraud data, transaction context, and model feedback data. These datasets provide comprehensive information enabling the AI model to recognize and predict fraudulent activities effectively. Once the AI model is trained, the apparatus captures audio from an ongoing telephone call. The processor then converts the audio into text, displayed on a graphical user interface (GUI). The real-time transcription allows for immediate analysis and interaction during the call. The processor also obtains the transaction context from the computing device conducting the call. The context may include details such as the type of transaction, user behavior, and other relevant data that can influence the fraud detection process.

In some examples and features of the instant solution, using the trained AI model, the processor generates a fraud profile based on the transcribed text and the contextual information of the ongoing call. The fraud profile comprehensively represents the potential risk associated with the transaction and the user involved. During the call, the processor may execute actions based on the fraud profile. These actions may include generating verification questions during the call, which are displayed on the GUI. The processor may also update the fraud profile iteratively as the call progresses, allowing for dynamic responses to new information obtained during the conversation. Furthermore, the apparatus may parse audio to detect background noises and tone of voice, using the information to refine the fraud profile. The audio analysis helps identify suspicious behaviors that may not be evident from the text alone.

In some examples and features of the instant solution, the instant solution incorporates contextual data to enhance the fraud detection capabilities of the AI model. Specifically, the processor within the apparatus is configured to obtain at least one of an Internet Protocol (IP) address and a geographic location of the computing device involved in the transaction. The processor captures these data points during an ongoing telephone call. The IP address provides information about the network from which the call is being made, while the geographic location offers insight into the physical location of the device. These data points are crucial as they can indicate anomalies or inconsistencies often associated with fraudulent activities. For instance, when a transaction is being attempted from a location that is unusual for the account holder, this may be a red flag indicating potential fraud. Once the IP address and geographic location are obtained, the processor executes the trained AI model on the data. The AI model, trained on a diverse dataset including previous fraudulent transactions and contextual data, can recognize patterns and deviations that might suggest fraudulent behavior. By analyzing the IP address and geographic location, the AI model can identify whether these data points align with the typical behavior of the account holder or when they deviate in a way that suggests fraud.

In some examples and features of the instant solution, the result of the analysis is a fraud profile that incorporates these additional data points. The fraud profile is used to determine the appropriate action during the ongoing telephone call. For example, when the AI model determines a high likelihood of fraud based on the IP address and geographic location, the processor might trigger additional verification steps, such as asking security questions or requiring multi-factor authentication. The enhanced fraud profile, which includes the IP address and geographic location, provides a more comprehensive and accurate assessment of the potential for fraud.

In some examples and features of the instant solution, the instant solution is configured to instruct an audio processor to parse the audio from the ongoing telephone call to determine at least one background noise and tone of voice. The trained AI model utilizes the parsed audio data to generate a fraud profile. The apparatus captures the audio from the ongoing telephone call. The audio processor analyzes the audio to extract relevant features such as background noise and tone of voice. Background noise can provide context about the caller's environment, which might indicate whether the call is being made from a suspicious or unexpected location. For example, background noise from a public place when the caller typically makes calls from home may be a red flag. The tone of voice analysis is another crucial component. The audio processor can detect variations in the caller's tone that may indicate stress, nervousness, or other emotions often associated with fraudulent behavior. For instance, a caller trying to commit fraud might exhibit a shaky or unusually urgent tone of voice.

In some examples and features of the instant solution, once the background noise and tone of voice are parsed, the data is fed into the trained AI model. The AI model, trained using a diverse set of data, including fraudulent calls and contextual transaction information, interprets the audio features to assess the likelihood of fraud. The processor generates a fraud profile based on the combined analysis of the text displayed on the graphical user interface (GUI), the transaction context, and the audio features. The comprehensive fraud profile provides a multi-faceted view of the potential for fraud, enabling the apparatus to make more informed decisions during the call. Based on the fraud profile, the processor can execute actions to mitigate the risk of fraud. These actions may include generating verification questions, flagging the transaction for further review, or terminating the call when the risk is too high.

In some examples and features of the instant solution, the instant solution is configured to generate and display verification questions during an ongoing telephone call. The processor analyzes the data from the ongoing telephone call, including the transcribed text displayed on the graphical user interface (GUI), the transaction context, and other relevant data points such as the IP address, geographic location, background noise, and tone of voice. Using the trained AI model, the processor generates a fraud profile that assesses the risk associated with the transaction. When the fraud profile indicates a potential risk, the processor generates a verification question. The questions are designed to be contextually relevant and specific to the account holder's information, ensuring that only the legitimate account holder can answer them correctly. For instance, the questions might pertain to recent transactions, personal information, or security settings known only to the account holder.

In some examples and features of the instant solution, once the verification question is generated, the processor displays it on at least one computing device conducting the call and the GUI. Displaying the question on the GUI allows the call center representative to ask the caller directly. When the caller is interacting with an automated system, the question can be displayed on their device, prompting them to respond. The apparatus is configured to handle the responses to these verification questions dynamically. The processor evaluates the caller's answers in real time, comparing them against known correct responses stored in the system. When the caller answers correctly, the processor updates the fraud profile accordingly and may allow the transaction to proceed. When the answers are incorrect or the caller fails to respond satisfactorily, the processor can execute actions such as flagging the transaction for further review, escalating the call to a human operator, or even terminating the transaction to prevent potential fraud.

In some examples and features of the instant solution, the instant solution is configured to iteratively execute the trained AI model during an ongoing telephone call. The iterative process allows the AI model to generate multiple updates to the fraud profile as the call progresses, enabling dynamic and real-time adjustments to the fraud detection process. The apparatus captures audio from the ongoing telephone call and converts it into text, displayed on a graphical user interface (GUI). The processor obtains contextual data from the transaction being conducted, such as details about the type of transaction, user behavior, and other relevant factors. The information forms the basis for the initial fraud profile generated by the AI model. As the telephone call progresses, the processor monitors the ongoing conversation and captures additional text and contextual data. The AI model is executed iteratively, analyzing the new data in real time to generate updates to the fraud profile. The continuous analysis allows the AI model to detect emerging patterns or anomalies that might indicate fraudulent activity.

In some examples and features of the instant solution, each iteration of the AI model provides an updated fraud profile that reflects the most current information available from the ongoing call. The processor uses these updates to make informed decisions about the actions to be taken during the call. For example, when a new piece of information suggests an increased risk of fraud, the processor may prompt the call center representative to ask additional verification questions, or it may flag the transaction for further review. The iterative execution of the AI model ensures that the fraud detection process is dynamic and responsive to changes in the conversation. In addition to generating updates to the fraud profile, the processor is configured to execute additional actions based on these updates. For instance, when an update indicates a high likelihood of fraud, the processor may take immediate action to prevent the transaction from being completed, such as suspending the account or alerting a human operator for further investigation. The iterative process continuously refines the AI model based on feedback from each interaction.

In some examples and features of the instant solution, the instant solution is configured to capture audio from an ongoing telephone call and convert it into text, displayed on a graphical user interface (GUI). Concurrently, the processor obtains contextual data related to the transaction, such as the type of transaction, user behavior, and other relevant factors. In addition to the real-time data, the processor retrieves the user profile associated with the ongoing telephone call. The user profile contains historical information about the user's past transactions, behaviors, and other pertinent data that can provide insights into their typical activity patterns. The user profile may include transaction history, frequently used devices and locations, known associates, and any previous suspicious or fraudulent behavior. Utilizing the profile, the processor executes the trained AI model to generate a fraud profile. The AI model integrates the real-time data from the ongoing call with the historical and contextual information from the user profile. The combined analysis allows the AI model to identify deviations from the user's typical behavior, which may indicate potential fraud. For instance, when the transaction being attempted during the call significantly differs from the user's usual transactions in terms of amount, type, or location, the AI model can flag this as a suspicious activity. Similarly, when the tone of voice or background noise during the call differs from previous interactions, this may raise a red flag.

In some examples and features of the instant solution, the processor uses the comprehensive fraud profile to determine the appropriate actions during the call. These actions may include generating verification questions, requiring additional authentication steps, or flagging the transaction for further review. By incorporating user profile data, the apparatus can make more informed and accurate decisions, reducing the likelihood of false positives and ensuring that legitimate transactions are completed on time.

In some examples and features of the instant solution, the instant solution is configured to add a model feedback record, which includes the fraud profile generated by the trained AI model, the action executed during the telephone call, and feedback regarding the action to the model feedback data. The feedback loop enables the AI model to be retrained periodically based on real-world outcomes, thereby refining its predictive capabilities. The apparatus captures audio from an ongoing telephone call, converting the audio into text and displaying the text on a graphical user interface (GUI). Concurrently, the processor gathers contextual data about the transaction from the computing device conducting the call. The AI model uses the data to generate an initial fraud profile, assessing the potential risk of fraud based on the current call's characteristics and the transaction context.

In some examples and features of the instant solution, during the call, the processor executes actions based on the generated fraud profile. These actions may include prompting additional verification questions, flagging the transaction for further review, or taking immediate steps to prevent the transaction when fraud is highly suspected. The effectiveness of these actions contributes to the overall success of the fraud detection system. After the call concludes, the processor compiles a model feedback record. The record includes the generated fraud profile, detailing the AI model's assessment of the call and the associated risk factors. It also documents the specific actions taken during the call in response to the fraud profile. The record also captures feedback regarding the outcome of these actions. The feedback can be sourced from various channels, such as user reports, follow-up investigations, or transaction results (e.g., whether the transaction was later confirmed fraudulent or legitimate). The model feedback record is added to the model feedback data repository. Over time, the repository accumulates information about the AI model's performance in real-world scenarios. The processor periodically accesses the repository to retrain the AI model, using the accumulated feedback data to refine its algorithms and increase its predictive accuracy.

In some examples and features of the instant solution, the instant solution is configured to generate a fraud indicator based on the fraud profile and display the indicator on the graphical user interface (GUI) during the call. The real-time visual cue aids representatives in making informed decisions and taking appropriate actions to mitigate potential fraud. The apparatus captures audio from an ongoing telephone call and converts the audio into text, which is then displayed on the GUI. Simultaneously, the processor gathers contextual data about the transaction from the computing device conducting the call. The contextual data, combined with the transcribed text, generates an initial fraud profile by executing the trained AI model. The AI model analyzes various factors to determine the potential risk of fraud. These factors include the transaction details, the caller's behavior, background noise, tone of voice, and any discrepancies between the caller's current activity and the historical patterns stored in the user profile. The output of the analysis is a fraud profile that quantifies the likelihood of fraudulent activity.

In some examples and features of the instant solution, based on the fraud profile, the processor generates a fraud indicator. The indicator is a visual representation of the fraud risk level, designed to be easily interpretable by call center representatives. The fraud indicator may take the form of a color-coded alert (e.g., green for low risk, yellow for moderate risk, red for high risk), a numerical score, or another visual symbol that conveys the risk level succinctly. The fraud indicator is displayed prominently on the GUI in real-time as the telephone call progresses, allowing the call center representative to monitor the risk level dynamically and take appropriate actions. For example, when the fraud indicator signals a high risk, the representative might ask additional verification questions, escalate the call to a supervisor, or initiate other security protocols to prevent potential fraud.

In some examples and features of the instant solution, the instant solution comprises an apparatus with a memory and a processor, both configured to perform a series of steps for identifying fraudulent transaction behavior and dynamically adjusting user access to various transaction types. The memory is specifically configured to store an artificial intelligence (AI) model, while the processor is tasked with executing several operations, ensuring that the AI model operates efficiently and accurately. The processor trains the AI model to identify a plurality of categories within a multidimensional space. The training utilizes a neural network training capability that leverages patterns of fraudulent transaction behavior, features, and model feedback data. The training phase involves plotting numerous data points in the multidimensional space, where each point represents unique features and historical transaction behavior. Through the process, the AI model learns to identify clusters of data points that correspond to different categories, including those indicative of fraudulent activity.

In some examples and features of the instant solution, upon receiving a request to determine the category of a profile associated with a computing device, the processor proceeds to extract relevant features and the transaction history of the profile from a connected database. The features may include personal details such as name, age, address, and transaction history, including payments made, withdrawals, and types of spending. The trained AI model is executed on the extracted features and transaction history to map the profile to a specific point within the multidimensional space. By analyzing the location of the point relative to the identified clusters, the processor assigns the profile to a category. For instance, when the point lies within a cluster associated with high-risk behavior, the profile is categorized accordingly. Based on the assigned category, the processor dynamically reduces the transaction set accessible within a software application when the associated computing device is accessing the application. The reduction involves deactivating certain transaction types or limiting transaction capabilities within the application, effectively restricting the user's ability to perform potentially fraudulent activities. For example, specific transaction types, transaction amounts, and the number of transactions might be limited based on the profile's risk category.

In some examples and features of the instant solution, instant solution is configured to plot a plurality of points in the multidimensional space based on the fraudulent transaction behavior and the features, identify a plurality of clusters among the plurality of points based on point densities within the plurality of clusters, and identify the plurality of categories based on the plurality of clusters. The processor plots a plurality of points within a multidimensional space. Each point represents an individual profile characterized by fraudulent transaction behavior and features. These features may include personal attributes such as age, address, and transaction history, while fraudulent transaction behavior comprises patterns and activities known to be associated with fraudulent actions. The multidimensional space is a conceptual representation where each dimension corresponds to a specific feature or transaction behavior attribute. By plotting the profiles as points in the space, the processor creates a comprehensive visual and analytical representation of user behavior patterns.

In some examples and features of the instant solution, processor analyzes the plotted points to identify clusters within the multidimensional space. Clusters are identified based on point densities, where a higher density of points indicates a higher concentration of profiles with similar characteristics. For instance, profiles with frequent large withdrawals and unusual transaction locations might form a distinct cluster. The identification of these clusters involves statistical techniques and machine learning algorithms capable of discerning natural groupings within the data. Once the clusters are identified, the processor proceeds to categorize these clusters. Each cluster corresponds to a specific category that represents a different risk level or type of user behavior. For example, one cluster may represent profiles with high-risk behavior indicative of potential fraud, while another cluster may represent low-risk profiles with typical user behavior. The categorization process involves assigning each cluster a label or category based on its characteristics. These categories are used to simplify the decision-making process for the AI model when determining the risk level of new or existing profiles. By understanding the categories, the AI model can quickly assess the risk associated with a profile by determining which cluster it belongs to within the multidimensional space.

In some examples and features of the instant solution, the instant solution is configured to deactivate one or more transaction execution capabilities within the software application and hide graphical content within one or more pages of the software application. Upon determining that a user profile falls into a high-risk category for fraudulent behavior, the processor intervenes by modifying the available transaction options. This can involve setting flags, implementing switches, or altering configurations within the source code of the software application to disable certain types of transactions. For example, the processor may deactivate high-value transfers, multiple transactions in quick succession, or transactions to specific regions known for high fraud rates. By deactivating these capabilities, the system reduces the risk of fraudulent transactions being executed by users flagged as high-risk.

In some examples and features of the instant solution, the processor also hides graphical content within one or more pages of the software application based on the user's risk category. This involves altering the user interface dynamically to prevent access to certain features and transaction types. For instance, when a particular transaction type is deactivated, the corresponding buttons, input fields, and graphical elements are removed or hidden from the user interface, ensuring that users are not misled by visible but non-functional options and helps streamline their experience by presenting options that are available to them based on their risk profile. The hiding of graphical content is accomplished through modifications in the application's display logic. The processor can update the display configuration files or modify the runtime behavior of the application to exclude certain elements from the graphical user interface (GUI). For instance, the processor may remove entire screens related to deactivated transactions, disable specific buttons, or hide input fields that are no longer relevant to the user's allowed transaction set.

In some examples and features of the instant solution, the instant solution is configured to activate an additional verification to be performed within the software application based on the category and prevent an action from being performed by the computing device with the software application until the additional verification is successfully performed. The apparatus incorporates a processor that dynamically activates additional verification steps within the software application based on the assigned risk category of the user profile. This ensures that high-risk transactions or actions are subject to more stringent verification procedures, enhancing the security of the system. Upon determining that a user profile falls into a higher-risk category for fraudulent behavior, the processor activates additional verification requirements within the software application. The process begins by configuring the software application to prompt the user for extra verification information before allowing certain actions to be completed. The verification steps can include multifactor authentication (MFA), biometric verification, security questions, or one-time passwords (OTPs) sent via email or SMS.

In some examples and features of the instant solution, the processor implements the additional verification by modifying the application's workflow. When a high-risk action is initiated—such as a large transfer, changes to account settings, or access to sensitive information—the software application detects the associated risk category of the user profile. The processor then triggers a verification module that presents the user with the verification steps. For instance, when MFA is required, the user might receive a prompt to enter a code sent to their registered mobile device or email address. The apparatus ensures that no high-risk action can be completed until the additional verification is successfully performed. The processor enforces this by placing a hold on the action, effectively preventing it from being executed until the user passes the verification step. This is managed through conditional logic embedded within the application's transaction processing system. When the user fails to provide the correct verification information, the action is blocked, and appropriate notifications are generated to inform the user the reasons for blocking the action. The user interface of the software application is adapted to support these verification processes. For instance, when additional verification is required, the interface displays the relevant prompts and input fields for the user to complete the verification. This includes clear instructions and feedback mechanisms to guide the user through the verification process. The verification module is adaptable based on the type and severity of the risk identified. For instance, lower-risk actions might trigger simpler verification methods, such as security questions, while higher-risk actions may trigger more robust methods, such as biometric authentication.

In some examples and features of the instant solution, the instant solution is configured to determine that the computing device is accessing the software application and in response, retrieve the profile and the category assigned to the profile from a storage device and reduce the transaction set in response to the computing device accessing the software application. The apparatus incorporates a processor that is capable of detecting when a computing device accesses the software application and subsequently adjusting the available transaction set based on the risk profile of the user. The process involves several key steps to ensure that the transaction capabilities are dynamically managed according to the user's fraud risk category.

In some examples and features of the instant solution, when the computing device attempts to access the software application, the processor first determines the identity of the device and the associated user profile. This is achieved through login credentials, device identifiers, or other authentication mechanisms that link the computing device to a specific user profile stored in a database. The processor monitors access attempts in real time, identifying when the software application is being accessed. Upon successful identification, the processor retrieves the relevant user profile and its assigned category from a storage device. This involves querying a database or other storage medium where user profiles and their risk categories are maintained. The profile retrieval process ensures that the most up-to-date information is used to assess the user's transaction privileges.

In some examples and features of the instant solution, the processor evaluates the risk level associated with the user. Based on the risk category, the processor proceeds to modify the transaction set available to the user within the software application. For users classified in higher-risk categories, the processor reduces the available transaction set by deactivating certain transaction types or limiting the extent of transactions that can be performed. The reduction may involve disabling high-value transfers, limiting the number of transactions within a given period, or restricting transactions to specific geographies. The reduction of the transaction set is achieved through adjustments in the software application's configuration and user interface. The processor deactivates specific transaction execution capabilities within the application's code, ensuring that these actions cannot be initiated by the user. Additionally, the graphical user interface (GUI) is updated to reflect these changes, hiding or disabling elements related to the deactivated transactions. For instance, when international transfers are disabled for a high-risk user, the corresponding buttons and input fields are removed or greyed out in the user interface. The processor continually monitors access to the software application, ensuring that transaction set adjustments are applied in real-time and reflect any changes in the user's risk profile.

In some examples and features of the instant solution, the instant solution is configured to execute the trained AI model on additional transaction history of the profile to map the profile to a different point in the multidimensional space and determine that the profile is not assigned to the category based on the different point in the multidimensional space. The apparatus includes a processor that re-evaluates user profiles based on additional transaction history to determine when the initial risk category assigned to the profile remains accurate. The processor executes the trained AI model on the user profile's additional transaction history. The transaction history includes new transactions that have occurred since the initial categorization, providing updated data reflecting the user's recent behavior. The transaction history data is extracted from a database where it is continuously recorded and updated.

In some examples and features of the instant solution, the processor maps the updated profile to a point in the multidimensional space using the additional transaction history. The multidimensional space is a conceptual framework where each dimension represents different features and transaction behaviors. The AI model processes the new data to generate a new point within this space, reflecting the updated profile. By comparing the new point to the clusters within the multidimensional space, the processor determines whether the profile still belongs to the initially assigned risk category. When the new point falls within a different cluster, the processor recognizes that the profile's characteristics have changed sufficiently to warrant a new category. For example, when a user initially categorized as high-risk shows consistent, legitimate transaction behavior over time, their new point in the multidimensional space may fall within a low-risk cluster.

In some examples and features of the instant solution, upon determining that the profile no longer fits the initial high-risk category, the processor updates the profile's category accordingly. This involves modifying the stored profile data in the database to reflect the new risk category. The updated category can then influence the transaction set and other actions the software application allows the user to perform. This re-evaluation process ensures that the system adapts to changes in user behavior, preventing users from being unfairly restricted based on outdated information. It also enhances the accuracy of the fraud detection system by continuously refining the categorization of user profiles.

In some examples and features of the instant solution, the instant solution is configured to increase the transaction set based on the profile not being assigned to the category, wherein the processor activates one or more transaction capabilities that were previously deactivated. The processor executes the trained AI model on the user profile, which includes analyzing additional transaction history and other relevant data. The analysis maps the profile to a point in the multidimensional space, reflecting the latest behavioral and transactional data of the user. The multidimensional space comprises various dimensions that represent different features and transaction behaviors, which are used to categorize the profile into risk levels. When the AI model determines that the updated point in the multidimensional space no longer falls within a high-risk cluster, the processor identifies the change and reassigns the profile to a lower-risk category. The reassignment is based on the behavioral data indicating that the user no longer exhibits patterns associated with high-risk or fraudulent activity.

In some examples and features of the instant solution, upon determining that the profile is no longer assigned to the high-risk category, the processor increases the transaction set available to the user within the software application. This involves activating one or more transaction capabilities that were previously deactivated. For example, when certain types of transactions, such as high-value transfers or international transactions, were disabled due to the user's high-risk status, these capabilities are now re-enabled. The processor manages this by modifying the software application's configuration and adjusting settings that control which transactions the user can perform. This may involve updating the application's internal flags or switches that were set to disable specific transaction types. Additionally, the graphical user interface (GUI) is updated to reflect these changes, making the newly available transaction options visible and accessible to the user. The re-enabled transactions are integrated back into the application's workflow, allowing users to perform them without any additional steps. For instance, previously hidden buttons or input fields related to re-enabled transactions are made visible again in the GUI, and the software logic allows these transactions to be processed as normal. This dynamic adjustment not only prevents fraud by limiting high-risk actions but also ensures that legitimate users are not unduly restricted.

In some examples and features of the instant solution, the instant solution is configured to receive additional transaction data from the profile which occurs after reducing of the transaction set, determine whether the assigned category is correct based on the additional transaction data, generate the model feedback data based on the determining, and retrain the AI model based on the model feedback data. After the transaction set has been reduced for a user profile identified as high-risk, the processor continuously monitors and receives additional transaction data associated with that profile. This transaction data includes all subsequent activities performed by the user, which are recorded and stored in a database for ongoing analysis. The processor analyzes the additional transaction data to determine whether the initially assigned risk category for the profile remains accurate. This involves executing the trained AI model on the new data, mapping the profile to a point within the multidimensional space, and comparing it to the previously identified clusters. When the new transaction data suggests that the user's behavior has changed significantly—either becoming more indicative of fraud or less—the processor re-evaluates the risk category assigned to the profile.

In some examples and features of the instant solution, based on the re-evaluation, the processor generates model feedback data. This feedback data includes details about the new transaction behaviors and the outcomes of any actions taken based on the initial categorization. For example, when a user initially flagged as high-risk has consistently demonstrated legitimate behavior, this feedback data will reflect that change. Conversely, when the user continues to engage in suspicious activities, the feedback data will confirm the accuracy of the initial risk assessment. The processor uses the model feedback data to retrain the AI model. The retraining process involves incorporating the feedback data into the model's learning algorithm, allowing it to adjust its parameters and increase its accuracy. This iterative training enhances the model's ability to differentiate between fraudulent and legitimate behaviors more effectively. The feedback loop ensures that the AI model evolves with each new piece of data, refining its predictive capabilities and reducing the likelihood of false positives and negatives. In the retraining phase, the processor updates the AI model with the new feedback data, recalculating the weights and biases within the neural network to better reflect the observed patterns. This retraining can be done periodically or in real-time, depending on the system's design and requirements. The updated AI model is then deployed within the system, ready to evaluate new transaction data with increased accuracy.

Figure 9A:
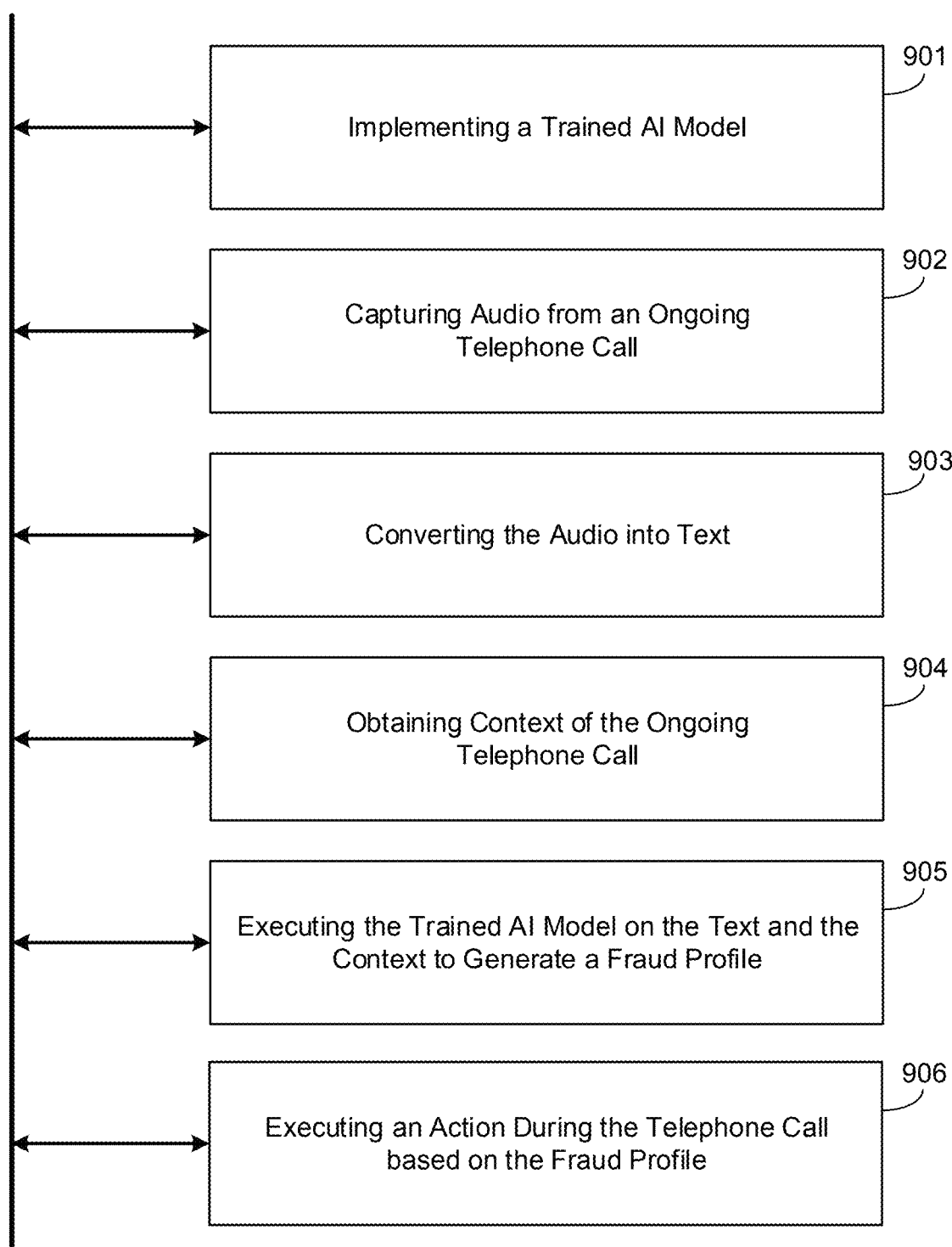
FIG. 9A is a diagram illustrating a method of executing an action during a communication session based on artificial intelligence according to examples and features of the instant solution.

FIG. 9A illustrates a method 900 of executing an action during a communication session based on artificial intelligence according to examples and features of the instant solution. For example, the method 900 may be performed by a host platform such as a cloud platform, a web server, a software application, a combination of systems, and the like. Referring to FIG. 9A, in 901, the method may include implementing a trained artificial intelligence (AI) model using a neural network training capability with at least one of call log data of calls determined to have an activity risk, activity risk data, activity context, and model feedback data. In 902, the method may include capturing audio from an ongoing telephone call. In 903, the method may include converting the audio from the ongoing telephone call into text. In 904, the method may include obtaining context of an activity from a computing device. In 905, the method may include executing the trained AI model to generate an activity risk profile based on the text and the context of the ongoing telephone call. In 906, the method may include executing an action during the ongoing telephone call based on the activity risk profile.

In another example, other elements may be output by the window displayed on the GUI, such as the audio and/or data related to the activity risk profile.

In some examples and features of the instant solution, the obtaining the context may include obtaining at least one of an Internet Protocol (IP) address of the device and a geographic location of the computing device and the executing comprises executing the trained AI model on the at least one of the IP address and the geographic location to generate the fraud profile. In some examples and features of the instant solution, the obtaining the context may include executing an audio processor on the audio from the ongoing call to determine at least one of a background noise and a tone of voice during the ongoing telephone call, and the executing comprises executing the trained AI model on the at least one of the background noise and the tone of voice to generate the fraud profile. In some examples and features of the instant solution, the executing the action may include generating a verification question to be asked during the telephone call and displaying the verification question on at least one of the computing device and the GUI.

In some examples and features of the instant solution, the executing the trained AI model may include iteratively executing the trained AI model a plurality of times on additional text displayed on the GUI as the ongoing telephone call progresses to generate a plurality of updates to the fraud profile, and executing an additional action based on an update from among the plurality of updates to the fraud profile. In some examples and features of the instant solution, the method may further include obtaining a user profile associated with the ongoing telephone call, wherein the executing the trained AI model further comprises executing the trained AI model on the user profile to generate the fraud profile. In some examples and features of the instant solution, the method may further include adding a model feedback record which includes the fraud profile generated by the trained AI model, the action executed during the telephone call, and a feedback with respect to the action, to the model feedback data, and retraining the AI model with the model feedback data including the model feedback record. In some examples and features of the instant solution, the fraud profile may include a fraud indicator, where the fraud indicator is a visual indicator displayed on the GUI during the ongoing telephone call.

FIG. 9B illustrates a method 910 of categorizing a profile and reducing a transaction set of the profile based on artificial intelligence according to examples and features of the instant solution. For example, the method 910 may be performed by a host platform such as a cloud platform, a web server, a software application, a combination of systems, and the like. Referring to FIG. 9B, in 911, the method may include training an artificial intelligence (AI) model to identify a plurality of categories within a multidimensional space using a neural network training capability with patterns of activity risk behavior, features, and model feedback data. In 912, the method may include receiving a request to determine a category of a profile associated with a computing device. In 913, the method may include extracting at least one of features and an activity history of the profile from a database. In 914, the method may include executing the trained AI model on the at least one of features and the activity history to map the profile to a point in the multidimensional space. In 915, the method may include assigning the profile to the category among the plurality of categories based on a location of the point in the multidimensional space with respect to a cluster in the multidimensional space corresponding to the category. In 916, the method may include reducing an activity set within a software application when the computing device is accessing the software application based on the category.

In some examples and features of the instant solution, the training may include plotting a plurality of points in the multidimensional space based on the fraudulent transaction behavior and the features, identifying a plurality of clusters among the plurality of points based on point densities within the plurality of clusters, and identifying the plurality of categories based on the plurality of clusters. In some examples and features of the instant solution, the reducing the transaction set may include deactivating one or more transaction execution capabilities within the software application and hiding graphical content within one or more pages of the software application based on the deactivating. In some examples and features of the instant solution, the method may further include activating an additional verification to be performed within the software application based on the category, and preventing an action from being performed by the computing device with the software application until the additional verification is successfully performed.

In some examples and features of the instant solution, the method may further include determining that the computing device is accessing the software application, and in response, retrieving the profile and the category assigned to the profile from a storage device and reducing the transaction set in response to the computing device accessing the software application. In some examples and features of the instant solution, the method may include executing the trained AI model on additional transaction history of the profile to map the profile to a different point in the multidimensional space and determining that the profile is not assigned to the category based on the different point in the multidimensional space.

In some examples and features of the instant solution, the method may include increasing the transaction set based on the determination that the profile is not assigned to the category, wherein the increasing comprises activating one or more transaction capabilities that were previously deactivated. In some examples and features of the instant solution, the method may further include receiving additional transaction data from the profile which occurs after the reducing of the transaction set, determining whether the assigned category is correct based on the additional transaction data, generating the model feedback data based on the determining, and retraining the AI model based on the model feedback data.

Figure 10:
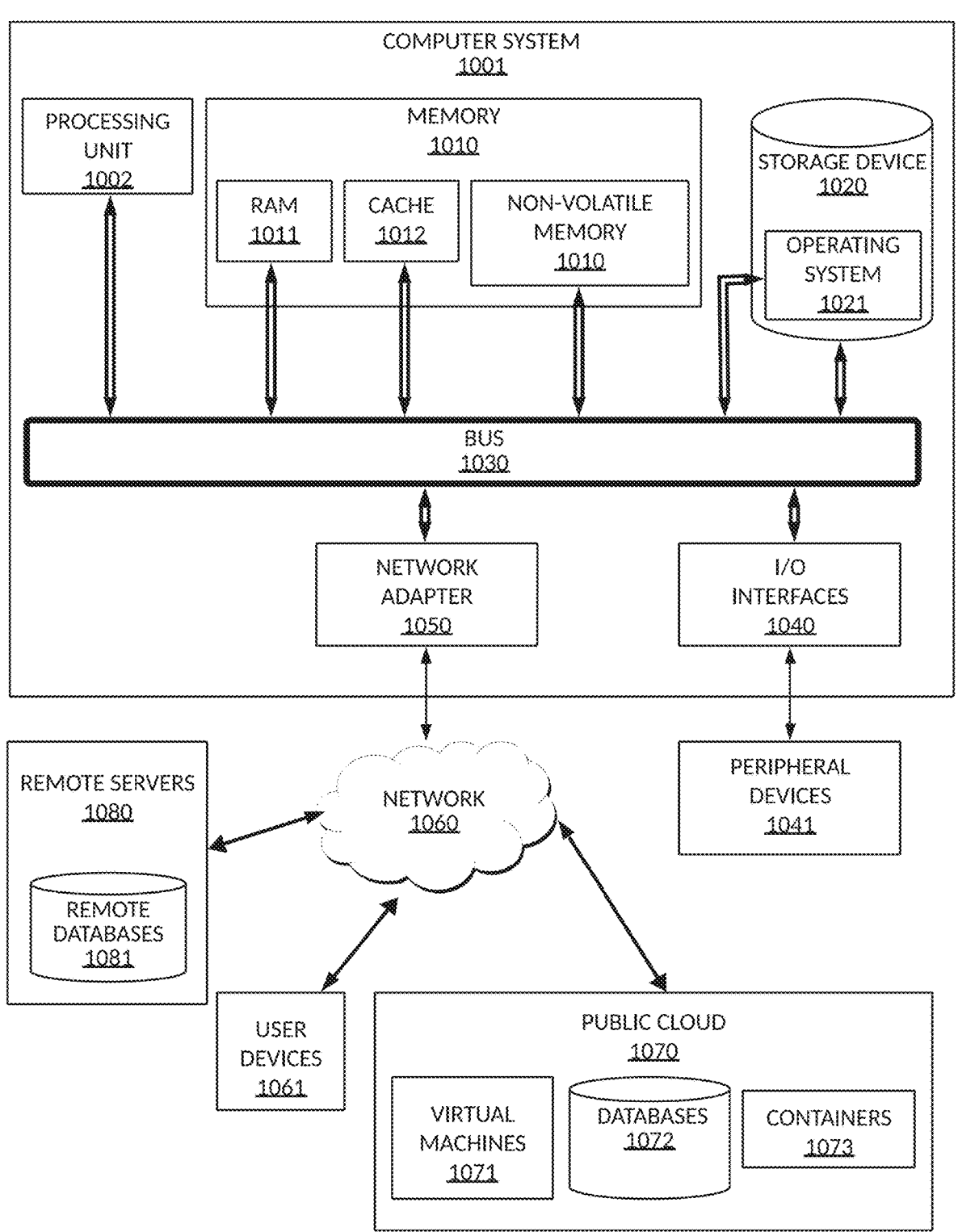
FIG. 10 is a system diagram illustrating a computing environment according to the instant solution's example features, structures, or characteristics.

The examples and features of the instant solution may be implemented in one or more of the elements described or depicted herein, including for example, the elements described or depicted in FIG. 10. These examples and features may further be implemented in hardware, in a computer program executed by a processor, in firmware, or in a combination of the above. A computer program may be embodied on a computer readable medium, such as a storage medium. For example, a computer program may reside in random access memory (RAM), flash memory, read-only memory (ROM), erasable programmable read-only memory (EPROM), electrically erasable programmable read-only memory (EEPROM), registers, hard disk, a removable disk, a compact disk read-only memory (CD-ROM), or any other form of storage medium known in the art.

An exemplary storage medium may be communicatively coupled to the processor such that the processor may read information from, and write information to, the storage medium. In the alternative, the storage medium may be integral to the processor. The processor and the storage medium may reside in an application specific integrated circuit (ASIC). In the alternative, the processor and the storage medium may reside as discrete components. For example, FIG. 10 illustrates an example computer system architecture, which may represent or be integrated in any of the above-described components, etc.

FIG. 10 illustrates a computing environment according to the instant solution's example features, structures, or characteristics. FIG. 10 is not intended to suggest any limitation as to the scope of use or functionality of features, structures, or characteristics of the instant solution of the application described herein. Regardless, the computing environment 1000 can be implemented to perform any of the functionalities described herein. In computing environment 1000, there is a computer system 1001, operational within numerous other general-purpose or special-purpose computing system environments or configurations.

Computer system 1001 may take the form of a desktop computer, laptop computer, tablet computer, smartphone, smartwatch or other wearable computer, server computer system, thin client, thick client, network computer system, minicomputer system, mainframe computer, quantum computer, and distributed cloud computing environment that include any of the described systems or devices, and the like or any other form of computer or mobile device now known or to be developed in the future that is capable of running a program, accessing a network 1060 or querying a database. Depending upon the technology, the performance of a computer-implemented method may be distributed among multiple computers and among multiple locations. However, in this presentation of the computing environment 1000, a detailed discussion is focused on a single computer, specifically computer system 1001, to keep the presentation as simple as possible.

Computer system 1001 may be located in a cloud, even though it is not shown in a cloud in FIG. 10. On the other hand, computer system 1001 may not be in a cloud except to any extent as may be affirmatively indicated. Computer system 1001 may be described in the general context of computer system-executable instructions, such as program modules, executed by a computer system 1001. Generally, program modules may include routines, programs, objects, components, logic, data structures, and so on that perform tasks or implement certain abstract data types. As shown in FIG. 10, computer system 1001 in computing environment 1000 is shown in the form of a general-purpose computing device. The components of computer system 1001 may include but are not limited to, at least one processor or processing unit 1002, a system memory 1010, and a bus 1030 that couples various system components, including system memory 1010 to processing unit 1002.

Processing unit 1002 includes at least one computer processor of any type now known or to be developed. The processing unit 1002 may contain circuitry distributed over multiple integrated circuit chips. The processing unit 1002 may also implement multiple processor threads and multiple processor cores. Cache 1012 is a memory that may be in the processor chip package(s) or located "off-chip," as depicted in FIG. 10. Cache 1012 is typically used for data or code accessed by the threads or cores running on the processing unit 1002. In some computing environments, processing unit 1002 may be designed to work with qubits and perform quantum computing.

Memory 1010 is any volatile memory now known or to be developed in the future. Examples include dynamic random-access memory (RAM) 1011 or static type RAM 1011. Typically, the volatile memory is characterized by random access, but this may not be the characterization unless affirmatively indicated. In computer system 1001, memory 1010 is in a single package. It is internal to computer system 1001, but alternatively or additionally, the volatile memory may be distributed over multiple packages and/or located externally with respect to computer system 1001. By way of example, memory 1010 can be provided for reading from and writing to a non-removable, non-volatile magnetic media (shown as storage device 1020, and typically called a "hard drive"). Memory 1010 may include at least one program product having a set (e.g., at least one) of program modules configured to carry out the functions of various features, structures, or characteristics of the instant solution of the application. A typical computer system 1001 may include cache 1012, a specialized volatile memory generally faster than RAM 1011 and generally located closer to the processing unit 1002. Cache 1012 stores frequently accessed data and instructions accessed by the processing unit 1002 to speed up processing time. The computer system 1001 may also include non-volatile memory 1013 in the form of ROM, PROM, EEPROM, and flash memory. Non-volatile memory 1013 often contains programming instructions for starting the computer, including the basic input/output system (BIOS) and information to start the operating system 1021.

Computer system 1001 may include a removable/non-removable, volatile/non-volatile computer storage device 1020. For example, storage device 1020 can be a non-removable, non-volatile magnetic media (not shown and typically called a "hard drive"). At least one data interface can connect it to the bus 1030. In features, structures, or characteristics of the instant solution where computer system 1001 has a large amount of storage (for example, where computer system 1001 locally stores and manages a large database), then this storage may be provided by peripheral storage devices 1020 designed for storing very large amounts of data, such as a storage area network (SAN) that is shared by multiple, geographically distributed computers.

The operating system 1021 is software that manages computer system 1001 hardware resources and provides common services for computer programs. Operating system 1021 may take several forms, such as various known proprietary operating systems or open-source Portable Operating System Interface type operating systems that employ a kernel.

The bus 1030 represents at least one of several types of bus structures, including a memory bus or memory controller, a peripheral bus, an accelerated graphics port, and a processor or local bus using various bus architectures. By way of example, and not limitation, such architectures include Industry Standard Architecture (ISA) buses, Micro Channel Architecture (MCA) buses, Enhanced ISA (EISA) buses, Video Electronics Standards Association (VESA) local buses, and Peripheral Component Interconnect (PCI) bus. The bus 1030 is the signal conduction path that allows the various components of computer system 1001 to communicate.

Computer system 1001 may communicate with at least one peripheral device, 1041, via an input/output (I/O) interface, 1040. Such devices may include a keyboard, a pointing device, a display, etc.; at least one device that enables a user to interact with computer system 1001; and/or any devices (e.g., network card, modem, etc.) that enable computer system 1001 to communicate with at least one other computing devices. Such communication can occur via I/O interface 1040. As depicted, I/O interface 1040 communicates with the other components of computer system 1001 via bus 1030.

Network adapter 1050 enables the computer system 1001 to connect and communicate with at least one network 1060, such as a local area network (LAN), a wide area network (WAN), and/or a public network (e.g., the Internet). It bridges the computer's internal bus 1030 and the external network, exchanging data efficiently and reliably. The network adapter 1050 may include hardware, such as modems or Wi-Fi signal transceivers, and software for packetizing and/or de-packetizing data for communication network transmission. Network adapter 1050 supports various communication protocols to ensure compatibility with network standards. Ethernet connections adhere to protocols such as IEEE 802.3, while wireless communications might support IEEE 802.11 standards, Bluetooth, near-field communication (NFC), or other network wireless radio standards.

Network 1060 is any computer network that can receive and/or transmit data. Network 1060 can include a WAN, LAN, private cloud, or public Internet, capable of communicating computer data over non-local distances by any technology that is now known or to be developed in the future. Any connection depicted can be wired and/or wireless and may traverse other components that are not shown. In some features, structures, or characteristics of the instant solution, a network 1060 may be replaced and/or supplemented by LANs designed to communicate data between devices in a local area, such as a Wi-Fi network. The network 1060 typically includes computer hardware such as copper transmission cables, optical transmission fibers, wireless transmission, routers, firewalls, switches, gateway computers, edge servers, and network infrastructure known now or to be developed in the future. Computer system 1001 connects to network 1060 via network adapter 1050 and bus 1030.

User devices 1061 are any computer systems used and controlled by an end user in connection with computer system 1001. For example, in a hypothetical case where computer system 1001 is designed to provide a recommendation to an end user, this recommendation may typically be communicated from network adapter 1050 of computer system 1001 through network 1060 to a user device 1061, allowing user device 1061 to display, or otherwise present, the recommendation to an end user. User devices can be a wide array, including personal computers, laptops, tablets, hand-held, mobile phones, etc.

A public cloud 1070 is an on-demand availability of computer system resources, including data storage and computing power, without direct active management by the user. Public clouds 1070 are often distributed, with data centers in multiple locations for availability and performance. Computing resources on public clouds 1070 are shared across multiple tenants through virtual computing environments comprising virtual machines 1071, databases 1072, containers 1073, and other resources. A container 1073 is an isolated, lightweight software for running a software application on the host operating system 1021. Containers 1073 are built on top of the host operating system's kernel and contain software applications and some lightweight operating system APIs and services. In contrast, virtual machine 1071 is a software layer with an operating system 1021 and kernel. Virtual machines 1071 are built on top of a hypervisor emulation layer designed to abstract a host computer's hardware from the operating software environment. Public clouds 1070 generally offers databases 1072, abstracting high-level database management activities. At least one element described or depicted in FIG. 10 can perform at least one of the actions, functionalities, or features described or depicted herein.

Remote servers 1080 are any computers that serve at least some data and/or functionality over a network 1060, for example, WAN, a virtual private network (VPN), a private cloud, or via the Internet to computer system 1001. These networks 1060 may communicate with a LAN to reach users. The user interface may include a web browser or a software application that facilitates communication between the user and remote data. Such software applications have been referred to as "thin" desktop software applications or "thin clients." Thin clients typically incorporate software programs to emulate desktop sessions. Mobile device software applications can also be used. Remote servers 1080 can also host remote databases 1081, with the database located on one remote server 1080 or distributed across multiple remote servers 1080. Remote databases 1081 are accessible from database client applications installed locally on the remote server 1080, other remote servers 1080, user devices 1061, or computer system 1001 across a network 1060. An AI/ML model described or depicted here may reside fully or partially on any of the elements described or depicted in FIG. 10.

Although an exemplary example of the instant solution of at least one of an apparatus, method, and computer readable medium has been illustrated in the accompanying drawings and described in the foregoing detailed description, it will be understood that the instant solution is not limited to the examples of the instant solution disclosed but is capable of numerous rearrangements, modifications, and substitutions as set forth and defined by the following claims. For example, the instant solution's capabilities of the various figures can be performed by one or more of the modules or components described herein or in a distributed architecture and may include a transmitter, receiver, or pair of both. For example, all or part of the functionality performed by the individual modules may be performed by one or more of these modules. Further, the functionality described herein may be performed at various times and in relation to various events, internal or external to the modules or components. Also, the information sent between various modules can be sent between the modules via at least one of a data network, the Internet, a voice network, an Internet Protocol network, a wireless device, a wired device and/or via a plurality of protocols. Also, the messages sent or received by any of the modules may be sent or received directly and/or via one or more of the other modules.

One skilled in the art will appreciate that the instant solution may be embodied as a personal computer, a server, a console, a personal digital assistant (PDA), a cell phone, a tablet computing device, a smartphone, or any other suitable computing device, or combination of devices. Presenting the above-described functions as being performed by the instant solution is not intended to limit the scope of the present instant solution in any way but is intended to provide one example of the many examples of the instant solution. Indeed, methods, systems, and apparatuses disclosed herein may be implemented in localized and distributed forms consistent with computing technology.

It should be noted that some of the instant solution features described in this specification have been presented as modules in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module may not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory, tape, or any other such medium used to store data.

Indeed, a module of executable code may be a single instruction or many instructions and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations, including over different storage devices, and may exist, at least partially, merely as electronic signals on a system or network.

It will be readily understood that the components of the instant solution, as generally described and illustrated in the figures herein, may be arranged and designed in a wide variety of different configurations. Thus, the detailed descriptions of the instant solution and the examples and features of the instant solution are not intended to limit the scope of the instant solution as claimed but are merely representative examples of the instant solution.

One having ordinary skill in the art will readily understand that the above may be practiced with steps in a different order and/or with hardware elements in configurations that are different from those which are disclosed. Therefore, although the instant solution has been described based upon these preferred examples and features of the instant solution, it would be apparent to those of skill in the art that certain modifications, variations, and alternative constructions would be apparent.

While preferred examples of the present instant solution have been described, it is to be understood that the examples described are illustrative only, and the scope of the instant solution is to be defined solely by the appended claims when considered with a full range of equivalents and modifications (e.g., protocols, hardware devices, software platforms, etc.) thereto.

What is claimed is:

1. An apparatus, comprising:
   a memory; and
   a hardware processor coupled to the memory and configured to:
   implement a trained artificial intelligence (AI) model to identify a plurality of categories within a multidimensional space using a neural network training capability with patterns of activity risk behavior, user features, and model feedback data,
   receive a request to determine a category of a profile associated with a computing device,
   extract at least one of features and an activity history of the profile from a database,
   execute the trained AI model on the at least one of features and the activity history to map the profile to a point in the multidimensional space,
   assign the profile to the category among the plurality of categories based on a location of the point in the multidimensional space with respect to a cluster in the multidimensional space corresponding to the category, and
   reduce an activity set within a software application when the computing device is accessing the software application based on the category.

2. The apparatus of claim 1, wherein the hardware processor is configured to plot a plurality of points in the multidimensional space based on the activity risk behavior and the features, identify a plurality of clusters among the plurality of points based on point densities within the plurality of clusters, and identify the plurality of categories based on the plurality of clusters.

3. The apparatus of claim 1, wherein the hardware processor is configured to deactivate at least one of activity execution capabilities within the software application and hide graphical content within at least one page of the software application.

4. The apparatus of claim 1, wherein the hardware processor is configured to activate an additional verification to be performed within the software application based on the category, and prevent an action from being performed by the computing device with the software application until the additional verification is successfully performed.

5. The apparatus of claim 1, wherein the hardware processor is configured to determine that the computing device is accessing the software application, and in response, retrieve the profile and the category assigned to the profile from a storage device and reduce the activity set in response to the computing device accessing the software application, wherein an AI agent performs an action related to the reduced activity set.

6. The apparatus of claim 1, wherein the hardware processor is configured to execute the trained AI model on additional activity history of the profile to map the profile to a different point in the multidimensional space, and determine that the profile is not assigned to the category based on the different point in the multidimensional space.

7. The apparatus of claim 6, wherein the hardware processor is configured to increase the activity set based on the profile not being assigned to the category, wherein the processor activates the at least one of activity execution capabilities that was previously deactivated.

8. The apparatus of claim 1, wherein the hardware processor is configured to receive additional activity data from the profile which occurs after reducing of the activity set, determine whether the category assigned to the profile is correct based on the additional activity data, generate the model feedback data based on the determining, and retrain the trained AI model based on the model feedback data.

9. A method comprising:
   implementing a trained artificial intelligence (AI) model to identify a plurality of categories within a multidimensional space using a neural network training capability with patterns of activity risk behavior, features, and model feedback data;
   receiving a request to determine a category of a profile associated with a computing device;
   extracting at least one of features and an activity history of the profile from a database;
   executing the trained AI model on the at least one of features and the activity history to map the profile to a point in the multidimensional space;
   assigning the profile to the category among the plurality of categories based on a location of the point in the multidimensional space with respect to a cluster in the multidimensional space corresponding to the category; and
   reducing an activity set within a software application when the computing device is accessing the software application based on the category.

10. The method of claim 9, wherein the training comprises plotting a plurality of points in the multidimensional space based on the activity risk behavior and the features, identifying a plurality of clusters among the plurality of points based on point densities within the plurality of clusters, and identifying the plurality of categories based on the plurality of clusters.

11. The method of claim 9, wherein the reducing the activity set comprises deactivating at least one of activity execution capabilities within the software application and hiding graphical content within at least one page of the software application based on the deactivating.

12. The method of claim 9, comprising activating an additional verification to be performed within the software application based on the category, and preventing an action from being performed by the computing device with the software application until the additional verification is successfully performed.

13. The method of claim 9, comprising determining that the computing device is accessing the software application, and in response, retrieving the profile and the category assigned to the profile from a storage device and reducing the activity set in response to the computing device accessing the software application, wherein an AI agent performs an action related to the reduced activity set.

14. The method of claim 9, comprising executing the trained AI model on additional activity history of the profile to map the profile to a different point in the multidimensional space, and determining that the profile is not assigned to the category based on the different point in the multidimensional space.

15. The method of claim 14, comprising increasing the activity set based on the profile not being assigned to the category, wherein the increasing comprises activating the at least one of activity execution capabilities that was previously deactivated.

16. The method of claim 9, comprising receiving additional activity data from the profile which occurs after reducing of the activity set, determining whether the category assigned to the profile is correct based on the additional activity data, generating the model feedback data based on the determining, and retraining the trained AI model based on the model feedback data.

17. A non-transitory computer-readable storage medium comprising instructions which when executed by a computer cause a processor to perform:

implementing a trained artificial intelligence (AI) model to identify a plurality of categories within a multidimensional space using a neural network training capability with patterns of activity risk behavior, features, and model feedback data;

receiving a request to determine a category of a profile associated with a computing device;

extracting at least one of features and an activity history of the profile from a database;

executing the trained AI model on the at least one of features and the activity history to map the profile to a point in the multidimensional space;

assigning the profile to the category among the plurality of categories based on a location of the point in the multidimensional space with respect to a cluster in the multidimensional space corresponding to the category; and reducing an activity set within a software application when the computing device is accessing the software application based on the category.

18. The non-transitory computer-readable storage medium of claim 17, wherein the training comprises plotting a plurality of points in the multidimensional space based on the activity risk behavior and the features, identifying a plurality of clusters among the plurality of points based on point densities within the plurality of clusters, and identifying the plurality of categories based on the plurality of clusters.

19. The non-transitory computer-readable storage medium of claim 17, wherein the reducing the activity set comprises deactivating at least one of activity execution capabilities within the software application and hiding graphical content within at least one page of the software application based on the deactivating.

20. The non-transitory computer-readable storage medium of claim 17, wherein the processor is configured to perform activating an additional verification to be performed within the software application based on the category, and preventing an action from being performed by the computing device with the software application until the additional verification is successfully performed.

\* \* \* \* \*